US007278954B2

(12) United States Patent
Kawai et al.

(10) Patent No.: US 7,278,954 B2
(45) Date of Patent: Oct. 9, 2007

(54) GENERATED TORQUE CONTROL METHOD FOR LEG BODY EXERCISE ASSISTIVE APPARATUS

(75) Inventors: Masakazu Kawai, Wako (JP); Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/597,733

(22) PCT Filed: Feb. 18, 2005

(86) PCT No.: PCT/JP2005/002540

§ 371 (c)(1),
(2), (4) Date: Aug. 4, 2006

(87) PCT Pub. No.: WO2005/079725

PCT Pub. Date: Sep. 1, 2005

(65) Prior Publication Data

US 2007/0054777 A1 Mar. 8, 2007

(30) Foreign Application Priority Data

Feb. 25, 2004 (JP) .............................. 2004-048996

(51) Int. Cl.
A63B 21/00 (2006.01)
A63B 22/00 (2006.01)
(52) U.S. Cl. ................ 482/1; 482/8; 702/150
(58) Field of Classification Search ............... 482/1–9, 482/900–902; 702/127, 150; 601/23, 33–35; 434/247, 257
See application file for complete search history.

(56) References Cited

U.S. PATENT DOCUMENTS 6,980,919 B2 * 12/2005 Ido ........................... 702/150

(Continued)

FOREIGN PATENT DOCUMENTS

JP 2003-079684 3/2003

(Continued)

*Primary Examiner*—Glenn Richman
(74) *Attorney, Agent, or Firm*—Rankin, Hill, Porter & Clark LLP

(57) ABSTRACT

A generated torque control method for a leg body exercise assistive apparatus enabling a person to make a leg motion in such a feeling that the person is not wearing the leg body exercise assistive apparatus as much as possible by reducing the weight of the leg body exercise assistive apparatus attached to the person acting on the person. On the assumption that a person (A) not wearing the assistive apparatus (1) is making the same motion as a leg motion of the person (A) wearing the leg body exercise assistive apparatus (1) during the leg motion of the person (A), an estimation is made for a person-side joint moment to be generated in each joint of the leg of the person (A), and on the assumption that the assistive apparatus (1) is independently making the same motion as the leg motion, an estimation is made for an apparatus-side joint moment to be generated in the joint regions (4), (6), and (10) of the leg sections of the assistive apparatus (1). The estimated value of the apparatus-side joint moment is considered as a reference torque for torque generation means (18), (19), and (20), and a torque formed by adding a torque according to the estimated value of the person-side joint moment to the reference torque is generated in the torque generation means (18), (19), and (20).

12 Claims, 21 Drawing Sheets

U.S. PATENT DOCUMENTS

2001/0029400 A1* 10/2001 Deffenbaugh et al. ........ 623/24
2002/0052663 A1*  5/2002 Herr et al. .................... 623/24

FOREIGN PATENT DOCUMENTS

| JP | 2003-089083 | 3/2003 |
| JP | 2003-112893 | 4/2003 |
| JP | 2003-116893 | 4/2003 |
| JP | 2003-220102 | 8/2003 |

* cited by examiner

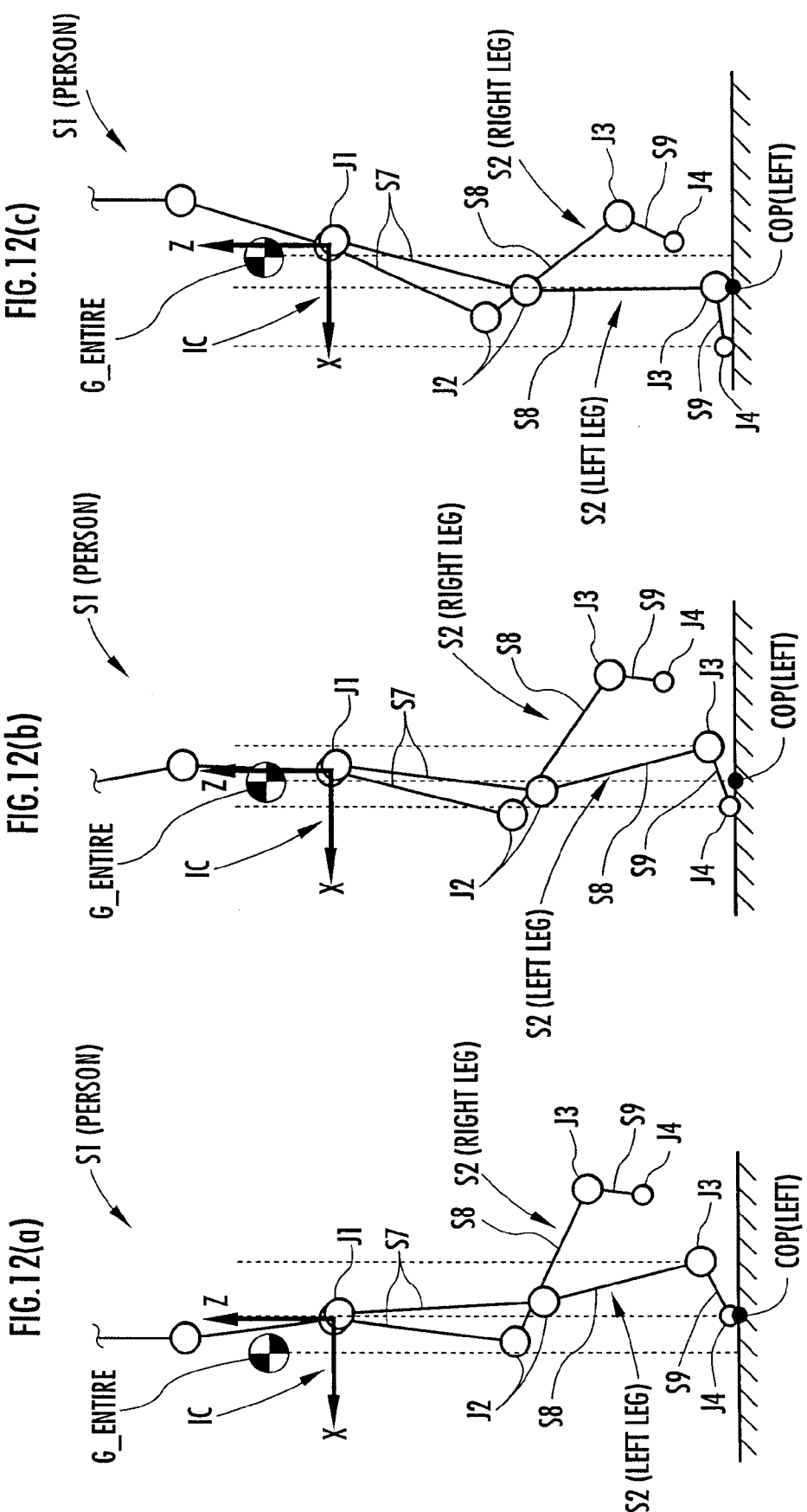

GENERATED TORQUE CONTROL METHOD FOR LEG BODY EXERCISE ASSISTIVE APPARATUS

FIELD OF THE INVENTION

The present invention relates to a generated torque control method for a leg body exercise assistive apparatus, which is attached to the legs of a person.

BACKGROUND ART

Conventionally, as this type of assistive apparatus, there is an already known apparatus disclosed in Japanese Patent Laid-Open No. 2003-220102 (hereinafter, referred to as "patent document 1"). The assistive apparatus of the patent document 1 includes moment generators on the hip joint, the knee joint, and the ankle joint of each leg of a person, with the moment generators connected to a foot supporting portion for supporting the foot of the person via beams. Moreover, it includes a sensor for detecting a force and moment acting between the foot supporting portion and the ground, a sensor for detecting a tilt angle of a beam, a sensor for detecting a force acting between the assistive apparatus and the person. On the basis of detected outputs of these sensors, a force to be generated by the each portion of the person is calculated when no support force (support torque) is applied by each moment generator, thereby causing each moment generator to generate a support force obtained by multiplying the calculated force by a certain reduction ratio. Thereby, the total load on the person is borne by the person and the assistive apparatus at a roughly predetermined ratio, so that the load on the person is reduced.

The apparatus of the patent document 1, however, calculates a force to be generated in each portion such as a joint of each leg by using the detected value of a force acting on the foot supporting portion of a landing leg when calculating a force to be generated in each portion of the person. Therefore, the calculated force is to be a force for supporting the total load of the person including the assistive apparatus. Therefore, even if the moment generator is caused to generate a certain rate of the calculated force as described above, the person makes a leg motion with being aware of the weight of the assistive apparatus attached to the person in a lot of situations during walking of the person. Consequently, the assistive apparatus easily causes a difference between an actual leg motion pattern and the motion pattern assumed by the person. Furthermore, it leads to causing an awkward leg motion or to making it hard for each moment generator to effectively generate a support torque, which enables a smooth leg motion.

As techniques for estimating joint moments to be generated in the joints of the legs during human walking, there have been known ones suggested by the present applicant, for example, in Japanese Patent Laid-Open No. 2003-89083 and Japanese Patent Laid-Open No. 2003-112893. The joint moments estimated using the techniques are necessary to support the total load of the person and the apparatus attached thereto. Therefore, even if the moment generators on the respective joints are caused to generate the predetermined rate of the joint moments calculated in these techniques, the same problem as the patent document 1 occurs.

DISCLOSURE OF THE INVENTION

In view of the above background, the present invention has been provided. Therefore, it is an object of the present invention to provide a generated torque control method for a leg body exercise assistive apparatus enabling a person to make a leg motion in such a feeling that the person is not wearing the leg body exercise assistive apparatus as much as possible by reducing the weight of the leg body exercise assistive apparatus attached to the person acting on the person.

To achieve the above object, according to a first feature of the present invention, there is provided a generated torque control method for a leg body exercise assistive apparatus of controlling generated torques of respective torque generation means in the leg body exercise assistive apparatus, which includes leg sections attached to both legs of a person so as to be movable integrally with the legs, with the leg sections each having a foot orthosis portion, which is disposed on the bottom side of the foot of each leg so as to be landing with the foot put on the foot orthosis portion during the landing period, being connected with joint regions corresponding to an ankle joint, a knee joint, and a hip joint of each leg, respectively, along the leg, and the torque generation means capable of generating support torques applied to at least the joint regions corresponding to the knee joint and the hip joint of the leg, the method comprising: a moment estimation step of sequentially estimating person-side joint moments, which are moments to be generated at least in the knee joint and the hip joint of each leg, in a situation where the person wearing the leg body exercise assistive apparatus is making a motion of his or her both legs, on the assumption that the person is making almost the same motion as the motion of the legs with the leg body exercise assistive apparatus removed from the person, and of sequentially estimating apparatus-side joint moments, which are moments to be generated in the joint regions of the leg body exercise assistive apparatus corresponding to at least the knee joint and the hip joint of each leg, respectively, on the assumption that the leg body exercise assistive apparatus is independently making almost the same motion as the motion of the person's legs; and a torque control step of controlling the torque generation means so as to generate a torque, as the support torque, which is obtained by adding the torque determined according to an estimated value of the person-side joint moment corresponding to the joint region concerned to a reference torque, assuming that an estimated value of the apparatus-side joint moment of each joint region corresponding to each of the knee joint and the hip joint of the leg is the reference torque to be generated by the torque generation means corresponding to the joint region concerned.

According to a second feature of the present invention, there is provided a method of controlling generated torques of respective torque generation means in the leg body exercise assistive apparatus, which includes leg sections attached to both legs of a person so as to be movable integrally with the legs, with the leg sections each having a foot orthosis portion, which is disposed on the bottom side of the foot of each leg so as to be landing with the foot put on the foot orthosis portion during the landing period, being connected with joint regions corresponding to an ankle joint, a knee joint, and a hip joint of each leg, respectively, along the leg, and the torque generation means capable of generating a support torque applied to the joint regions corresponding to the ankle joint, the knee joint, and the hip joint of the leg, respectively, the method comprising: a moment estimation step of sequentially estimating person-side joint moments, which are moments to be generated in the ankle joint, the knee joint, and the hip joint of each leg, in a situation where the person wearing the leg body exercise assistive apparatus is making a motion of his or her both legs, on the assumption that the person is making almost the same motion as the motion of the legs with the leg body exercise assistive apparatus removed from the person, and of sequentially estimating apparatus-side joint moments, which are moments to be generated in the joint regions of the leg body exercise assistive apparatus corresponding to the ankle joint, the knee joint, and the hip joint of each leg, respectively, on the assumption that the leg body exercise assistive apparatus is independently making almost the same motion as the motion of the person's legs; and a torque control step of controlling the torque generation means so as to generate a torque, as the support torque, which is obtained by adding a torque determined according to the estimated value of the person-side joint moment corresponding to the joint region concerned to a reference torque, assuming that an estimated value of the apparatus-side joint moment of each joint region corresponding to each of the ankle joint, the knee joint, and the hip joint is the reference torque to be generated by the torque generation means corresponding to the joint region concerned.

In the first and second features of the present invention, the moment estimation step includes the sequential estimation of person-side joint moments to be generated in the respective joints (at least the knee joint and the hip joint in the first feature of the invention, and the ankle joint, the knee joint, and the hip joint in the second feature of the invention) of each leg, in the situation where the person wearing the leg body exercise assistive apparatus is making the motion of his or her legs, on the assumption that the person is making almost the same motion as the motion of the legs with the leg body exercise assistive apparatus removed from the person. In other words, on the assumption that the person not wearing the leg body exercise assistive apparatus is independently making almost the same motion as the motion of the legs actually being made by the person wearing the leg body exercise assistive apparatus, the person-side joint moments to be generated in the joints of each leg are sequentially estimated. Therefore, the person-side joint moments estimated here are joint moments necessary for the person to make almost the same motion as the motion of the legs while supporting the person's own weight without help (more specifically, joint moments necessary for satisfying a dynamic balance relation between an inertia force generated by the motion of the person not wearing the leg body exercise assistive apparatus and a gravity and floor reaction forces acting on the person).

Moreover, the moment estimation step includes sequential estimation of the apparatus-side joint moments to be generated in the joint regions of the leg body exercise assistive apparatus, on the assumption that the leg body exercise assistive apparatus is independently (without help) making almost the same motion as the motion of the legs. Therefore, the apparatus-side joint moment estimated here are joint moments necessary for the leg body exercise assistive apparatus to make the same motion as the motion of the legs as if the leg body exercise assistive apparatus were supporting its own weight without help (more specifically, joint moments necessary for satisfying a dynamic balance relation between an inertia force generated by the independent motion of the leg body exercise assistive apparatus and a gravity and floor reaction forces acting on the leg body exercise assistive apparatus).

More specifically, in the moment estimation step, estimation is made for the person-side joint moment for making the leg motion while the person is supporting his or her own weight and the apparatus-side joint moment for making almost the same motion as the leg motion while the leg body exercise assistive apparatus is supporting its own weight separately from each other.

Furthermore, in the first and second features of the present invention, the torque control step includes generating torque obtained by adding a torque according to the estimated value of the person-side joint moment (for example, a torque of a predetermined rate of the person-side joint moment) corresponding to each joint region to a reference torque, assuming that the estimated value of the apparatus-side joint moment of the joint region concerned is the reference torque to be generated by the torque generation means corresponding to the joint region concerned. Therefore, the torque generation means generates the torque enabling the leg body exercise assistive apparatus to make the same motion as the person's leg motion without help as far as possible and at the same time supplementarily generates a torque for a part of the person-side joint moments to be generated by the respective joints of the person's legs. In this instance, reaction forces are necessary for generating the torque of the torque generation means, and many of the reaction forces are covered with floor reaction forces applied to the foot orthosis portion on the leg side during the landing period by the floor directly (without passing through the person).

Therefore, according to the first and second features of the present invention, it becomes possible to reduce the empty weight of the leg body exercise assistive apparatus, which is attached to the person, acting on the person, whereby the person can make the leg motion in such a feeling that the person is not wearing the leg body exercise assistive apparatus as far as possible.

Incidentally, in the first feature of the present invention, the torque generation means for applying the support torque to the ankle joint of each leg is not necessarily required. In this case, while the person incurs more percentage of the empty weight of the leg body exercise assistive apparatus in comparison with the second feature of the present invention, it is possible to reduce the percentage of the empty weight of the leg body exercise assistive apparatus incurred by the person to a relatively low level by applying the torque from the torque generation means to the joint regions corresponding to the hip joint and the knee joint of the leg body exercise assistive apparatus as described above. In order to minimize the percentage of the empty weight of the leg body exercise assistive apparatus that the person incurs, however, preferably the torque generation means applies the torque to the joint regions corresponding to the ankle joint, the knee joint, and the hip joint of each leg as described in the second feature of the present invention.

In the first and second features of the present invention, the person-side joint moment and the apparatus-side joint moment estimated in the moment estimation step may naturally be a moment around three axes (moment as a three-dimensional vector quantity) and may also be, for example, a moment around one axis viewed on the sagittal plane (the plane formed by the axis in the forward/backward direction of the person and the axis in the vertical direction) (moment around the axis perpendicular to the sagittal plane). In this case, in order to minimize the percentage of the empty weight of the leg body exercise assistive apparatus that the person incurs, it is thought to be preferable that the person-side joint moment and the apparatus-side joint moment estimated in the moment estimation step are moments around three axes (moments as three-dimensional vector quantities) and the torque that can be generated by the torque generation means are also three-dimensional quantities in principle. This, however, generally complicates or enlarges the structure of the leg body exercise assistive apparatus, thus inhibiting a smooth motion of the person's legs, instead.

The motion of each leg during human walking is mainly a bending and stretching motion. The bending and stretching motion is made by rotating the hip joints, the knee joints, and the ankle joints of the legs each around the axis substantially perpendicular to the plane passing through the respective joints. Therefore, according to the third feature of the present invention, the person-side joint moment and the apparatus-side joint moment estimated in the moment estimation step are considered as moments around the axis substantially perpendicular to a leg plane as a plane passing through the hip joint, the knee joint, and the ankle joint of each leg of the person. In this case, the support torque generated by the torque generation means is a torque around the axis substantially perpendicular to the leg plane.

According to the third feature of the present invention, the estimated person-side joint moment and apparatus-side joint moment may be components around one axis and the torque generated by the torque generation means may also be a torque around one axis. Therefore, the structure of the leg body exercise assistive apparatus can be compact and simple. At the same time, the torque generated by the torque generation means is controlled by estimating the person-side joint moment and the apparatus-side joint moment related to the bending and stretching motion, which is the main human leg motion, thereby achieving an effective reduction of the load on the person applied by the empty weight of the leg body exercise assistive apparatus.

Moreover, in the first or second feature of the present invention, there may be a wide variety of techniques (modes of the moment estimation step) for estimating the person-side joint moment and the apparatus-side joint moment. Preferably, however, the moment estimation step includes: a first step of sequentially grasping an acceleration of a predetermined region of the person or the leg body exercise assistive apparatus; a second step of sequentially grasping displacements of the hip joint, the knee joint, and the ankle joint of each leg of the person; a third step of sequentially estimating floor reaction forces acting on the person and the application point thereof, on the assumption that almost the same motion as the motion of both legs of the person is being made with the leg body exercise assistive apparatus removed from the person; a fourth step of sequentially estimating floor reaction forces acting on the leg body exercise assistive apparatus and the application point thereof, on the assumption that the leg body exercise assistive apparatus is independently making almost the same motion as the motion of both legs of the person; a fifth step of estimating the person-side joint moment by inverse dynamics calculation processing by using the acceleration grasped in the first step, the displacements grasped in the second step, the floor reaction forces and the application point thereof estimated in the third step, and a person-side rigid link model which represents the person as a link body formed of a plurality of rigid elements and joint elements; and a sixth step of estimating the apparatus-side joint moment by using the acceleration grasped in the first step, the displacements grasped in the second step, the floor reaction forces and the application point thereof estimated in the fourth step, and an apparatus-side rigid link model which represents the leg body exercise assistive apparatus as a link body formed of a plurality of rigid elements and joint elements (a fourth feature of the present invention).

More specifically, relative positional relations and dynamic relations (relations between force and motion) of the person's respective portions (the regions corresponding to the elements of the person-side rigid link model) are determined by grasping the acceleration of the predetermined region of the person or the leg body exercise assistive apparatus and the displacements of the hip joint, the knee joint, and the ankle joint of each leg of the person, estimating the floor reaction forces acting on the person and the application point thereof on the assumption that almost the same motion as the motion of both legs of the person is being made with the leg body exercise assistive apparatus removed from the person, and using the grasped or estimated physical quantities and the person-side rigid link model. Therefore, the person-side joint moment can be estimated by so-called inverse dynamics calculation processing. Generally speaking, the inverse dynamics calculation is arithmetic processing of estimating a reaction force or a moment, which are internal forces of the object, on the assumption that the external forces acting on the object and positional information are already known (with the external forces and the positional information as input parameters). In this case, the floor reaction force is already known as an external force acting on each leg and therefore the person-side joint moments can be estimated in order from a joint relatively close to the floor (in the order of the ankle joint, the knee joint, and the hip joint) by the inverse dynamics calculation.

Similarly, the relative positional relations and the dynamic relations (relations between force and motion) of the respective portions of the leg body exercise assistive apparatus (the regions corresponding to the elements of the apparatus-side rigid link model) are determined by using the grasped acceleration and displacements, the floor reaction forces and the application point thereof estimated in the fourth step, and the apparatus-side rigid link model. Therefore, the apparatus-side joint moment can be estimated by the inverse dynamics calculation processing.

Incidentally, the acceleration and the displacements can be grasped by using an acceleration sensor, a rotation angle sensor, or the like. The floor reaction forces and the application point thereof can be estimated by using the grasped acceleration and joint displacements, the person-side and apparatus-side rigid link models, and the like.

In the fourth feature of the present invention, similarly to the third feature of the present invention, preferably, in cases where the person-side joint moment estimated in the fifth step and the apparatus-side joint moment estimated in the sixth step are moments around an axis substantially perpendicular to a leg plane as a plane passing through the hip joint, the knee joint, and the ankle joint of each leg of the person, where the acceleration grasped in the first step, the floor reaction forces and the application point thereof estimated in the third step, and the floor reaction forces and the application point thereof estimated in the fourth step are all three-dimensional quantities, and where the displacements of the hip joint, the knee joint, and the ankle joint of each leg grasped in the second step each include an amount of rotation around an axis substantially perpendicular to the leg plane of the leg and the displacement of the hip joint is a three-dimensional quantity, the generated torque control method further includes: a seventh step of sequentially grasping an acceleration of a predetermined reference point fixed to a person's predetermined region as a three-dimensional quantity by using at least the acceleration grasped in the first step; an eighth step of sequentially grasping the positions and postures on the leg plane of the elements of each leg section of the person-side rigid link model by using at least the displacements grasped in the second step and the person-side rigid link model; a ninth step of grasping the positions and postures on the leg plane of the elements of each leg section of the apparatus-side rigid link model by using at least the displacements grasped in the second step and the apparatus-side rigid link model, wherein the fifth step includes estimating the person-side joint moment by using a two-dimensional quantity, which is obtained by projecting the acceleration of the predetermined reference point grasped in the seventh step and the floor reaction forces and the application point thereof estimated in the third step onto the leg plane corresponding to each leg according to the displacement of the hip joint, and the positions and postures grasped in the eighth step and wherein the sixth step includes estimating the apparatus-side joint moment by using a two-dimensional quantity, which is obtained by projecting the acceleration of the predetermined reference point grasped in the seventh step and the floor reaction forces and the application point thereof estimated in the fourth step onto the leg plane corresponding to each leg according to the displacement of the hip joint, and the positions and postures grasped in the ninth step (a fifth feature of the present invention).

In this regard, the amount of rotation around the axis substantially perpendicular to the leg plane of the hip joint, the knee joint, and the ankle joint of each leg grasped in the second step can be grasped relatively accurately by using a rotation angle sensor such as a potentiometer or a rotary encoder. Then, according to the fifth feature of the present invention, even if the motion of each leg of the person is a three-dimensional motion, which includes a motion (abduction, external rotation, adduction, internal rotation, or the like) other than the two-dimensional motion on the leg plane, it is possible to grasp the positions and postures on the leg plane of the person-side rigid link model and the positions and postures on the leg plane of the apparatus-side rigid link model relatively accurately in the eighth step and the ninth step. Moreover, in consideration of a spatial (three-dimensional) motion of the person and the leg body exercise assistive apparatus attached thereto, the acceleration of the reference point, the floor reaction forces acting on the person and the position of the application point thereof, and the floor reaction forces acting on the leg body exercise assistive apparatus and the position of the application point thereof are grasped as three-dimensional quantities (vector quantities expressed in a certain three-dimensional coordinate system) in the seventh step, the third step, and the fourth step. Then, they are projected onto the leg plane related to the leg according to the displacement (a three-dimensional quantity) of the hip joint of the leg, thereby making it possible to obtain two-dimensional quantities on the leg plane (more specifically, components on the plane parallel to the leg plane) of the acceleration of the reference point, the floor reaction forces acting on the person, and the application point thereof, and the floor reaction forces acting on the leg body exercise assistive apparatus and the application point thereof. In the fifth step, the person-side joint moment is then estimated in the inverse dynamics calculation processing on the leg plane by using the two-dimensional quantities on the leg plane of the acceleration of the reference point, the floor reaction forces acting on the person, and the application point thereof, and the positions and postures on the leg plane of the elements of the person-side rigid link model grasped in the eighth step. Similarly, the apparatus-side joint moment is estimated in the inverse dynamics calculation processing on the leg plane by using the two-dimensional quantities on the leg plane of the acceleration of the reference point, the floor reaction forces acting on the leg body exercise assistive apparatus, and the application point thereof and the positions and postures on the leg plane of the elements of the apparatus-side rigid link model grasped in the ninth step. By estimating the person-side joint moment and the apparatus-side joint moment and the apparatus-side joint moment around the axis substantially perpendicular to the leg plane in this manner, it becomes possible to estimate the components around the axis substantially perpendicular to the leg plane of each of the joint moments with sufficient estimation accuracy and to prevent excessive changes in the components. Consequently, the torque generated by the respective torque generation means can be made suitable for stably reducing the load on the person generated by the empty weight of the leg body exercise assistive apparatus.

Moreover, in the fourth or fifth feature of the present invention, preferably the third step includes estimating the floor reaction forces acting on the person and the application point thereof by using at least the acceleration grasped in the first step, the displacements grasped in the second step, and the person-side rigid link model and the fourth step includes estimating the floor reaction forces acting on the leg body exercise assistive apparatus and the application point thereof by using at least the acceleration grasped in the first step, the displacements grasped in the second step, and the apparatus-side rigid link model (a sixth feature of the present invention).

The motion state (eventually, the inertia force) of each part of the person can be known by using the acceleration of a predetermined region of the person or the leg body exercise assistive apparatus, the displacements of the joints of each leg of the person, and the person-side rigid link model, thereby allowing an estimation of the floor reaction forces acting on the person by his or her own weight and the application point thereof by a dynamic or geometric calculation. Similarly, by using the acceleration of a predetermined region of the person or the leg body exercise assistive apparatus, the displacements of the joints of each leg of the person, and the apparatus-side rigid link model, it is possible to estimate the floor reaction forces acting on the leg body exercise assistive apparatus by its own weight and the application point thereof. As mentioned above, the leg body exercise assistive apparatus can be downsized by reducing the sensors or the like to be attached to the person by using the acceleration or the like in the predetermined region to estimate the floor reaction forces and the application point thereof. Moreover, in this case, the acceleration sensor necessary for grasping the acceleration is only required to be attached to the region corresponding to a rigid element of either the person-side rigid link model or the apparatus-side rigid link model, thus providing a high degree of freedom in the place where it is attached. Thereby, it is possible to prevent an attachment of a sensor in a place interfering with the leg motion of the person as much as possible.

BRIEF DESCRIPTION OF THE DRAWINGS

FIGS. 12(a) to (c) are diagrams for explaining estimation processing of a floor reaction force application point on a sagittal plane of the person;

BEST MODE FOR CARRYING OUT THE INVENTION

Figure 1:
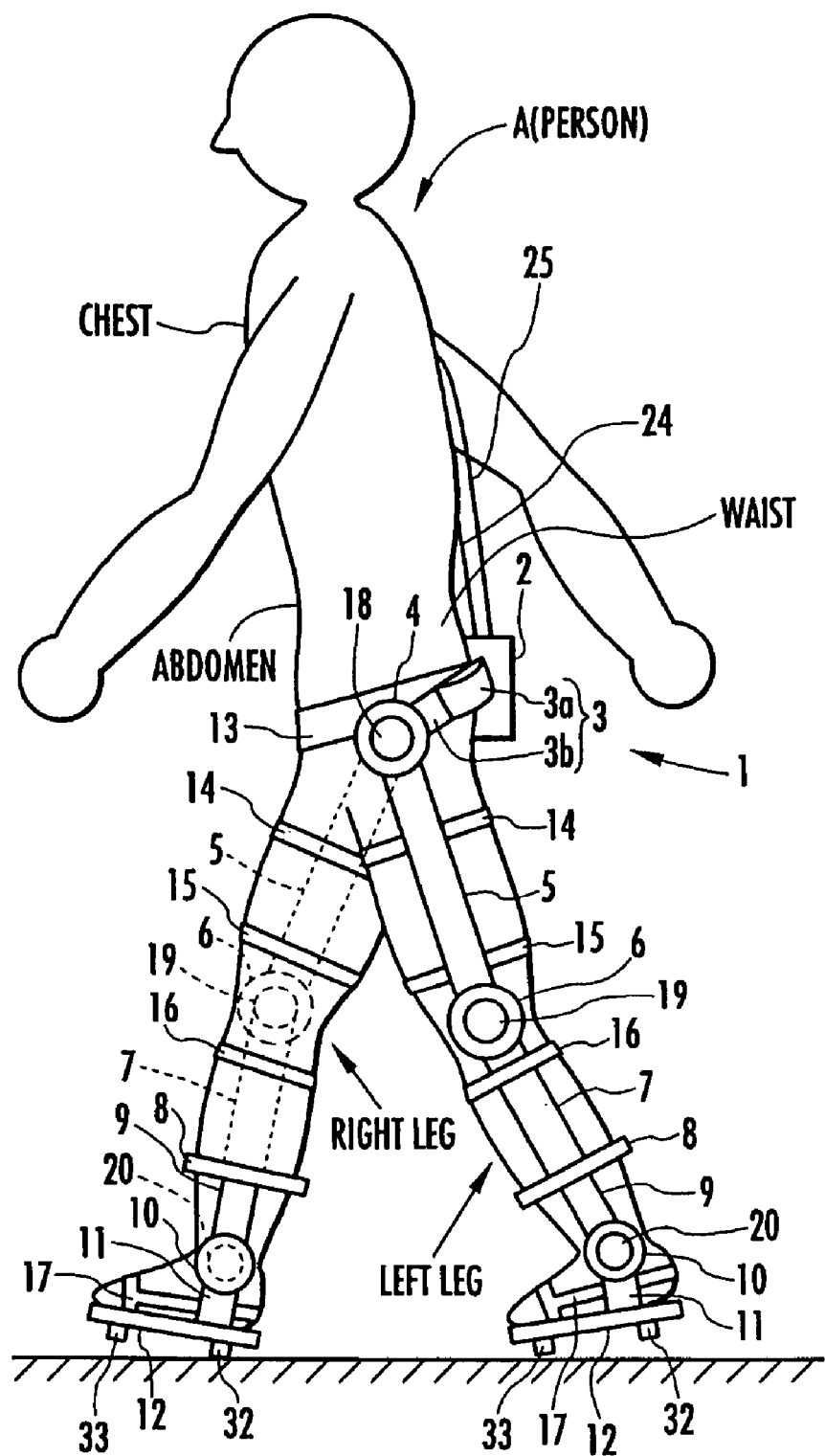
FIG. 1 is a lateral view showing a person wearing a leg body exercise assistive apparatus according to a first embodiment.
Figure 2:
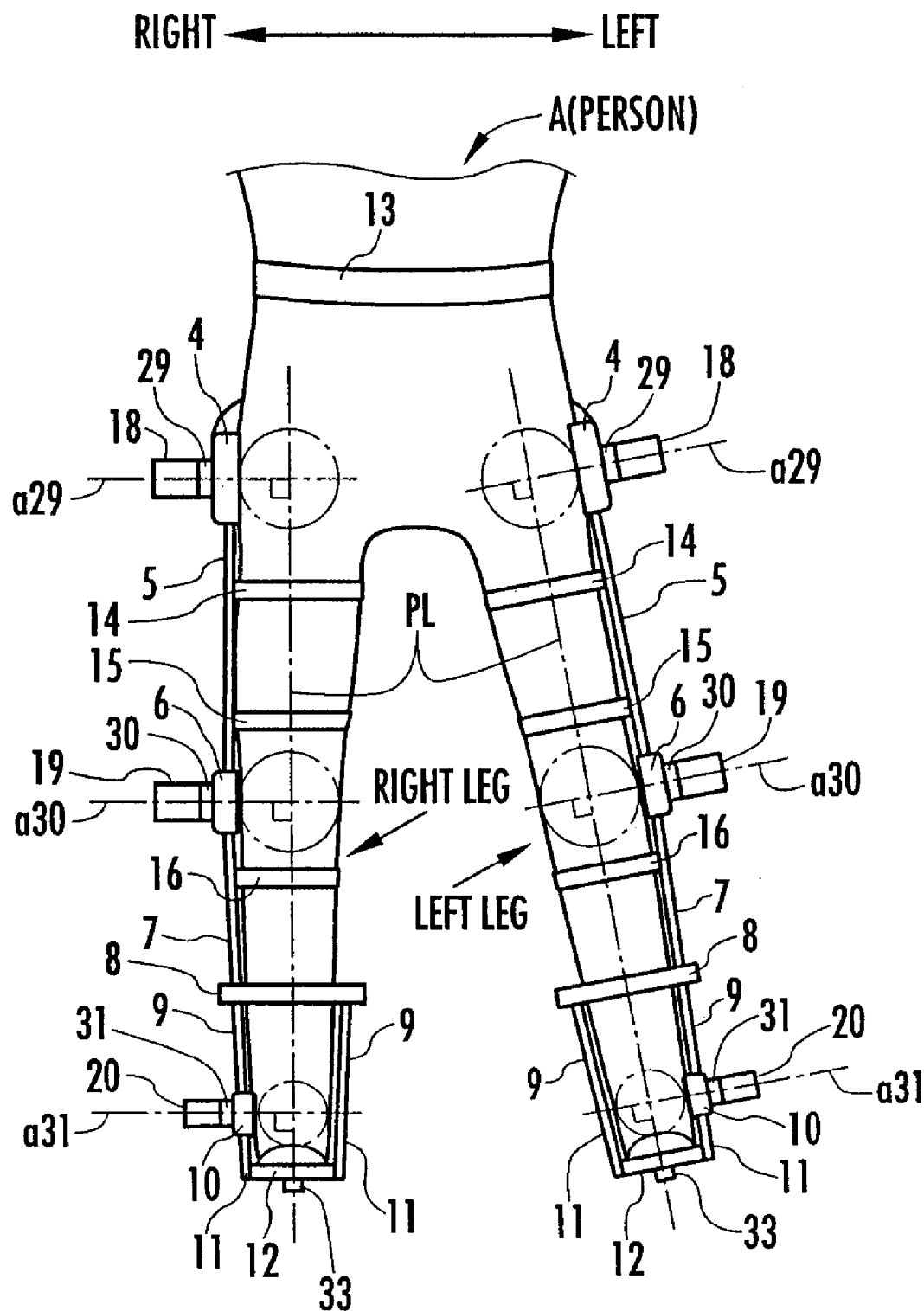
FIG. 2 is a front view showing a lower part of the body of the person wearing the leg body exercise assistive apparatus shown in FIG. 1.

An embodiment (a first embodiment) of the present invention will be described below by using FIG. 1 to FIG. 19. This embodiment is intended for the first and second features of the present invention. FIG. 1 shows a state where a person A is wearing a leg body exercise assistive apparatus 1 according to this embodiment, by means of a lateral view. FIG. 2 shows a lower part of the body of the person A wearing the leg body exercise assistive apparatus 1, by means of a front view. In FIG. 2, the hip joint, the knee joint, and the ankle joint of each leg of the person A are illustrated in chain-and-dash line circles, respectively, for purposes of the description.

In these FIG. 1 and FIG. 2, the leg body exercise assistive apparatus 1 (hereinafter, simply referred to as the assistive apparatus 1) includes a sensor box 2 attached to the back of the waist of the person A, a waist link member 3 extended from the sensor box 2 to the place of the hip joint of each leg of the person A, a thigh link member 5 extended from the waist link member 3 to the place of the knee joint along the thigh of each leg via the hip joint region 4, a first crus link member 7 extended from the thigh link member 5 along the crus of each leg via the knee joint region 6 and then connected to the crus annular member 8 externally inserted in the lower part of the crus (on the upper side of the ankle joint) of the leg, a second crus link member 9 extended from the crus annular member 8 to the place of the ankle joint of each leg, and a foot link member 11 extended from the second crus link member 9 toward the bottom face of the foot of each leg via the ankle joint region 10 and connected to the foot orthosis portion 12 in the form of flat plate abutted against the bottom face of the foot. The sensor box 2 is fixed to the waist via the belt 13 or the like, the thigh link member 5 is fixed to the thigh of each leg via belts 14, 15 or the like, the crus link member 7 is fixed to the crus of each leg via a belt 16 or the like, and the foot orthosis portion 12 is fixed to the foot of each leg via a belt 17 or the like.

The hip joint region 4, the knee joint region 6, and the ankle joint region 10 are located in the positions corresponding to the hip joint, the knee joint, and the ankle joint of each leg of the person A, respectively, and they are assumed to be rotatable with the bending and stretching motion of the leg (capable of making a rotary motion around an axis generally perpendicular to the surface of the page showing FIG. 1 (more specifically, around an axis substantially perpendicular to the leg plane described later)). Moreover, the waist link member 3 has a portion 3a relatively close to the sensor box 2 being formed by a hard rigid member and a portion 3b relatively close to the hip joint region 4 being formed by an elastic material such as rubber. The elastic portion 3b is deformed, thereby allowing an abduction or adduction motion of the leg of the person A (a motion of rotating the thigh of the leg around the hip joint in the horizontal direction of the person A) or a swinging motion (a motion of rotating the thigh of the leg relative to the waist around the central axis substantially in the vertical direction). Moreover, the second crus link member 9 is attached to the crus annular member 8 in such a way as to be capable of making a swinging motion relative to the first crus link member 7, thereby allowing a swinging motion around the ankle joint of the foot (a motion of rotating the foot around the central axis of the crus).

A lower part from each hip joint region 4 down (including the hip joint region 4) of the assistive apparatus 1 having the above structure is a leg section corresponding to each leg of the person A.

The assistive apparatus 1 has electric motors 18, 19, and 20 as torque generation means, which are located in the hip joint region 4, the knee joint region 6, and the ankle joint region 10 of each leg and apply torques to the respective joint regions. These electric motors 18 to 20 are disposed on the lateral surfaces (the right side surface of the right leg and the left side surface of the left leg). In this case, the electric motor 18 can generate a torque for rotating the thigh link member 5 around the rotation axis of the hip joint region 4 relative to the waist link member 3, the electric motor 19 can generate torque for rotating the first and second crus link members 7, 9 around the rotation axis of the knee joint region 6 relative to the thigh link member 5, and the electric motor 20 can generate a torque for rotating the foot link member 11 and the foot orthosis portion 12 around the rotation axis of the ankle joint region 10 relative to the first and second crus link members 7, 9. Incidentally, the torque generation means may use, for example, a pneumatic actuator, instead of an electric motor.

Figure 3:
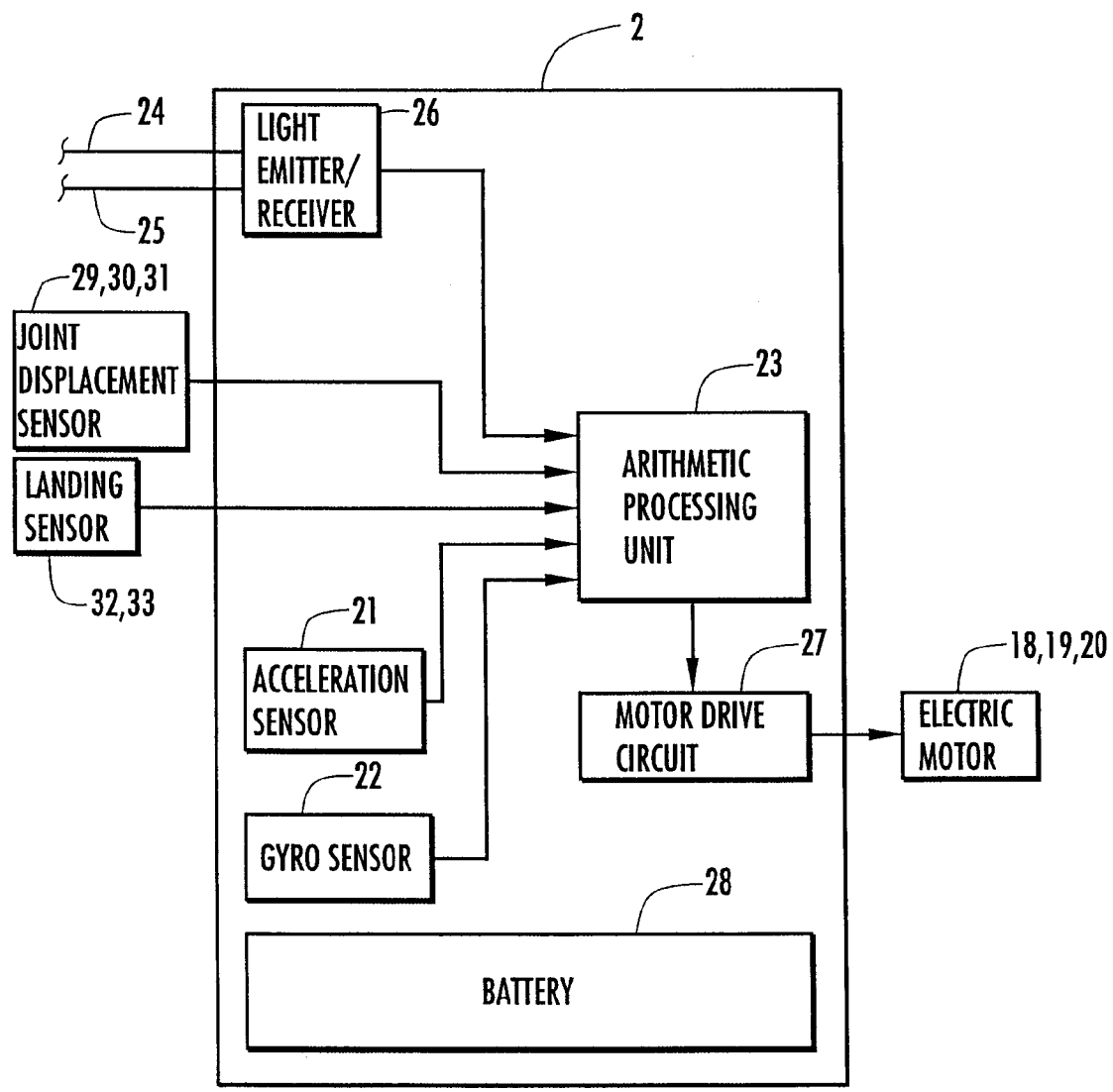
FIG. 3 is a block diagram showing an internal configuration of a sensor box of the leg body exercise assistive apparatus shown in FIG. 1.

As shown in the block diagram of FIG. 3, the sensor box 2 contains an acceleration sensor 21 for detecting 3-axis acceleration (translation acceleration), a gyro sensor 22 for detecting a 3-axis angular velocity, an arithmetic processing unit 23 configured using a microcomputer, an light emitter/receiver 26 for emitting a light to be introduced to optical fibers 24, 25 described later or receiving a feedback light, a motor drive circuit 27 for controlling generated torque of the electric motors 18 to 20 upon receiving a command of the arithmetic processing unit 23, and a battery 28 as a power supply for each electrical equipment such as the arithmetic processing unit 23. Detected outputs of the light emitter/receiver 26, the acceleration sensor 21, and the gyro sensor 22 are input to the arithmetic processing unit 23. The acceleration sensor 21 and the gyro sensor 22 are fixed to the waist via the sensor box 2 and the band 13 in such a way as to move integrally with the waist.

The assistive apparatus 1 has a sensing structure as described below, in addition to the acceleration sensor 21 and the gyro sensor 22.

Specifically, as shown in FIG. 2, the hip joint region 4, the knee joint region 6, and the ankle joint region 10 are provided with the joint displacement sensors 29, 30, and 31 for detecting displacements (rotation angles) of the hip joint, the knee joint, and the ankle joint of the person A, respectively. Detected outputs of the joint displacement sensors 29 to 31 are input to the arithmetic processing unit 23 of the sensor box 2 via signal lines, not shown. The displacement detected by the joint displacement sensor 29 of the hip joint region 4 among the joint displacement sensors 29 to 31 is a 3-axis rotation angle of (a three-dimensional quantity made of a combination of rotation angles around three axes) of the hip joint of the person A, the displacement detected by the joint displacement sensor 30 of the knee joint region 6 is a single-axis rotation angle of the knee joint of the person A, and the displacement detected by the joint displacement sensor 31 of the ankle joint region 10 is a single-axis rotation angle of the ankle joint of the person A. In this case, the rotation axis of one of the rotation angles detected by the joint displacement sensor 29 and the rotation axes of the rotation angles detected by the joint displacement sensors 30, 31 are, as shown in FIG. 2, axes a29, a30, and a31 substantially perpendicular to the leg plane PL (a plane perpendicular to the surface of the page of FIG. 2) as a plane passing through substantially the center of the hip joint, the knee joint, and the ankle joint of the leg corresponding to the joint displacement sensors 29 to 31, respectively. These axes a29, a30, and a31 are rotation axes of the hip joint region 4, the knee joint region 6, and the ankle joint region 10, respectively. The joint displacement sensors 29 to 31 are configured so as to detect the rotation angles around the rotation axes a29, a30, and a31 of the hip joint, the knee joint, and the ankle joint, respectively, by using a potentiometer or a rotary encoder.

In this regard, the leg plane PL is supplementarily described. On the leg plane PL, there are the center points of the hip joint, the knee joint, and the ankle joint of the leg when the person A bends and stretches the corresponding leg by bending the leg at the knee joint. In other words, each leg is bent and stretched with the center points of the hip joint, the knee joint, and the ankle joint positioned substantially on the leg plane PL. In addition, for example, if the left leg is abducted by a motion of the hip joint like the left leg shown in FIG. 2, the leg plane PL corresponding to the left leg inclines relative to the vertical direction.

Rotation angles around other two axes detected by the joint displacement sensor 29 of the hip joint region 4 are those around two axes parallel to the leg plane PL of the corresponding leg, but not parallel to each other. Moreover, the rotation angles are detected by using a strain sensor for detecting a volume of deformation of the elastic portion 3b of the waist link member 3 or a sensor using optical fibers described later.

As shown in FIG. 1, two optical fibers 24, 25 introduced from the sensor box 2 are extended upward along the back face (back) of the body of the person A and their points are fixed to the back face of the abdomen and the back face of the chest of the person A, respectively, via a band or other member not shown. The optical fibers 24, 25 are components of detection means for detecting tilt angles (tilt angles on the sagittal plane) of the abdomen and the chest relative to the waist. The tilt angles of the abdomen and the chest are measured using the optical fibers 24, 25 in the method described below. The method of measuring the tilt angle of the abdomen using the optical fiber 24 will now be typically described. A light having a predetermined intensity is introduced from the light emitter/receiver 26 in the sensor box 2 into the optical fiber 24 and the introduced light is reflected on the end of the optical fiber 24 and returns to the sensor box 2 side. The light emitter/receiver 26 then detects the feedback amount of the light (the intensity of the feedback light). The optical fiber 24 is provided with a plurality of notches (not shown) allowing subtle light leakage disposed at intervals in the longitudinal direction. Therefore, light of the amount according to the tilt angle of the abdomen relative to the waist leaks from the optical fiber 24 via the notches, out of the light introduced into the optical fiber 24. Therefore, the feedback amount of the light to the sensor box 2 side depends upon the tilt angle of the abdomen and the tilt angle of the abdomen relative to the waist is measured by detecting the feedback amount. In other words, a detected output of the light emitter/receiver 26 according to the feedback amount of the light of the optical fiber 24 depends upon the tilt angle of the abdomen relative to the waist and it is input to the arithmetic processing unit 23 as a signal indicating the tilt angle. The same applies to the method of measuring the tilt angle of the chest using the optical fiber 25.

Incidentally, the rotation angles of the hip joint, the knee joint, and the ankle joint detected by the joint displacement sensors 29 to 31 are measured with reference (zero point) to a state where the person A stands upright with both feet directed forward in parallel (hereinafter, referred to as the reference posture condition). The same applies to the tilt angles of the abdomen and the chest detected by using the optical fibers 25, 26.

Moreover, as shown in FIG. 1 the assistive apparatus 1 has two landing sensors 32, 33 on the bottom face of each foot orthosis portion 12. Regarding the landing sensors 32, 33, the landing sensor 32 is disposed in the part (heel) just under the ankle joint and the landing sensor 33 is disposed in the part (toe) just under the metatarsophalangeal joint of the foot (a joint at the root of the big toe of the foot). These landing sensors 32, 33 output ON/OFF signals indicating whether the parts where they are disposed are in contact with the ground. Incidentally, detected outputs of the landing sensors 32, 33 are input to the arithmetic processing unit 23 of the sensor box 2 via signal lines (not shown).

The configuration of the assistive apparatus 1 has been described hereinabove. In this type of assistive apparatus 1, the foot orthosis portion 12 is brought into contact with the ground with the foot of the leg placed on the foot orthosis portion 12. In this case, for example, in a state where the person A stands upright, almost the entire weight of the assistive apparatus 1 acts on the floor (ground) via both foot orthosis portions 12, 12 while not acting on the person A almost at all.

Figure 4:
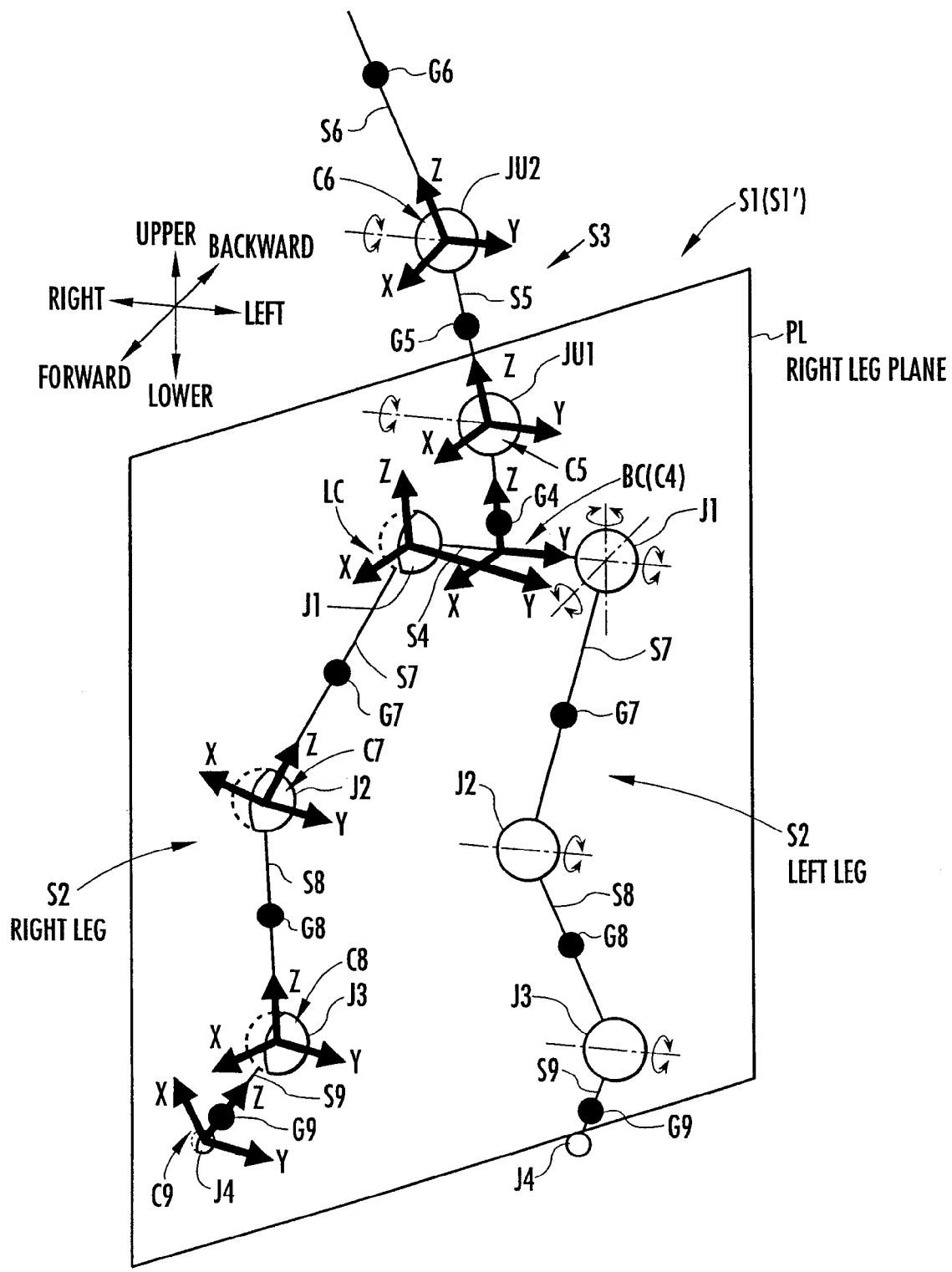
FIG. 4 is a diagram showing a structure of a person-side rigid link model and an apparatus-side rigid link model for use in control processing of the leg body exercise assistive apparatus shown in FIG. 1.

The following describes a rigid link model (geometric model) of the person A, a rigid link model (geometric model) of the assistive apparatus 1, and coordinate systems used in this embodiment. Referring to FIG. 4, there is shown a structure and a coordinate system for the rigid link model S1 of the person A. As described later, the basic structure of the rigid link model of the assistive apparatus 1 is assumed to be the same as that of the rigid link model S1 of the person A in this embodiment. Therefore, FIG. 4 shows the structure of the rigid link model of the assistive apparatus 1, too. Accordingly, the reference symbol S1' indicating the rigid link model of the assistive apparatus 1 is put in parentheses in FIG. 4.

As shown in FIG. 4, the rigid link model S1 of the person A is represented as a link body formed of nine rigid elements and eight joint elements in this embodiment. In FIG. 4, each rigid element is represented by a line segment and each joint element is represented by a circle (except one indicated by the reference character J4). More specifically, the rigid link model S1 is roughly composed of a pair of leg sections S2, S2 corresponding to the legs of the person and an upper body section S3 corresponding to the upper part of the body (the upper part from the waist) of the person. The upper body section S3 is configured as a link body wherein a rigid element S4 corresponding to the waist of the person is coupled to a rigid element S5 corresponding to the abdomen via a joint element JU1 and further the rigid element S5 is coupled to a rigid element S6 corresponding to the chest via a joint element JU2. Hereinafter, the rigid elements S4 to S6 are respectively referred to as the waist element S4, the abdomen element S5, and the chest element S6 in some cases, and the joint elements JU1 and JU2 are respectively referred to as the lower joint of the upper body JU1 and the upper joint of the upper body JU2 in some cases.

In this case, the lower joint of the upper body JU1 is disposed at the upper end of the waist element S4 and a pair of joint elements J1, J1 corresponding to a pair of hip joints (hereinafter, simply referred to as the hip joint J1 in some cases) of the person A are disposed at right and left both ends of the lower part of the waist element S4. Moreover, the lower joint of the upper body JU1 corresponds to a joint supposed on the backbone of the person A in the vicinity of the border between the waist and the abdomen of the person A, and the upper joint of the upper body JU2 corresponds to a joint supposed on the backbone of the person A in the vicinity of the border between the abdomen and the chest. In the rigid link model S1, the bending motion of the upper body section S3 corresponding to the bending motion of the body of the person A is made by two joint elements of the lower joint of the upper body JU1 and the upper joint of the upper body JU2.

Each leg section S2 of the rigid link model S1 is configured as a link body wherein a thigh element S7 as a rigid element corresponding to the thigh of the person is coupled to the waist element S4 via the hip joint J1, a crus element S8 as a rigid element corresponding to the crus is coupled via a joint element J2 corresponding to the knee joint, and a foot element S9 as a rigid element corresponding to the foot is coupled via a joint element J3 corresponding to the ankle joint. Hereinafter, the rigid elements S7 to S9 are simply referred to as the thigh element S7, the crus element S8, and the foot element S9 and the joint elements J2, J3 are simply referred to as the knee joint J2 and the ankle joint J3, respectively, in some cases.

In FIG. 4, the part indicated by the reference character J4 at the tip of the foot element S9 corresponds to the metatarsophalangeal joint (hereinafter, referred to as the MP joint), which is a joint at the root of the big toe of the foot of the person. In the rigid link model S1, the part J4 does not have a function of a joint, but hereinafter the part J4 is referred to as the MP joint for convenience.

The rigid elements and the joint elements of the rigid link model S1 of the person A configured as described above are capable of making a motion in such a way that the mutual positional relationship and posture relationship (directional relationship) of the elements are coincident with the mutual positional relationship and posture relationship of the respective portions of the person corresponding to the rigid elements and the joint elements by means of the rotary motions of the joint elements. In this case, the lower joint of the upper body JU1 and the upper joint of the upper body JU2 are assumed to be rotatable around three axes. By using one of the three axes as a measurement axis, a rotation around the measurement axis (arrows (rotation arrows) corresponding to the joint elements JU1, JU2 shown in FIG. 4) is measured. In this embodiment, the measurement axis is parallel to a line segment connecting the centers of the pair of hip joints J1, J1. In addition, the hip joint J1 of the each leg section S2 is assumed to be rotatable around three axes as indicated by arrows (rotation arrows) typically shown in FIG. 4 regarding the hip joint J1 of the left leg section S2. Moreover, the knee joint J2 and the ankle joint J3 of the each leg section S2 are assumed to be rotatable around a single axis as indicated by the arrows (rotation arrows) typically shown in FIG. 4 regarding the joint elements J2, J3 of the left leg section S2, respectively. The rotation axis of the knee joint J2 and that of the ankle joint J3 are perpendicular to the leg plane PL (not shown for the left leg section S2 in FIG. 4) passing through the centers of the hip joint J1, the knee joint J2, and the ankle joint J3. The rotating motion of the hip joint J1, the knee joint J2, and the ankle joint J3 of the right leg section S2 is the same as in the left leg section S2. In this case, the each rotation axis (a single axis) of the knee joint J2 and the ankle joint J3 of the right leg section S2 is perpendicular to the leg plane PL shown correspondingly to the right leg section S2. The each hip joint J1 can rotate around the three axes regarding both leg sections S2 and therefore can rotate around the axis perpendicular to the leg plane PL corresponding to each leg section S2.

In the rigid link model S1, the weight, the length (the length in the segment direction in FIG. 4) of the each rigid element and the center of gravity location of the each rigid element (the position in the element coordinate system fixed to the each rigid element described later) are predetermined and stored in a memory, not shown, in the arithmetic processing unit 23. Black dots G6, G5, G4, G7, G8, and G9 shown in FIG. 4 illustratively indicate the centers of gravity of the chest element S6, the abdomen element S5, the waist element S4, the thigh element S7, the crus element S8, and the foot element S9, respectively. As supplementary information, the waist element S6 is coupled to the three joint elements JU1, J1, and J1 and therefore the length of the waist element S6 includes the length of a line segment between both hip joints J1, J1 and the length of a line segment between the midpoint of the above line segment and the lower joint of the upper body JU1. Instead of the length of the each rigid element, the positions of the endpoints of the rigid element in the element coordinate system fixed to the rigid element concerned may be previously stored in the arithmetic processing unit 23.

The weight, the length, and the center of gravity location of each rigid element of the rigid link model S1 are basically set so as to be substantially coincident with the weight, the length, and the center of gravity location of the region (rigid equivalent part) of the person corresponding to each rigid element. For example, the weight, the length, and the center of gravity location of the thigh element S7 are substantially the same as the actual weight, the length, and the center of gravity location of the thigh of the person. The weight, the length, and the center of gravity location of each rigid element of the rigid link model S1 are the weight, the length, and the center of gravity location in a state where the person A is not wearing the assistive apparatus 1. Moreover, the weight and the center of gravity location of the chest element S6 are the weight and the center of gravity location of the chest, and both arms, and the head of the person included. As supplementary information, the change in the center of gravity location of the chest element S6 accompanying the motion of both arms (the motion of swinging the arms back and forth) of the person during walking is relatively small and therefore the center of gravity location is maintained at a substantially fixed position of the chest element S6.

While the weight, the length, and the center of gravity location of each rigid element of the rigid link model S1 may be basically determined based on the actual measurements of the size or the weight of each part of the person, it is also possible to estimate them on the basis of average statistical data of a human being from the height and the weight of the person. In general, the center of gravity location, the weight, and the length of the rigid equivalent part of the person corresponding to each rigid element have a correlation with the height and the weight (the entire weight) of a human being, and it is possible to estimate the center of gravity location, the weight, and the length of the rigid equivalent part of the person corresponding to each rigid element relatively accurately from measurement data of the height and the weight of the person on the basis of the correlation.

Although the centers of gravity G4 to G9 are located on the central axes of the rigid elements corresponding to them respectively (on the shown line segments) in FIG. 4 for convenience, they are not necessarily located on the central axes, but can exist in the positions deviating from the central axes, respectively.

In this embodiment, a coordinate system as described below is preset for the rigid link model S1. More specifically, as shown in FIG. 4, a body coordinate system BC is set so as to be fixed to the waist element S4. The body coordinate system BC is established as a three-dimensional coordinate system (XYZ coordinate system) whose origin is defined as being the midpoint of a line segment between the centers of the pair of hip joints J1, J1, whose Y axis is defined as being in the direction of the line segment, whose Z axis is defined as being in the direction from the origin toward the center of the lower joint of the upper body JU1, and whose X axis is defined as being in the direction perpendicular to the Y axis and the Z axis. In the reference posture condition of the person A, the X axis, the Y axis, and the Z axis of the body coordinate system BC are oriented in the forward/backward direction, the right/left direction, and the up/down direction (vertical direction) of the person A, respectively, and the XY plane is a horizontal plane. In this embodiment, the origin of the body coordinate system BC corresponds to the reference point in the present invention.

A leg coordinate system LC is fixed and set to the leg plane PL corresponding to each leg section S2. In FIG. 4, only the leg coordinate system LC corresponding to the leg plane Pl of the right leg section S2 is typically shown for convenience. The leg coordinate system LC is a three-dimensional coordinate system (XYZ coordinate system) whose origin is the center of the hip joint J1 on the leg plane PL, with the Y axis in the direction perpendicular to the leg plane PL, with the Z axis in the direction parallel to the axis obtained by projecting the Z axis of the body coordinate system BC onto the leg plane PL, and with the X axis in the direction perpendicular to the Y axis and the Z axis. Incidentally, the XZ plane of the leg coordinate system LC is coincident with the leg plane PL.

Moreover, an element coordinate system is fixedly set at each rigid element as indicated by reference characters C4 to C9, for example. In this embodiment, the element coordinate system C4 of the waist element S4 is defined as being coincident with the body coordinate system BC. Moreover, the element coordinate systems C6, C5, C7, C8, and C9 of the chest element S6, the abdomen element S5, each thigh element S7, each crus element S8, and each foot element S9 are defined as being three-dimensional coordinate systems (XYZ coordinate systems) whose origins are at the center of the upper joint of the upper body JU2, the lower joint of the upper body JU1, the knee joint J2, the ankle joint J3, and the MP joint J4, respectively.

The element coordinate systems C4 to C9 can be established with settings of an arbitrary origin or arbitrary directions of axes as long as they are fixed to the corresponding rigid element.

Subsequently, the rigid link model of the assistive apparatus 1 is described below. In this embodiment, the coupling structure of the rigid link model of the assistive apparatus 1 is the same as that of the rigid link model S1 of the person (hereinafter, referred to as the person rigid link model S1), having the structure shown in FIG. 4. Therefore, the rigid link model of the assistive apparatus 1 is described by using FIG. 4. Hereinafter, the rigid link model of the assistive apparatus 1 is represented by a reference character S1' with parentheses as shown in FIG. 4 and referred to as the apparatus rigid link model S1'.

In this case, the joint elements J1 to J3 of each leg section S2 of the apparatus rigid link model S1' correspond to the hip joint region 4, the knee joint region 6, and the ankle joint region 10 of the assistive apparatus 1, respectively. Moreover, the joint elements JU1 and JU2 of the upper body section S3 correspond to joints supposed on the backbone of the person A in the same manner as for the person A. In this embodiment, the joint elements J1 to J3, JU1, and JU2 of the apparatus rigid link model S1' are assumed to be in the same positions as the joint elements J1 to J3, JU1, and JU2 of the person rigid link model S1, respectively, and the rotations that can be made by the joint elements J1 to J3, JU1, and JU2 of the apparatus rigid link model S1' are the same as those of the person rigid link model S1.

The rigid elements S4 to S9 of the apparatus rigid link model S1' correspond to portions attached to the regions of the person corresponding to the rigid elements in the assistive apparatus 1. For example, the thigh element S5 of the apparatus rigid link model S1' corresponds to a portion between the center of the hip joint region 4 and the center of the knee joint region 6 of the assistive apparatus 1 (the thigh link member 5 and the bands 14, 15 and half bodies of the hip joint region 4, the knee joint region 6, the electric motors 18, 19, and the joint displacement sensors 29, 30). Then, the weights and the center of gravity locations (the positions in the element coordinate system fixed to the rigid elements, respectively) of the rigid elements S4 to S9 of the apparatus rigid link model S1' are previously stored in the memory of the arithmetic processing unit 23. The weights and the center of gravity locations of the rigid elements S3 to S9 of the apparatus rigid link model S1' are those of the assistive apparatus 1 only (the assistive apparatus 1 detached from the person A).

Since the positions of the joint elements of the apparatus rigid link model S1' are the same as those of the person rigid link model S1 of the person A in this embodiment, the lengths of the rigid elements S4 to S8 except the foot element S9 are assumed to be the same as those of the person rigid link model S1. In addition, the body coordinate system BC, the leg coordinate system LC, and the element coordinate systems C4 to C9 are also assumed to be the same in both of the rigid link models S1 and S1'.

Figure 5:
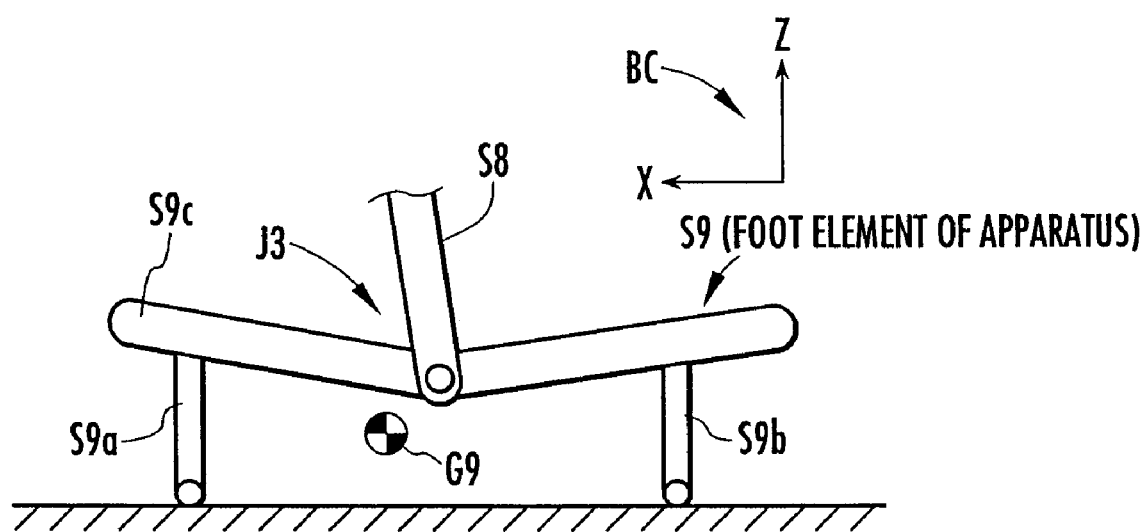
FIG. 5 is a diagram showing a structure of a foot of the apparatus-side rigid link model.

Additionally, the foot element S9 in the apparatus rigid link model S1' is assumed to have a structure shown in FIG. 5 in this embodiment. In other words, a base S9c substantially in the form of flat plate is coupled to the ankle joint J3 and support members S9a, S9b in contact with the floor are respectively provided on the under surface of the front part (the part relatively close to the toe) and the rear part (the part relatively close to the heel) of the base S9c. Moreover, regarding the foot element S9 of the apparatus rigid link model S1', the positions of the support members S9a, S9b (the positions of the bottom edges of the support members S9a, S9b) in the element coordinate system C9 of the foot element S9 are stored in the memory of the arithmetic processing unit 23, instead of the length.

In this embodiment, the weights of the portions of the assistive apparatus 1 corresponding to the abdomen and the chest of the person A are sufficiently low in comparison with the weights of other portions so as to be substantially zero. Therefore, the upper elements than the waist element S4 of the apparatus rigid link model S1' or the lower joint of the upper body JU1, the abdomen element S5, the upper joint of the upper body JU2, and the chest element S6 may be omitted.

Figure 6:
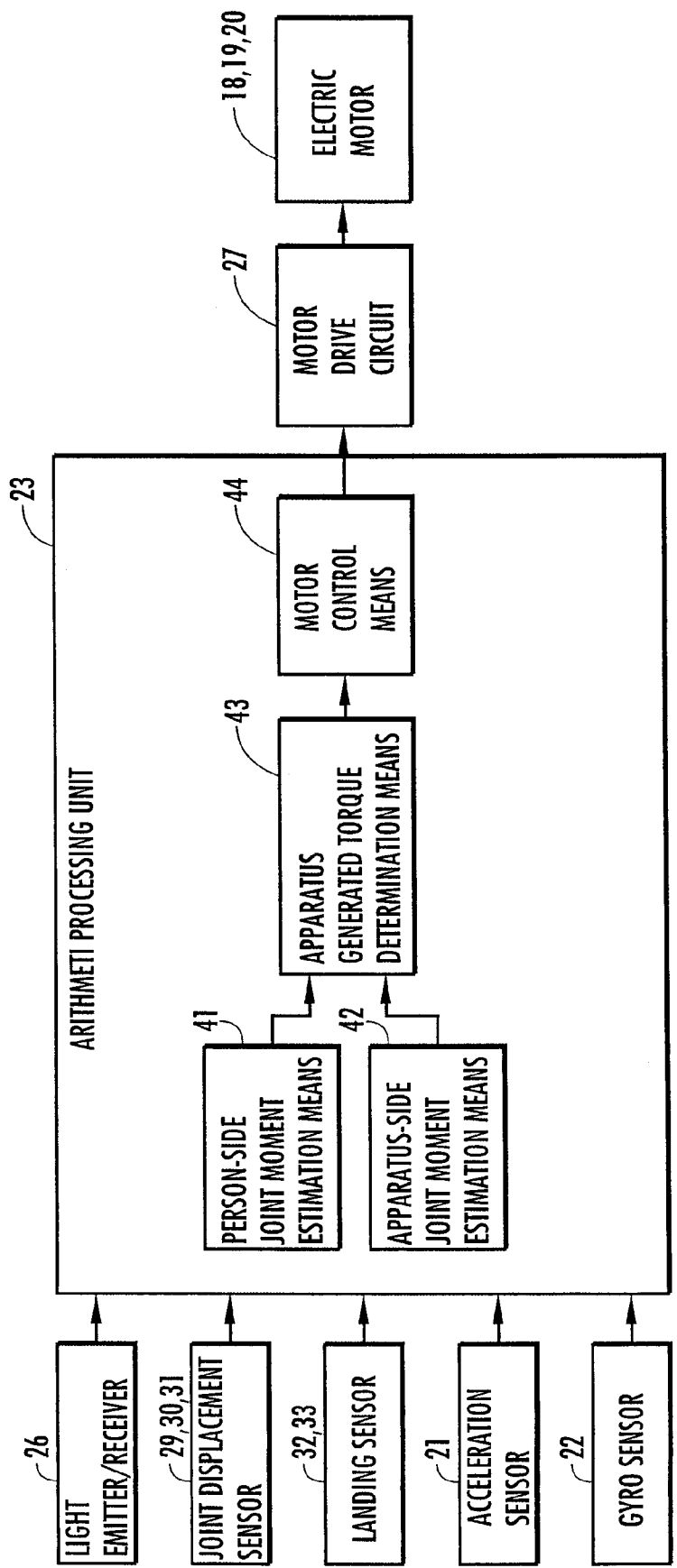
FIG. 6 is a block diagram showing an outline of a processing function of an arithmetic processing unit shown in FIG. 3.
Figure 7:
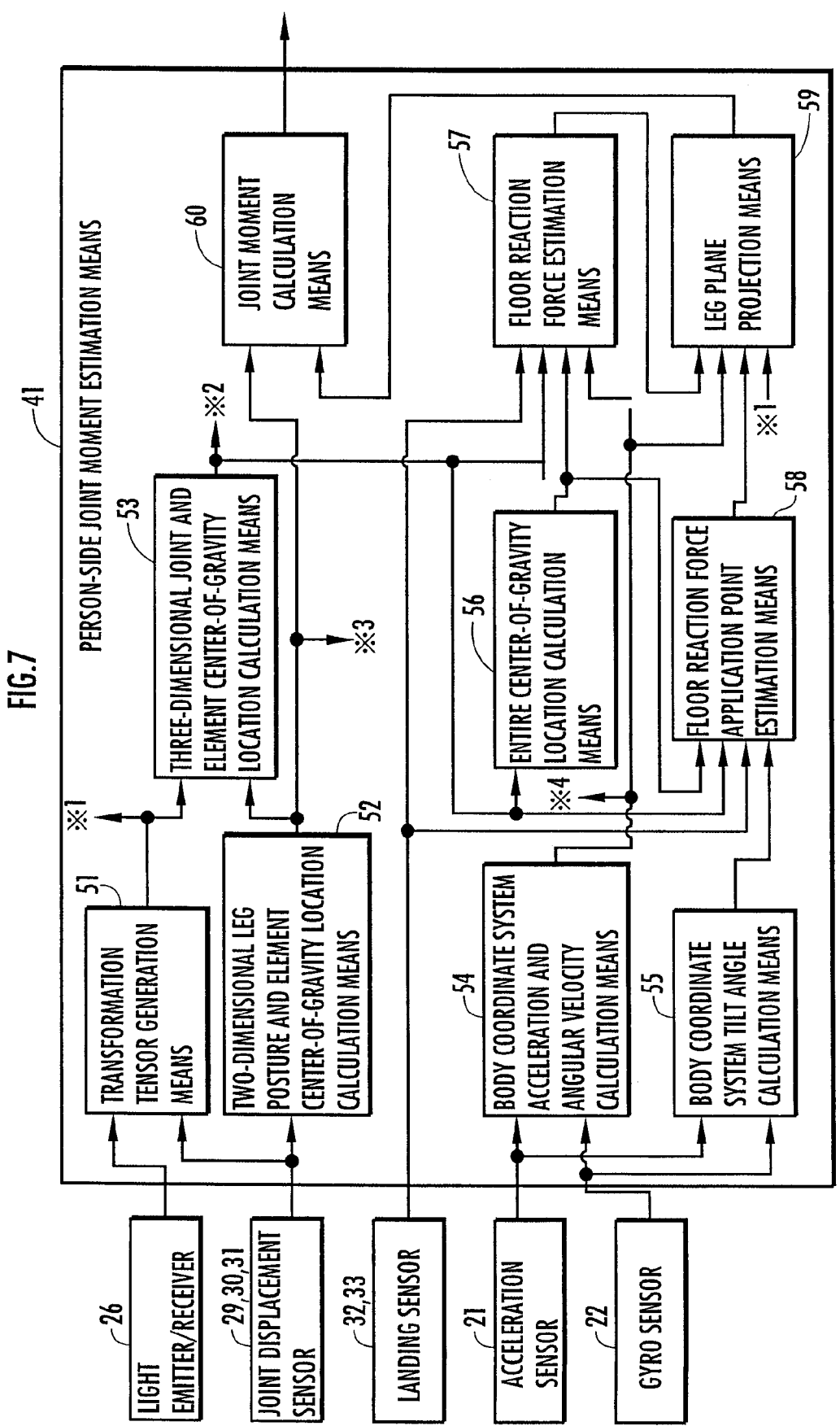
FIG. 7 is a block diagram showing detailed functions of person-side joint moment estimation means shown in FIG. 6.
Figure 8:
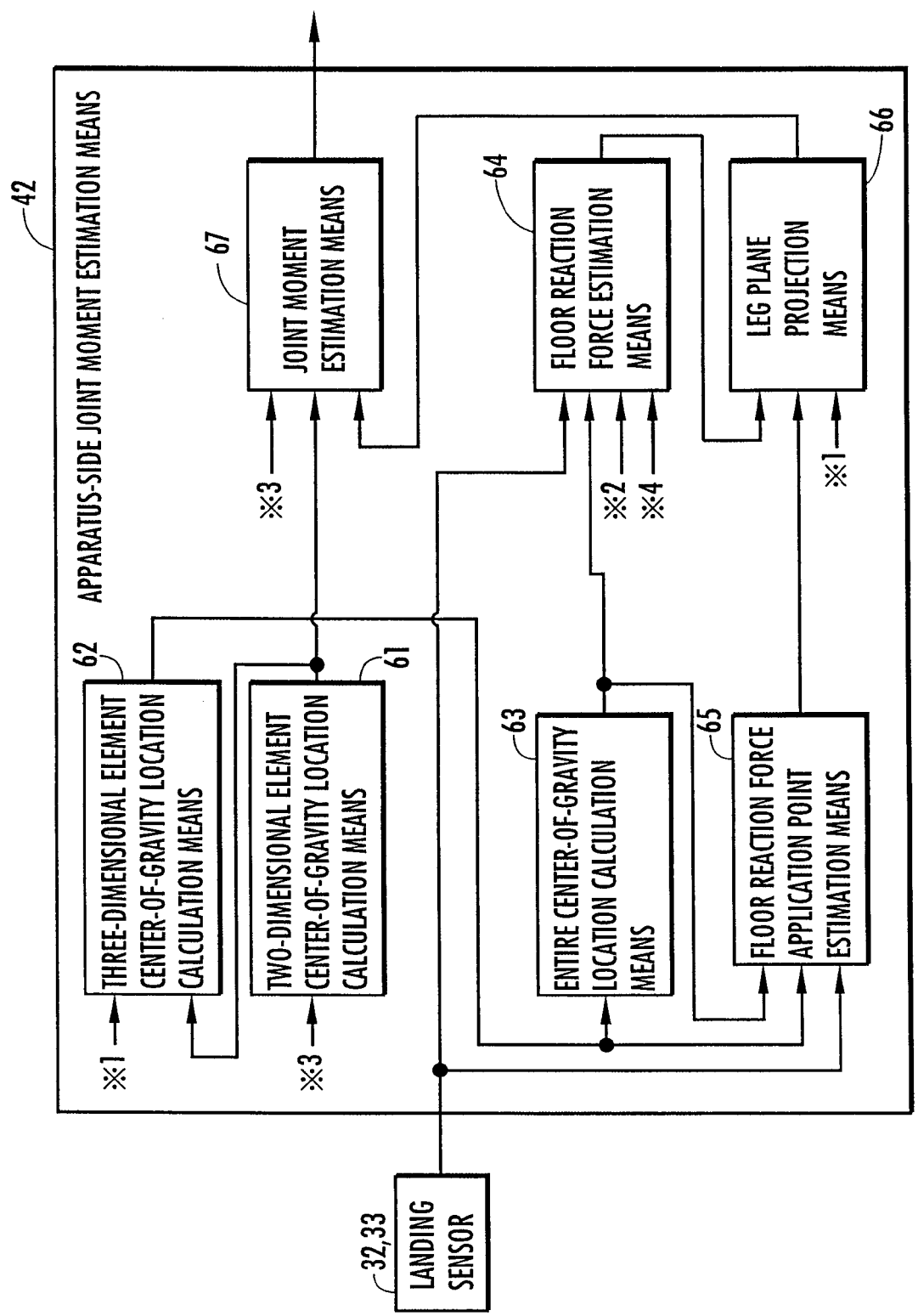
FIG. 8 is a block diagram showing detailed functions of apparatus-side joint moment estimation means shown in FIG. 6.

The following describes an outline of processing functions of the arithmetic processing unit 23. FIG. 6 is a block diagram schematically showing the entire processing functions of the arithmetic processing unit 23. FIG. 7 and FIG. 8 are block diagrams showing processing functions of the essential parts of the arithmetic processing unit 23.

The processing functions of the arithmetic processing unit 23 can be roughly classified into as follows: person-side joint moment estimation means 41 for sequentially estimating joint moments generated at the joints (the ankle joint, the knee joint, and the hip joint) of each leg of the person A; apparatus-side joint moment estimation means 42 for sequentially estimating joint moments generated at the joint regions 4, 6, 10 of the assistive apparatus 1; apparatus generated torque determination means 43 for determining torque (support torque) to be generated at the electric motors 18 to 20 of the assistive apparatus 1 on the basis of the joint moments estimated by these estimation means 41 and 42; and motor control means 44 for controlling the electric motors 18 to 20 to generate the determined torque via the motor drive circuit 27.

As shown in FIG. 7, the person-side joint moment estimation means 41 includes: transformation tensor generation means 51 for generating a transformation tensor for use in a coordinate transformation described later on the basis of detected outputs of the joint displacement sensor 29 and the light emitter/receiver 26 in the hip joint region 4; two-dimensional leg posture and element center-of-gravity location calculation means 52 for calculating positions of the joint elements, postures (tilt angles) of the rigid elements, and the center of gravity locations of the rigid elements on the leg plane PL of the each leg section S2 of the person rigid link model S1 on the basis of detected outputs of the joint displacement sensors 29, 30, and 31; three-dimensional joint and element center-of-gravity location calculation means 53 for calculating three-dimensional position vector values (coordinate component values) in the body coordinate system BC of the joint elements and the centers of gravity of the rigid elements of the person rigid link model S1 by using the transformation tensor generated by the transformation tensor generation means 51 and the positions and postures calculated by the two-dimensional leg posture and element center-of-gravity location calculation means 52; body coordinate system acceleration and angular velocity calculation means 54 for calculating values of an acceleration vector (translation acceleration) and the angular velocity vector of the origin of the body coordinate system BC (coordinate component values in the body coordinate system BC) on the basis of detected outputs of the acceleration sensor 21 and the gyro sensor 22; and body coordinate system tilt angle calculation means 55 for calculating a tilt angle relative to the vertical direction of the body coordinate system BC on the basis of detected outputs of the acceleration sensor 21 and the gyro sensor 22. The position vector calculated by the three-dimensional joint and element center-of-gravity location calculation means 53 includes a position vector in the body coordinate system BC of the MP joint J4 of the foot element S9 of the person rigid link model S1.

Moreover, the person-side joint moment estimation means 41 includes entire center-of-gravity location calculation means 56 for calculating a value of the position vector of the entire center of gravity (the entire center of gravity of the person A) of the person rigid link model S1 in the body coordinate system BC by using the position vectors of the centers of gravity of the rigid elements calculated by the three-dimensional joint and element center-of-gravity location calculation means 53.

Moreover, the person-side joint moment estimation means 41 includes: floor reaction force estimation means 57 for estimating a value in the body coordinate system BC (a coordinate component value) of a floor reaction force vector (a translation floor reaction force) acting on each leg of the person A by using the position vector value of each ankle joint J3 calculated by the three-dimensional joint and element center-of-gravity location calculation means 53, the position vector value of the entire center of gravity calculated by the entire center-of-gravity location calculation means 56, the acceleration vector value of the origin of the body coordinate system BC calculated by the body coordinate system acceleration and angular velocity calculation means 54, and the detected outputs of the landing sensors 32, 33; and floor reaction force application point estimation means 58 for estimating a value in the body coordinate system BC of the position vector of the application point of the floor reaction vector (hereinafter, simply referred to as the floor reaction force application point) acting on each leg by using the position vector values of each ankle joint J3 and each MP joint J4 calculated by the three-dimensional joint and element center-of-gravity location calculation means 53, the tilt angle of the body coordinate system BC calculated by the body coordinate system tilt angle calculation means 55, the position vector value of the entire center of gravity calculated by the entire center-of-gravity location calculation means 56, and the detected outputs of the landing sensors 32, 33.

Furthermore, the person-side joint moment estimation unit 41 includes: leg plane projection means 59 for projecting the floor reaction force vector value estimated by the floor reaction force estimation means 57, the position vector value of the floor reaction force application point estimated by the floor reaction force application point estimation means 58, and the acceleration vector and angular velocity vector values calculated by the body coordinate system acceleration and angular velocity calculation means 54 onto the leg plane PL corresponding to each leg by using the transformation tensor generated by the transformation tensor generation means 51; and a joint moment calculation means 60 for calculating estimated values of the joint moments acting on the ankle joint, the knee joint, and the hip joint of each leg of the person A by using the values obtained by the projection (two-dimensional quantities) and the locations and the postures calculated by the two-dimensional leg posture and element center-of-gravity location calculation means 52.

Although the details will be described later, the person-side joint moment estimation means 41 sequentially performs the arithmetic processing of the aforementioned means 51 to 60 each in a predetermined arithmetic processing period and sequentially calculates the estimated values of the joint moments finally by using the joint moment calculation means 60 in each arithmetic processing period. The estimated values of the joint moments calculated here are moments generated at the respective joints of each leg of the person A on the assumption that the person A makes a required motion of each leg by himself without wearing the assistive apparatus 1.

On the other hand, the apparatus-side joint moment estimation means 42 includes: two-dimensional element center-of-gravity location calculation means 61 for calculating the center of gravity locations of the rigid elements of each leg section S2 of the apparatus rigid link model S1' on the leg plane PL on the basis of the positions of the joint elements of each leg section S2 on the leg plane PL calculated by the two-dimensional leg posture and element center-of-gravity location calculation means 52 of the person-side joint moment estimation means 41; three-dimensional element center-of-gravity location calculation means 62 for calculating three-dimensional position vector values in the body coordinate system BC of the centers of gravity of the rigid elements of the apparatus rigid link model S1' by using the center of gravity locations of the rigid elements calculated by the two-dimensional element center-of-gravity location calculation means 61 and the transformation tensor generated by the transformation tensor generation means 51 of the person-side joint moment estimation means 41; and entire center-of-gravity location calculation means 63 for calculating a value of the position vector of the entire center of gravity (the entire center of gravity of the assistive apparatus 1) of the apparatus rigid link model S1' in the body coordinate system BC by using the position vector values of the centers of gravity of the rigid elements calculated by the three-dimensional element center-of-gravity location calculation means 62. The position vectors calculated by the three-dimensional element center-of-gravity location calculation means 62 include position vectors of the support members S9a, S9b of the each foot element S9 of the apparatus rigid link model S1' (See FIG. 5).

Moreover, the apparatus-side joint moment estimation means 42 includes: floor reaction force estimation means 64 for estimating a value in the body coordinate system BC (a coordinate component value) of a floor reaction force vector (a translation floor reaction force) acting on the each leg section of the assistive apparatus 1 by using the position vector values of each ankle joint J3 calculated by the three-dimensional joint and element center-of-gravity location calculation means 53 of the person-side joint moment estimation means 41, the position vector value of the entire center of gravity of the assistive apparatus 1 calculated by the entire center-of-gravity location calculation means 63, the acceleration vector values of the origin of the body coordinate system BC calculated by the body coordinate system acceleration and angular velocity calculation means 54 of the person-side joint moment estimation means 41, and detected outputs of the landing sensors 32, 33; and floor reaction force application point estimation means 65 for estimating a value in the body coordinate system BC of the position vector of the application point of a floor reaction force vector (the floor reaction force application point) acting on the each leg section of the assistive apparatus 1 by using the position vector values of the support members S9a, S9b of the each foot element S9 of the apparatus rigid link model S1' calculated by the three-dimensional element center-of-gravity location calculation means 62, the position vector value of the entire center of gravity calculated by the entire center-of-gravity location calculation means 63, and detected outputs of the landing sensors 32, 33.

Furthermore, the apparatus-side joint moment estimation means 42 includes: leg plane projection means 66 for projecting the floor reaction force vector value estimated by the floor reaction force estimation means 64 and the position vector value of the floor reaction force application point estimated by the floor reaction force application point estimation means 65 onto the leg plane PL corresponding to each leg by using the transformation tensor generated by the transformation tensor generation means 51; and joint moment calculation means 67 for calculating estimated values of joint moments to be generated at the joint regions 4, 6, and 10 of the assistive apparatus 1 by using the values (two-dimensional quantities) obtained by the projection and the position vectors (which correspond to the position vectors of the joint elements of the each leg section S2 of the apparatus rigid link model S1' in this embodiment) in the leg coordinate system LC of the hip joint J1, the knee joint J2, and the ankle joint J3 of the each leg section S2 of the person rigid link model S1 calculated by the two-dimensional leg posture and element center-of-gravity location calculation means 52.

Although the details will be described later, the apparatus-side joint moment estimation means 42 sequentially performs arithmetic processing of the aforementioned means 61 to 67 each in a predetermined arithmetic processing period in parallel with the processing of the person-side joint moment estimation means 41 and sequentially calculates the estimated values of the joint moments finally by using the joint moment calculation means 67 in each arithmetic processing period. The estimated values of the joint moments calculated here are moments generated at the joint regions 4, 6, and 10 of the assistive apparatus 1 on the assumption that the assistive apparatus 1 makes the same motion as the required motion of each leg of the person by itself.

The following describes the operation of the apparatus of this embodiment in conjunction with the detailed arithmetic processing of the respective means of the arithmetic processing unit 23. In the following description, generally the transformation tensor for coordinate-converting a vector quantity from a certain coordinate system Ca to another coordinate system Cb, namely a tensor for converting a vector quantity represented by a component value of the coordinate system Ca to a vector quantity represented by a component value of the coordinate system Cb is denoted by R(Ca→Cb). Furthermore, a position vector of a point P or a region P viewed in the coordinate system Ca is denoted by U(P/Ca). Still further, a vector A of an applied force, an acceleration, or other physical quantity of an object Q or a region Q, which is represented by a coordinate component value of a certain coordinate system Ca is denoted by A(Q/Ca). In this case, when representing a coordinate component value in the coordinate system Ca of the position vector U(P/Ca) or the physical quantity vector A(Q/Ca), the name of each coordinate axis x, y, or z is added in the denotation. For example, the X coordinate component of the position vector U(P/Ca) is denoted by U(P/Ca)x.

Moreover, the element coordinate systems C4 to C9 are sometimes referred to as C_waist, C_abdomen, C_chest, C_thigh, C_crus, and C_foot by using the names of the regions of the person A corresponding to C4 to C9, respectively. It is assumed that the same applies to the rigid elements S4 to S9 of the person rigid link model S1 and the centers of gravity G4 to G9 of the rigid elements S4 to S9. For example, the waist element S4 of the person rigid link model S1 and its center of gravity G4 are sometimes denoted by S_waist and G_waist, respectively.

Furthermore, the rigid elements S4 to S9 of the apparatus rigid link model S1' are sometimes referred to as S_waist apparatus, S_abdomen apparatus, S_chest apparatus, S_thigh apparatus, S_crus apparatus, and S_foot apparatus, respectively, by using the names of the corresponding regions of the person A. It is assumed that the same applies to the centers of gravity of the rigid elements S4 to S9 of the apparatus rigid link model S1'. For example, the center of gravity G4 of the waist element S4 of the apparatus rigid link model S1' is sometimes denoted by G_waist apparatus.

Regarding denotations related to the leg of the person A or related to the leg section of the assistive apparatus 1, "right" or "left" is added in the denotation if the difference between right and left need be indicated. For example, the right thigh element S7 is sometimes referred to as an S_right thigh or S_right thigh apparatus.

Moreover, the hip joint J1, the knee joint J2, the ankle joint J3, and the MP joint J4 are sometimes referred to as J_hip, J_knee, J_ankle, and J_MP, respectively. Again, if there is a need for indicating the difference between right and left, the term "right" or "left" is added in the denotation similarly to the above.

The arithmetic processing unit 23 accepts detected outputs of the joint displacement sensors 29, 30, and 31, the light emitter/receiver 26, the acceleration sensor 21, and the gyro sensor 22 via an A/D converter, which is not shown, and accepts detected outputs (ON/OFF signals) of the landing sensors 32, 33 each in a predetermined arithmetic processing period. It then performs the arithmetic processing of the person-side joint moment estimation means 41 and the apparatus-side joint moment estimation means 42 in parallel, first.

The arithmetic processing of the person-side joint moment estimation means 41 is described in detail below. First, the arithmetic processing operations of the transformation tensor generation means 51, the two-dimensional leg posture and element center-of-gravity location calculation means 52, and the three-dimensional joint and element center-of-gravity location calculation means 53 are sequentially performed. A rigid element is assumed to mean a rigid element of the person rigid link model S1, unless otherwise specified, hereinafter until the description of the person joint moment estimation means 41 is completed.

The arithmetic processing of the transformation tensor generation means 51 includes generating a transformation tensor R(LC→BC) for performing a coordinate transformation of a vector quantity between the leg coordinate system LC corresponding to each leg plane PL and the body coordinate system BC, and transformation tensors R(C_abdomen→BC) and R(C_chest→BC) for performing a coordinate transformation of a vector quantity between each of the element coordinate system C5 of the abdomen element S5 and the element coordinate system C6 of the chest element S6 and the body coordinate system BC.

The transformation tensor R(LC→BC) is determined from rotation angles around two axes except the rotation angle around a rotation axis a29 perpendicular to the leg plane PL among the rotation angles around three axes of the hip joint detected by the joint displacement sensor 29 of the hip joint region 4. In this embodiment, if the rotation angles of the hip joint around two axes except the rotation axis a29 perpendicular to the leg plane PL (rotation angles accompanying an abduction or adduction and a slewing motion of the leg) are determined, the posture relationship between the leg coordinate system LC and the body coordinate system BC is integrally determined. Therefore, the transformation tensor R(LC→BC) can be obtained from the detected values of the rotation angles around two axes except the rotation angle around the rotation axis a29 perpendicular to the leg plane PL out of the rotation angles around three axes of the hip joint. Incidentally, the transformation tensor R(LC→BC) is obtained for each of the right and left legs.

The transformation tensors R(C_abdomen→BC) and the R(C_chest→BC) are generated as described below. First, tilt angles of the abdomen element S5 and the chest element S6 relative to the waist element S4 of the person rigid link model S1 (more specifically, the tilt angles on the sagittal plane (XZ plane) relative to the Z axis direction of the body coordinate system BC) are grasped based on the detected outputs of the light emitter/receiver 26. Then, the transformation tensor R(C_abdomen→BC) is determined as one having the coordinate system C_abdomen tilting on the sagittal plane relative to the body coordinate system BC by the tilt angle of the abdomen element S5 relative to the waist element S4. Similarly, the transformation tensor R(C_abdomen→BC) is determined as one having the coordinate system C_chest tilting on the sagittal plane relative to the body coordinate system BC by the tilt angle of the chest element S6 relative to the waist element S4.

More specifically, although measurement has been made only for the tilt angles relative to the waist element S4 of the abdomen element S5 and the chest element S6 caused by the rotation around a single axis (around the Y axis of the C_abdomen and C_chest) of the lower joint of the upper body JU1 and the upper joint of the upper body JU2 of the person rigid link model S1 in this embodiment, it is also possible to measure tilt angles around two axes of the abdomen element S5 and the chest element S6, supposing that the lower joint of the upper body JU1 and the upper joint of the upper body JU2 can rotate, for example, around two axes (for example, around two axes of the Y axis and the X axis of the C_abdomen and the C_chest). Then, the transformation tensors R(C_abdomen→BC) and R(C_chest→BC) may be calculated based on the tilt angles around these two axes.

Incidentally, the transpositions of the aforementioned transformation tensors R(LC→BC), R(C_abdomen→BC), and R(C_chest→BC) are transformation tensors for performing inverse transformations therefor. Therefore, R(BC→LC)=R(LC→BC)$^T$, R(BC→C_abdomen)=R(C_abdomen→BC)$^T$, R(BC→C_chest)=R(C_chest→BC)$^T$ (T designates a transposition).

In the arithmetic processing of the two-dimensional leg posture and element center-of-gravity location calculation means 52, first, tilt angles θ_thigh, θ_crus, and θ_foot of the thigh element S7, the crus element S8, and the foot element S9 of the person rigid link model S1 are respectively calculated from rotation angles around axes (rotation axes a29, a30, and a31 in FIG. 2) perpendicular to the leg plane PL of the hip joint, the knee j, and the ankle joint of the leg, which are grasped from the detected outputs of the joint displacement sensors 29 to 31 of each leg. Note here that the tilt angles θ_thigh, θ_crus, and θ_foot are those relative to the Z axis direction of the leg coordinate system LC related to the leg plane PL. The θ_thigh, θ_crus, and θ_foot are also tilt angles of the thigh element S7, the crus element S8, and the foot element S9 of the apparatus rigid link model S1', respectively.

Figure 9:
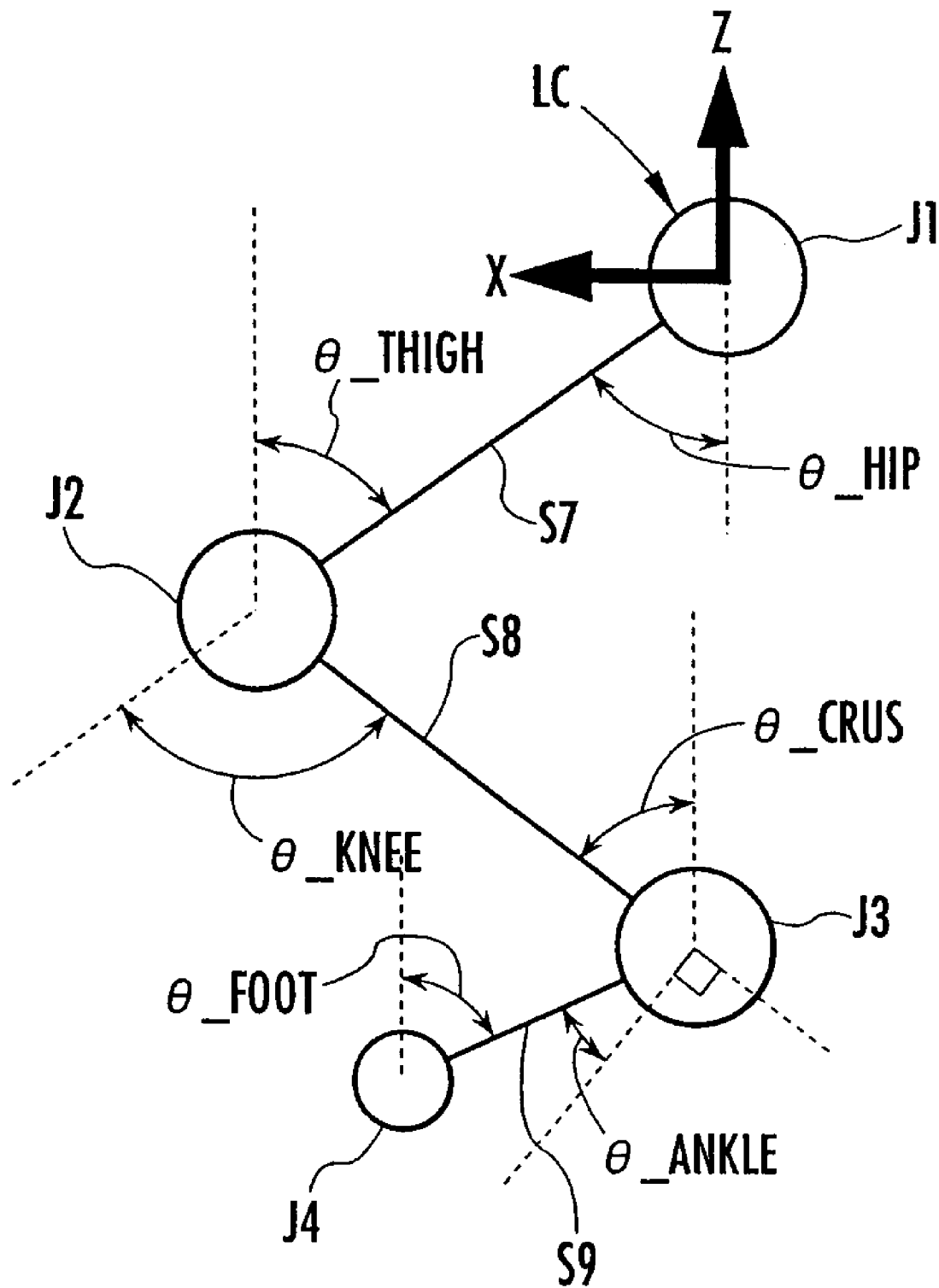
FIG. 9 is a diagram for explaining a position and a posture of a leg on the leg plane.

Specifically, as shown in FIG. 9, supposing that the detected rotation angles of the hip joint, the knee joint, and the ankle joint (the rotation angles around the axis perpendicular to the leg plane PL (=the XZ plane of the leg coordinate LC) from the reference posture condition) are θ_hip, θ_knee, and θ_ankle, the θ_thigh, θ_crus, and θ_foot are calculated in order by the following formulas (1a) to (1c), respectively:

$$\theta\_thigh = -\theta\_hip \quad (1a)$$

$$\theta\_crus = \theta\_thigh + \theta\_knee \quad (1b)$$

$$\theta\_foot = \theta\_crus - \theta\_ankle + 90° \quad (1c)$$

where θ_hip>0, θ_knee>0, and θ_ankle>0, while θ_thigh<0, θ_crus>0, and θ_foot<0. In addition, the calculations of θ_thigh, θ_crus, and θ_foot are performed for each of the leg sections individually.

The tilt angles θ_thigh, θ_crus, and θ_foot calculated as described above are assumed to indicate the posture on the leg plane PL corresponding to the leg section S2 of the rigid elements of each of the leg sections S2 of the person-side and apparatus-side rigid link models S1, S1'.

Subsequently the positions on the XZ plane of the leg coordinate system LC, in other words, on the leg plane PL of the joint elements of the each leg section S2 are calculated by using θ_thigh, θ_crus, and θ_foot calculated as described above and the lengths of the rigid elements of the each leg section S2 of the person rigid link model S1 previously stored in the memory of the arithmetic processing unit 23. Specifically, the position vectors U(J_hip/LC), U(J_knee/LC), U(J_ankle/LC), and U(J_MP/LC) in the leg coordinate system LC of the joint elements J_hip (J1), J_knee (J2), J_ankle (J3), and J_MP (J4) of the each leg section S2 are sequentially calculated in order by the formulas (2a) to (2d) shown below, respectively. In this condition, all of the positions of J_hip, J_knee, J_ankle, and J_MP in the Y-axis direction of the leg coordinate system LC (in the direction of a normal line of the leg plane PL), namely, the Y coordinate components in the leg coordinate system LC of J_hip, J_knee, J_ankle, and J_MP are assumed to be zero. In other words, all of J_hip, J_knee, J_ankle, and J_MP are assumed to be movable only on the leg plane PL in this embodiment.

$$U(J\_hip/LC) = (0, 0, 0)^T \quad (2a)$$

$$U(J\_knee/LC) = U(J\_hip/LC) + (-L7 \times \sin(\theta\_thigh), 0, -L7 \times \cos(\theta\_thigh))^T \quad (2b)$$

$$U(J\_ankle/LC) = U(J\_knee/LC) + (-L8 \times \sin(\theta\_crus), 0, -L8 \times \cos(\theta\_thigh))^T \quad (2c)$$

$$U(J\_MP/LC) = U(J\_ankle/LC) + (-L9 \times \sin(\theta\_foot), 0, -L9 \times \cos(\theta\_foot))^T \quad (2d)$$

In the above, L7, L8, and L9 in the formulas (2b), (2c), and (2d) are the lengths of the thigh element S7, the crus element S8, and the foot element S9 and they are previously stored in the memory of the arithmetic processing unit 23 as described above. The vectors of the second term in the right-hand side of the formulas (2b) to (2d) mean the position vector of the knee joint J2 viewed from the hip joint J1, the position vector of the ankle joint J3 viewed from the knee joint J2, and the position vector of the MP joint J4 viewed from the ankle joint J3, respectively. In this regard, a pair of the X coordinate component and the Z coordinate component of each of the position vectors U(J_hip/LC), U(J_knee/LC), U(J_ankle/LC), and U(J_MP/LC) calculated by the formulas (2a) to (2d) represents a two-dimensional position on the leg plane PL. More specifically, the position vectors U(J_hip/LC), U(J_knee/LC), and U(J_ankle/LC) are also two-dimensional position vectors on the leg plane PL of the joint elements of the each leg section S2 of the apparatus-side rigid link model S1'.

Moreover, the position vectors in the leg coordinate system LC of the centers of gravity of the rigid elements of the each leg section S2 are calculated by using the position vectors of the joint elements calculated as described above by the formulas (2a) to (2d). More specifically, position vectors U(G_thigh/LC), U(G_crus/LC), and U(G_foot/LC) of the centers of gravity G_thigh (G7), G_crus (G8), and G_foot (G9) of the thigh element S7, the crus element S8, and the foot element S9 of the each leg section S2 are respectively calculated by the following formulas (3a) to (3c):

$$U(G\_thigh/LC) = U(J\_knee/LC) + R(C\_thigh \rightarrow LC) \times U(G\_thigh/C\_thigh) \quad (3a)$$

$$U(G\_crus/LC) = U(J\_ankle/LC) + R(C\_crus \rightarrow LC) \times U(G\_crus/C\_crus) \quad (3b)$$

$$U(G\_foot/LC) = U(J\_MP/LC) + R(C\_foot \rightarrow LC) \times U(G\_foot/C\_foot) \quad (3c)$$

In the above, R(C_thigh→LC), R(C_crus→LC), and R(C_foot→LC) in the formulas (3a) to (3c) are respectively a transformation tensor from the thigh coordinate system C_thigh (C7) to the leg coordinate system LC, a transformation tensor from the crus coordinate system C_crus (C8) to the leg coordinate system LC, and a transformation tensor from the foot coordinate system C_foot (C9) to the leg coordinate system LC, and they are determined by using the previously calculated θ_thigh, θ_crus, and θ_foot, respectively. In addition, U(G_thigh/C_thigh), U(G_crus/C_crus), and U(G_foot/C_foot) are position vectors of the centers of gravity of the rigid elements represented in the element coordinate system of the rigid elements, and they are previously stored in the memory of the arithmetic processing unit 23 as described above.

A pair of the X coordinate component and the Z coordinate component of each of the position vectors U(G_thigh/LC), U(G_crus/LC), and U(G_foot/LC) calculated by the above formulas (3a) to (3c) represents a two-dimensional position on the leg plane PL. The above is the arithmetic processing of the two-dimensional leg posture and element center-of-gravity location calculation means 52.

Subsequently, in the arithmetic processing of the three-dimensional joint and element center-of-gravity location calculation means 53, the position vectors in the body coordinate system BC of the joint elements and the centers of gravity of the rigid elements of the person rigid link model S1 are calculated by using the transformation tensor obtained by the transformation tensor generation means 51 and the positions of the joint elements and the centers of gravity of the rigid elements of the each leg section S2 obtained by the two-dimensional leg posture and element center-of-gravity location calculation means 52.

The position vectors of the joint elements are calculated as described below. The following describes the calculation of the position vectors of the joint elements J1, J2 and J3 of the left leg section S2, for example. First, supposing that L4a is the length of the line segment between the centers of the both hip joints J1, J1 of the waist element S4, the position vector U(J_left hip/BC) of the left hip joint J1 in the body coordinate system BC is given by the following formula (4a):

$$U(J\_\text{left hip}/BC) = (0, L4a/2, 0)^T \quad (4a)$$

Furthermore, position vectors U(J_left knee/BC), U(J_left ankle/BC), and U(J_left MP/BC) of the left knee joint J2, the left ankle joint J3, and the left MP joint J4 in the body coordinate system BC are found in order by the following formulas (4b) to (4d), using the transformation tensor R(LC→BC) and the position vectors U(J_left knee/LC), U(J_left ankle/LC), and U(J_left MP/LC) in the leg coordinate system LC (left LC) corresponding to the left leg section S2:

$$U(J\_\text{left knee}/BC) = U(J\_\text{left hip}/BC) + R(LC \to BC) \times U(J\_\text{left knee}/LC) \quad (4b)$$

$$U(J\_\text{left ankle}/BC) = U(J\_\text{left hip}/BC) + R(LC \to BC) \times U(J\_\text{left ankle}/LC) \quad (4c)$$

$$U(J\_\text{left MP}/BC) = U(J\_\text{left hip}/BC) + R(LC \to BC) \times U(J\_\text{left MP}/LC) \quad (4d)$$

The position vectors in the body coordinate system BC of the joint elements of the right leg section S2 can be found in the same manner as for the above.

Moreover, position vectors U(JU1/BC) and U(JU2/BC) in the body coordinate system BC of the lower joint of the upper body JU1 and the upper joint of the upper body JU2 of the upper body section S3 are calculated in order by using the following formulas (5a) and (5b):

$$U(JU1/BC) = (0, 0, L4b)^T \quad (5a)$$

$$U(JU2/BC) = U(JU1/BC) + R(C\_\text{abdomen} \to BC) \cdot (0, 0, L5)^T \quad (5b)$$

In the above, L4b in the formula (5a) is the length from the midpoint of the line segment between the both hip joints J1, J1 to the center of the lower joint of the upper body JU1 and L5 in the formula (5b) is the length of the abdomen element S5. These lengths are previously stored in the arithmetic processing unit 23 as described above.

The position vectors in the body coordinate system BC of the centers of gravity of the rigid elements are calculated as described below. Specifically, the position vectors U(G_thigh/BC), U(G_crus/BC), and U(G_foot/BC) in the body coordinate system BC of the respective centers of gravity of the thigh element S7, the crus element S8, and the foot element S9 are found by calculating the formula in which U(J_left knee/LC) in the right-side hand of the formula (4b) is replaced with the position vector U(G_thigh/LC), U(G_crus/LC), or U(G_foot/LC) of the center of gravity of the thigh element S7, the crus element S8, or the foot element S9 calculated by the two-dimensional leg posture and element center-of-gravity location calculation means 52. The position vectors in the body coordinate system BC of the G_thigh, G_crus, and G_foot are calculated for each of the leg sections S2 individually.

In addition, a position vector U(G_waist/BC) of the center of gravity G4 of the waist element S4 is found from the position vector U(G_waist/C_waist) of the center of gravity G_waist in the previously-stored waist coordinate system C_waist (C4) by the following formula (6):

$$U(G\_\text{waist}/BC) = R(C\_\text{waist} \to BC) \times U(G\_\text{waist}/C\_\text{waist}) \quad (6)$$

where R(C_waist→BC) is a transformation tensor from the waist coordinate system C_waist to the body coordinate system BC. In this embodiment, the C_waist is equivalent to the body coordinate system BC and therefore R(C_waist→BC) is represented by an identity matrix of order 3. Therefore, U(G_waist/C_waist) is obtained directly as U(G_waist/BC).

Moreover, the position vectors U(G_abdomen/BC) and U(G_chest/BC) in the body coordinate system BC of the centers of gravity G5 and G6 of the abdomen element S5 and the chest element S6 are found by the following formulas (7) and (8), using the transformation tensor R(C_abdomen→BC) and R(C_chest→BC) obtained by the transformation tensor generation means 51, the position vector U(G_abdomen/C_abdomen) of the center of gravity of the abdomen element S5 in the previously-stored abdomen coordinate system C_abdomen (C5), and the position vector U(G_chest/C_chest) of the center of gravity of the chest element S6 in the chest coordinate system C_chest (C6):

$$U(G\_\text{abdomen}/BC) = U(JU1/BC) + R(C\_\text{abdomen} \to BC) \cdot U(G\_\text{abdomen}/C\_\text{abdomen}) \quad (7)$$

$$U(G\_\text{chest}/BC) = U(JU2/BC) + R(C\_\text{chest} \to BC) \cdot U(G\_\text{chest}/C\_\text{chest}) \quad (8)$$

Incidentally, U(JU1/BC) and U(JU2/BC) have been found by the aforementioned formulas (5a) and (5b).

The above is the arithmetic processing of the three-dimensional joint and element center-of-gravity location calculation means 53. The position vectors of the joint elements and those of the centers of gravity of the rigid elements calculated by the three-dimensional joint and element center-of-gravity location calculation means 53 have meanings of position vectors viewed in the body coordinate system BC of the actual regions of the person A corresponding to them.

The person-side joint moment estimation means 41 performs the arithmetic processing of the body coordinate system acceleration and angular velocity calculation means 54 and the body coordinate system tilt angle calculation means 55 in parallel with the arithmetic processing of the transformation tensor generation means 51, the two-dimensional leg posture and element center-of-gravity location calculation means 52, and the three-dimensional joint and element center-of-gravity location calculation means 53 described above.

In the arithmetic processing of the body coordinate system acceleration and angular velocity calculation means 54, a value in the body coordinate system BC (coordinate component value) of the acceleration vector of the origin of the body coordinate system BC is found as described below from the 3-axis acceleration (translation acceleration) grasped from detected outputs of the acceleration sensor 21 and the 3-axis angular velocity grasped from detected outputs of the gyro sensor 22. First, the acceleration and the angular velocity respectively detected by the sensors 21 and 22 are vector quantities represented by the 3-axis coordinate system fixed to the sensors 21 and 22 (hereinafter, referred to as the sensor coordinate system SC or C_sensor) and therefore they are transformed into a value in the body coordinate system BC. The transformation is performed by multiplying the acceleration vector and the angular velocity vector detected in the sensor coordinate system SC by a transformation tensor preset according to the relative attachment positional relationship (the relative posture relationship of the C_sensor to C4 (=BC)) of the acceleration sensor 21 and the gyro sensor (angular velocity sensor) 22 to the waist of the person A. In other words, supposing that: a detected value of the acceleration vector in the sensor coordinate system SC is ACC (sensor/SC); an acceleration vector obtained by transforming it into the body coordinate system BC is ACC(sensor/BC); a detected value of the angular velocity vector in the sensor coordinate system SC is ω(sensor/SC); and an angular velocity vector obtained by transforming it into the body coordinate system BC is ω(sensor/BC), the acceleration vector ACC(sensor/BC) and the angular velocity vector ω(sensor/BC) are found by the formulas (9) and (10) described below, respectively. In this regard, ACC(sensor/BC) and ω(sensor/BC) are more specifically an acceleration vector and an angular velocity vector at the places of the acceleration sensor 21 and the gyro sensor 22. In this example, it is assumed that the places of the acceleration sensor 21 and the gyro sensor 22 are substantially coincident with each other and that the sensor coordinate system SC is the same for the both sensors 21 and 22.

$$ACC(\text{sensor}/BC) = R(SC \rightarrow BC) \cdot ACC(\text{sensor}/SC) \quad (9)$$

$$\omega(\text{sensor}/BC) = R(SC \rightarrow BC) \cdot \omega(\text{sensor}/SC) \quad (10)$$

In the above, the transformation tensor R(SC→BC) is determined from the relative posture relationship between the sensor coordinate system SC and the body coordinate system BC (more specifically, the tilt angle of each axis of the sensor coordinate system SC to each axis of the body coordinate system BC) and it is previously stored in the memory of the arithmetic processing unit 18 when the assistive apparatus 1 is put on the person A. Additionally describing, the acceleration sensor 21 or the gyro sensor 22 may be attached to the region other than the waist of the person A (a rigid equivalent part corresponding to one of the rigid elements of the person rigid link model S1). In this instance, to acquire the acceleration vector ACC(sensor/BC) or the angular velocity vector ω(sensor/BC), the detected value in the sensor coordinate system SC is transformed to a value in the element coordinate system of the rigid element to which the acceleration sensor 21 or the gyro sensor 22 is attached, and then it is transformed to a value in the body coordinate system BC by using the transformation tensor. The transformation tensor in this instance is determined based on a detected value of a displacement (rotation angle) of the joint element between the rigid element to which the acceleration sensor 21 or the gyro sensor 22 is attached and the waist element S4.

In the arithmetic processing of the body coordinate system acceleration and the angular velocity calculation means 55, the acceleration vector ACC(sensor/BC) and the angular velocity vector ω(sensor/BC) are found as described above and thereafter an acceleration vector ACC(BCO/BC) of the origin of the body coordinate system BC is found by the formula (11) below. The symbol "BCO" represents the origin of the body coordinate system BC.

[Eq. 1]

$$ACC(BCO/BC) = \quad (11)$$
$$ACC(\text{sensor}/BC) + U(\text{sensor}/BC) \times \omega(\text{sensor}/BC)' +$$
$$\begin{bmatrix} 0 & U(\text{sensor}/BC)x & U(\text{sensor}/BC)x \\ U(\text{sensor}/BC)y & 0 & U(\text{sensor}/BC)y \\ U(\text{sensor}/BC)z & U(\text{sensor}/BC)z & 0 \end{bmatrix} \times$$
$$\begin{bmatrix} \omega(\text{sensor}/BC)x^2 \\ \omega(\text{sensor}/BC)y^2 \\ \omega(\text{sensor}/BC)z^2 \end{bmatrix}$$

In the formula (11), U(sensor/BC) is a position vector of the acceleration sensor 21 and the gyro sensor 22 in the body coordinate system BC and U(sensor/BC)x, U(sensor/BC)y, and U(sensor/BC)z are coordinate component values in the body coordinate system BC of U(sensor/BC) according to the aforementioned definition of the notation method of a coordinate component value of a vector in this specification. U(sensor/BC) is measured when the assistive apparatus 1 is put on the person A and stored in the memory of the arithmetic processing unit 23. In addition, ω(sensor/BC)x, ω(sensor/BC)y, and ω(sensor/BC)z are coordinate component values of the angular velocity vector ω(sensor/BC) previously obtained. Furthermore, ω(sensor/BC)' indicates a first derivative of ω(sensor/BC) and the value is calculated from time series data of ω(sensor/BC) found by the aforementioned formula (10) for each arithmetic processing period of the arithmetic processing unit 23.

Moreover, the angular velocity is identical in any portion within the waist element S4, and the angular velocity ω(BCO/BC) of the origin BCO of the body coordinate system BC fixed to the waist element S4 is equal to ω(sensor/BC) Therefore, ω(BCO/BC) ω(sensor/BC).

ACC(BCO/BC) found by the aforementioned formula (11) is a vector equal to an output value of the acceleration sensor 21 (a detected acceleration value) under the condition where the acceleration sensor 21 is set at the origin of the body coordinate system BC and the direction of the axis of the acceleration sensor 21 is matched with the body coordinate system BC.

Since the acceleration sensor 21 also detects an acceleration accompanying the gravity, the acceleration vector ACC(BCO/BC) obtained as described above includes an inertial acceleration component caused by the gravity. Moreover, while the acceleration vector ACC(BCO/BC) of the origin BCO of the body coordinate system BC has been found in consideration of the angular speed of the waist element S4 in this embodiment, the angular speed of the waist element S4 and its rate of change are relatively low and therefore ACC(sensor/BC), which has been found by the aforementioned formula (9), may be used as an acceleration vector ACC(BCO/BC) of the origin BCO of the body coordinate system BC directly.

In the arithmetic processing of the body coordinate system tilt angle calculation means 55, a tilt angle of the waist element S4 (a tilt angle of the Z axis of the body coordinate system BC) relative to the vertical direction (the gravity direction) is calculated by using a so-called Kalman filter from detected outputs of the acceleration sensor 21 and the gyro sensor 22. The calculation method is already known and therefore its description is omitted here. The tilt angle calculated here is around two axes, namely, the horizontal axis in the forward/backward direction and the horizontal axis in the right/left direction.

Subsequently, the person-side joint moment estimation means 41 performs the arithmetic processing of the entire center-of-gravity location calculation means 56. In the arithmetic processing of the entire center-of-gravity location calculation means 56, a position vector U(G_entire/BC) in the body coordinate system BC of the entire center of gravity of the person rigid link model S1 (the entire center of gravity of the person A, hereinafter referred to as G_entire in some cases) is found by the formula (12) shown below, from the centers of gravity location of the rigid elements (the position vectors in the body coordinate system BC) found by the three-dimensional joint and element center-of-gravity location calculation means 53 and the weights of the rigid elements set as described above.

$$U(G\_entire/BC) = \{U(G\_chest/BC) \times m\_chest +$$

$$U(G\_abdomen/BC) \times m\_abdomen +$$

$$U(G\_waist/BC) \times m\_waist +$$

$$U(G\_right\ thigh/BC) \times m\_right\ thigh +$$

$$U(G\_left\ thigh/BC) \times m\_left\ thigh +$$

$$U(G\_right\ crus/BC) \times m\_right\ crus +$$

$$U(G\_left\ crus/BC) \times m\_left\ crus +$$

$$U(G\_right\ foot/BC) \times m\_right\ foot +$$

$$U(G\_left\ foot/BC) \times left\ foot\}/entire\ weight \quad (12)$$

The term "m_□□" such as m_chest is a weight of a rigid element corresponding to the name of □□ and thus the weight does not include the weight of the assistive apparatus 1. As shown by the formula (12), the position vector of the entire center of gravity U(G_entire/BC) is found by dividing the total sum of the products of the position vector in the body coordinate system BC of the center of gravity of the each rigid element of the person rigid link model S1 and the weight of the rigid element concerned by the entire weight of the person A (more specifically, the entire weight of the person A with the assistive apparatus 1 removed from the person A, which is equal to the total sum of the weights of all the rigid elements of the person rigid link model S1).

Subsequently, the person-side joint moment estimation means 41 performs calculation processing of the floor reaction force estimation means 57 and of the floor reaction force application point estimation means 58. In the arithmetic processing of the floor reaction force estimation means 57, it is determined first whether the motion state of the person A is a double support state in which both legs are landing (both of the foot orthosis portions 12, 12 of the assistive apparatus 1 are in contact with the ground), a single support state in which only one of the legs is landing (only one foot orthosis portion 12 of the assistive apparatus 1 is in contact with the ground), or a state in which no legs are landing, on the basis of detected outputs of the landing sensors 32, 33. In other words, if one of the landing sensors 32 and 33 of one leg outputs an ON signal indicating the presence of landing of the leg and one of the landing sensors 32 and 33 of the other leg outputs an ON signal indicating the presence of landing of the leg, it is determined that the person A is in the double support state. Moreover, if one of the landing sensors 32 and 33 of one of the legs outputs the ON signal indicating the presence of landing of the leg and neither of the landing sensors 32 and 33 of the other leg outputs the ON signal, it is determined that the person A is in the single support state. Then, in the processing of the floor reaction force estimation means 57, a floor reaction force vector acting on each leg of the person A is estimated according to the arithmetic processing for each thereof according to whether the person A is in the double support state or in the single support state. Incidentally, if neither of the landing sensors 32 and 33 of both legs outputs the ON signal, no legs are landing. If so, naturally the floor reaction force vector acting on each leg is zero.

Figure 10:
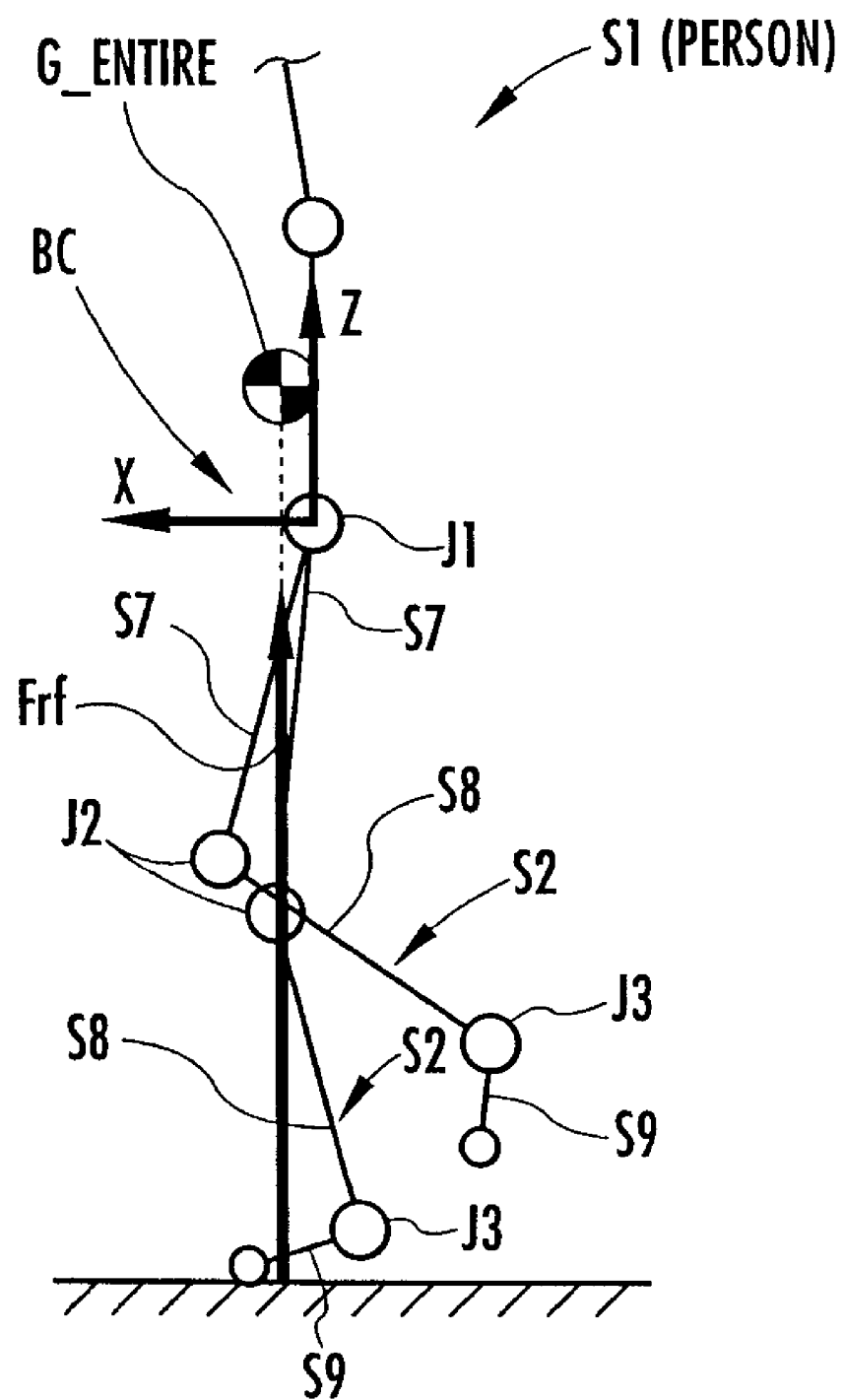
FIG. 10 is a diagram for explaining floor reaction force estimation processing of the person in a single support state.

Although the basic idea of the estimation processing of the floor reaction force vector is the same as Japanese Patent Laid-Open No. 2003-89083 or other publications that the present applicant has suggested earlier, in this embodiment mainly the coordinate systems and the like for use in the estimation processing differ from those of the techniques described in the same gazette or the like. It is described below with reference to FIG. 10 and FIGS. 11(*a*), (*b*). FIG. 10 illustrates the single support state of the person A viewed on the sagittal plane, and FIG. 11(*a*), (*b*) illustrate the double support states viewed on the sagittal plane and on the frontal plane. In these FIG. 10 and FIG. 11, the person A is typified and represented in the form of the person rigid link model S1. As shown in FIG. 10, if the motion state of the person A is the single support state, the floor reaction force vector Frf(right leg/BC) acting on the landing leg (it is assumed here to be the right leg, for example), in other words, the floor reaction force vector acting on the right leg represented by a coordinate component value in the body coordinate system BC is calculated by the following formula (13) representing an equation of motion related to the translational motion in the body coordinate system BC of the entire center of gravity G_entire:

$$Frf(right\ leg/BC) = Entire\ weight \times (ACC(BCO/BC) + U(G\_entire/BC)") \quad (13)$$

In the above, U(G_entire/BC)" is a second derivative of the position vector in the body coordinate system BC of the entire center of gravity G_entire and is calculated from the time series data of the position vector U(G_entire/BC) of the entire center of gravity G_entire calculated by the entire center-of-gravity location calculation means 56 in each arithmetic processing period of the arithmetic processing unit 23. The U(G_entire/BC)" denotes a relative acceleration of the entire center of gravity G_entire to the origin of the body coordinate system BC. Furthermore, the "entire weight" in the formula (13) is the entire weight of the person A (the entire weight of the person rigid link model S1) in the state where the person A is not wearing the assistive apparatus 1. Moreover, ACC(BCO/BC) is an acceleration vector of the origin BCO of the body coordinate system BC calculated by the body coordinate system acceleration and angular velocity calculation means 54. The acceleration vector ACC(BCO/BC) plus U(G_entire/BC)" denotes an actual acceleration of the entire center of gravity G_entire. Therefore, the floor reaction force vector Frf(right leg/BC) is calculated by the formula (13) from the time series data of the position vector of the G_entire calculated by the entire center-of-gravity location calculation means 56, the acceleration vector ACC(BCO/BC) of the origin of the body coordinate system BC calculated by the body coordinate system acceleration and angular velocity calculation means 54, and the entire weight of the person A (the entire weight of the person rigid link model S1). Also when the left leg is landing, the floor reaction force vector Frf(left leg/BC) is calculated by the calculation of the right-hand side of the formula (13) similarly in the single support state. In this case, ACC(BCO/BC) includes the inertial acceleration component caused by the gravity as described above and the floor reaction force vector Frf is represented by the body coordinate system BC. Therefore, there is no need to consider the gravitational acceleration or its direction. The floor reaction force vector Frf acting on the leg not landing is zero. While the Z axis of the body coordinate system BC is taken in the vertical direction for convenience of the illustration in FIG. 10, the formula (13) does not depend on the gradient of the body coordinate system BC.

Figure 11A:
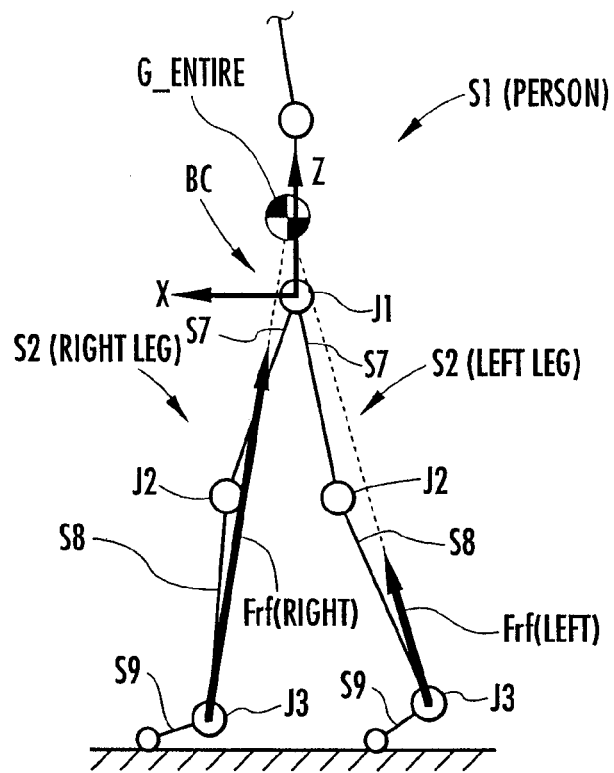
FIGS. 11(a), (b) are diagrams each for explaining floor reaction force estimation processing of the person in a double support state.
Figure 11B:
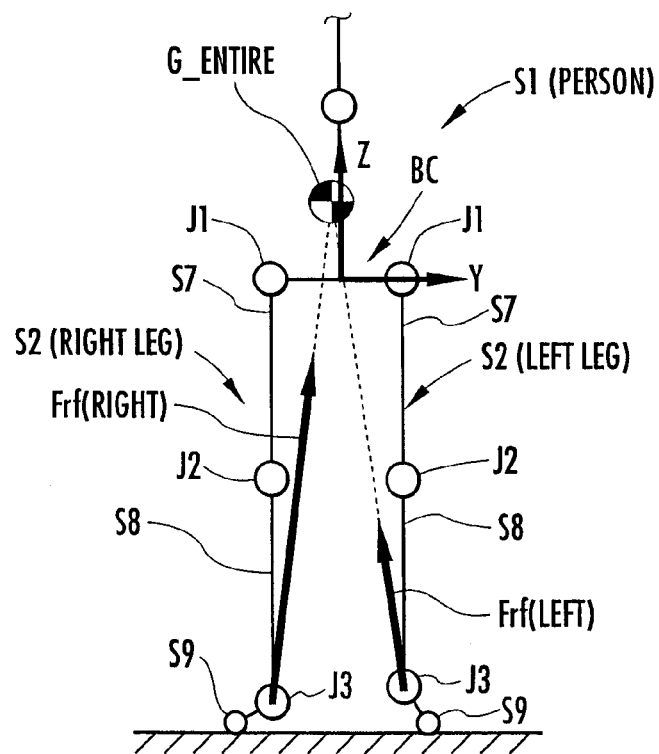

On the other hand, as shown in FIGS. 11(*a*), (*b*), in the double support state, the floor reaction force vector Frf(right leg/BC) acting on the right leg of the person A and the floor reaction force vector Frf(left leg/BC) acting on the left leg are calculated based on the following five relational expressions (14) to (18):

$$Frf(\text{right leg}/BC) + Frf(\text{left leg}/BC) = \text{Entire weight} \times (ACC(BCO/BC) + U(G\_entire/BC)") \quad (14)$$

$$Frf(\text{right leg}/BC)x \cdot Frf(\text{right leg}/BC)z = U(G\_entire/BC)x - U(J\_right\ ankle/BC)x \cdot U(G\_entire/BC)z - U(J\_right\ ankle/BC)z \quad (15)$$

$$Frf(\text{left leg}/BC)x \cdot Frf(\text{left leg}/BC)z = U(G\_entire/BC)x - U(J\_left\ ankle/BC)x \cdot U(G\_entire/BC)z - U(J\_left\ ankle/BC)z \quad (16)$$

$$Frf(\text{right leg}/BC)y \cdot Frf(\text{right leg}/BC)z = U(G\_entire/BC)y - U(J\_right\ ankle/BC)y \cdot U(G\_entire/BC)z - U(J\_right\ ankle/BC)z \quad (17)$$

$$Frf(\text{left leg}/BC)y \cdot Frf(\text{left leg}/BC)z = ACC(G\_entire/BC)y - U(J\_left\ ankle/BC)y \cdot U(G\_entire/BC)z - U(J\_left\ ankle/BC)z \quad (18)$$

Describing the meanings of these formulas (14) to (18) here, the formula (14) represents an equation of motion related to the translational motion in the body coordinate system BC of the entire center of gravity G_entire of the person A, in which the right-hand side thereof is the same as the right-hand side of the formula (13). Moreover, as shown in FIGS. 11(*a*), (*b*), the formulas (15) to (18) are geometric relational expressions obtained on the assumption that the floor reaction force vector Frf(right leg/BC) and the floor reaction force vector Frf(left leg/BC) are vectors each starting from the ankle joint J2 of the right leg or the ankle joint J3 of the left leg toward the entire center of gravity G_entire, in other words, on the assumption that the direction of the floor reaction force vector Frf and the direction of the position vector of G_entire viewed from the ankle joint J3 are coincident with each other. In this condition, the formulas (15) and (16) are relational expressions viewed on the sagittal plane (the XZ plane in the body coordinate system BC), and the formulas (17) and (18) are relational expressions viewed on the frontal plane (the YZ plane in the body coordinate system BC). While the Z axis of the body coordinate system BC is taken in the vertical direction for convenience of the illustration in FIG. 11, the formulas (14) to (18) do not depend on the gradient of the body coordinate system BC.

To find the floor reaction force vectors Frf(right leg/BC) and Frf(left leg/BC) in the double support state, Frf(right leg/BC) and Frf(left leg/BC) are calculated by solving a simultaneous equation composed of the aforementioned formulas (14) to (18) with the coordinate component values of these vectors defined unknowns. More specifically, Frf (right leg/BC) and Frf(left leg/BC) are calculated from the time series data of the position vector of G_entire calculated by the entire center-of-gravity location calculation means 56, the acceleration vector ACC(BCO/BC) of the origin of the body coordinate system BC calculated by the body coordinate system acceleration and angular velocity calculation means 54, the entire weight of the person A (the entire weight of the person A not including the assistive apparatus 1), and U(J_right ankle/BC) and U(J_left ankle/BC) calculated by the three-dimensional joint and element center-of-gravity location calculation means 53. In this manner, the floor reaction force vectors Frf(right leg/BC) and Frf(left leg/BC) in the double support state are calculated based on the relational expressions (14) to (18) described in the body coordinate system BC in this embodiment.

The Z-axis components of Frf(right leg/BC) and Frf(left leg/BC) can be found by using either the formulas (15), (16) related to the sagittal plane or the formulas (17), (18) related to the frontal plane. Moreover, while there have been used the formulas (15) to (18) supposing that the floor reaction force vector Frf(right leg/BC) and the floor reaction force vector Frf(left leg/BC) are vectors each starting from the ankle joint J1 of the right leg or the ankle joint J1 of the left leg toward the entire center of gravity G_entire in this embodiment, it is also possible to use the position (the position in the body coordinate system BC) of the neighboring point where there is each ankle joint J1 or the position (the position in the body coordinate system BC) of the floor reaction force application point of each leg calculated as described later, instead of U(J_right ankle/BC) and U(J_left ankle/BC) of the formulas (15) to (18).

In the arithmetic processing of the floor reaction force application point estimation means 58, a transformation tensor R(BC→IC) from the body coordinate system BC to an absolute coordinate system IC is generated, first, based on the tilt angle to the vertical direction of the waist element S4 calculated by the body coordinate system tilt angle calculation means 55. Note here that the absolute coordinate system IC is a rectangular coordinate system whose Z axis is taken in the vertical direction and the body coordinate system BC and whose coordinate axes are oriented in the same directions as those of the body coordinate system BC in the reference posture condition. The transformation tensor R(IC→BC) from the absolute coordinate system IC to the body coordinate system BC is a transposition R(BC→IC)$^T$ of the transformation tensor R(BC→IC). In addition, when performing a leg motion in which the tilt angle relative to the vertical direction of the waist element S4 is substantially constant, the above transformation tensor R(BC→IC) is roughly constant, and therefore it may be previously stored in the memory of the arithmetic processing unit 23.

Subsequently, the position vector U(G_entire/BC) of the entire center of gravity G_entire previously found by the entire center-of-gravity location calculation means 56 and the respective position vectors U(J_ankle/BC) and U(J_MP/BC) of the ankle joint J3 and the MP joint J4 of the each leg section S2 previously found by the three-dimensional joint and element center-of-gravity location calculation means 53 are each multiplied by the transformation tensor R(BC→IC) by using the above transformation tensor R(BC→IC), thereby achieving the calculations of the position vectors U(G_entire/IC), U(J_ankle/IC), and U(J_MP/IC) viewed in the absolute coordinate system IC of the entire center of gravity G_entire, the ankle joint J3, and the MP joint J4. These position vectors U(G_entire/IC), U(J_ankle/IC), and U(J_MP/IC) are those in the absolute coordinate system IC having the same origin as of the body coordinate system BC. Regarding the leg determined not to be landing on the basis of detected outputs of the landing sensors 32, 33, there is no need to calculate the position vectors U(J_ankle/IC) and U(J_MP/IC).

Figure 13:
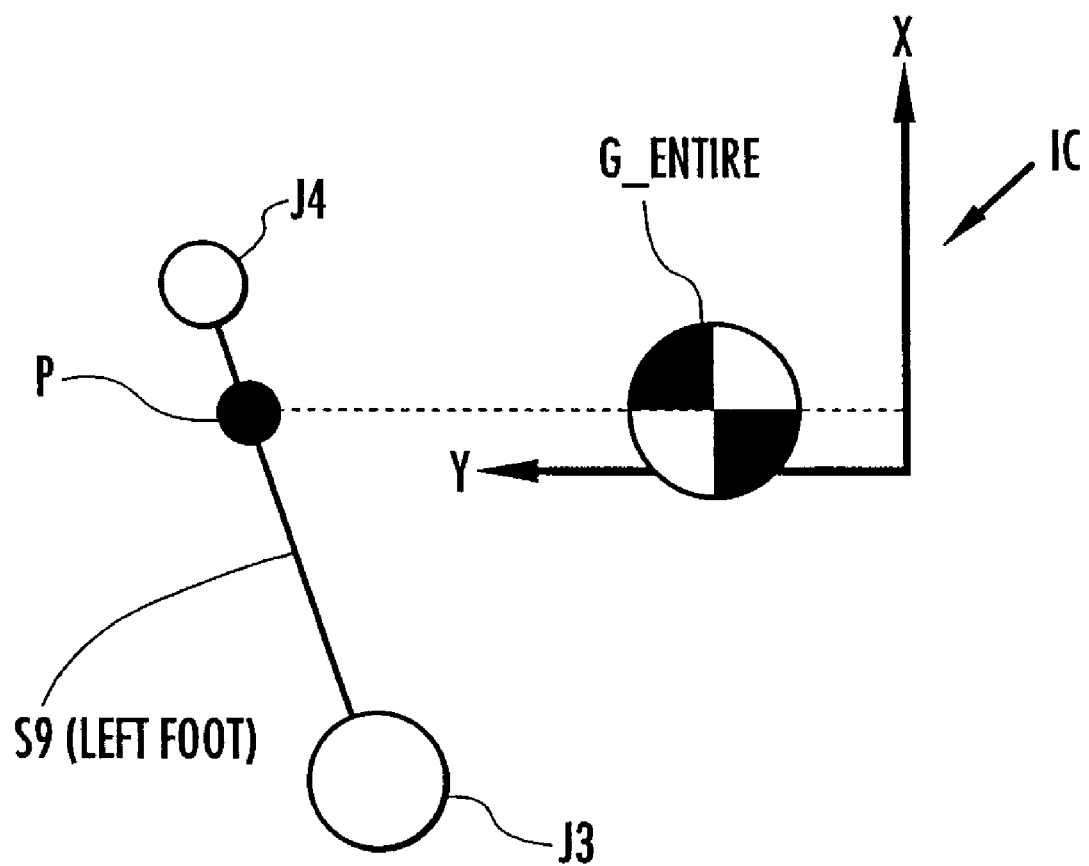
FIG. 13 is a diagram for explaining estimation processing of the floor reaction force application point on a horizontal plane of the person.
Figure 14:
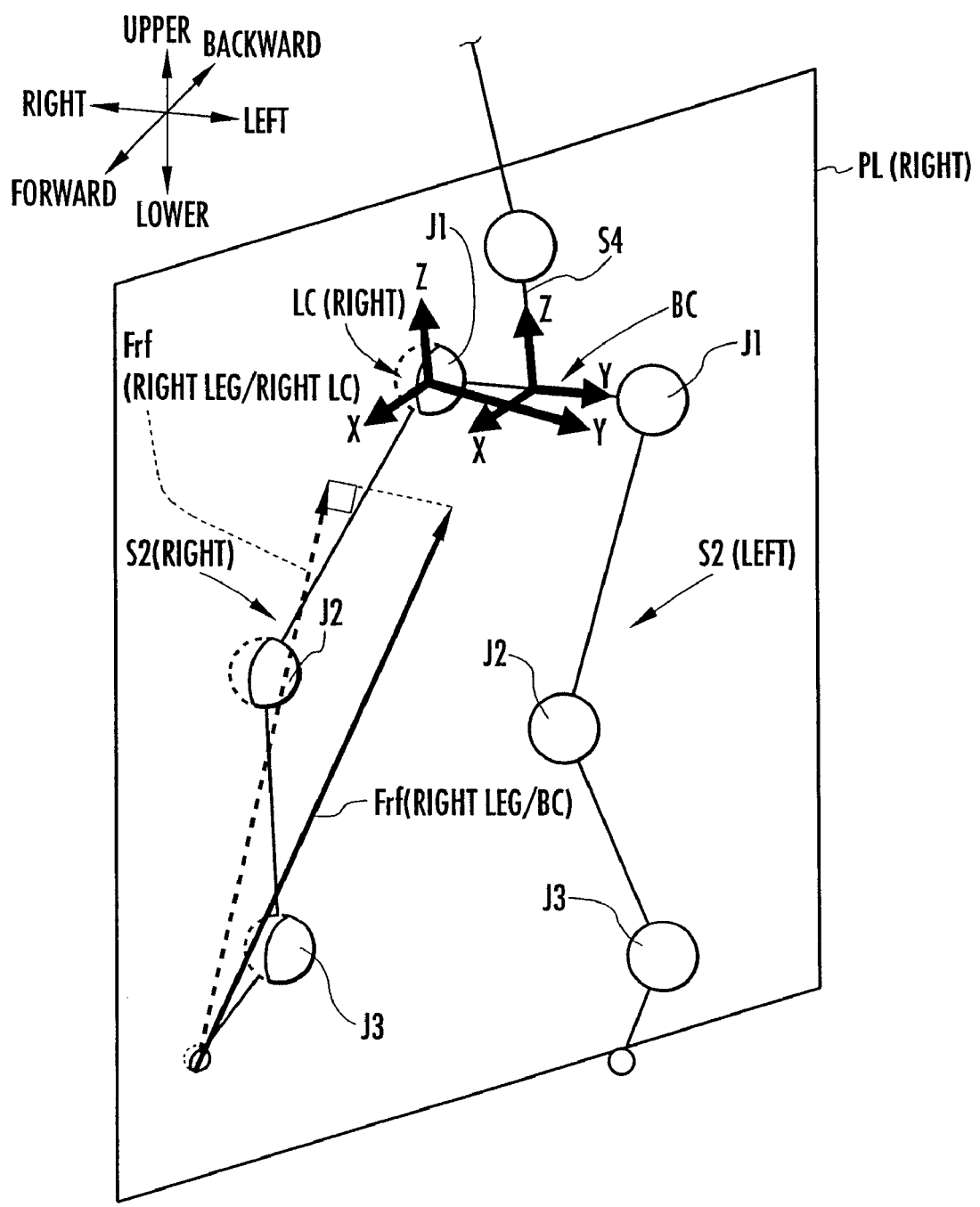
FIG. 14 is a diagram for explaining projection of a physical quantity to the leg plane for estimating a joint moment of the person.

Subsequently, for each leg determined to be landing on the basis of detected outputs of the landing sensors 32, 33, the X-axis component and the Y-axis component of the position vector (the position vector in the absolute coordinate system IC) U(COP/IC) of the floor reaction force application point are determined according to the magnitude relation of the X-axis direction components U(G_entire/IC)x, U(J_ankle/IC)x, and U(J_MP/IC)x of the position vectors U(G_entire/IC), U(J_ankle/IC), and U(J_MP/IC), in other words, according to the relative horizontal positional relationship in the forward/backward direction of the entire center of gravity G_entire, the ankle joint J3, and the MP joint. J4. This determination method is described in more detail below by referring to FIGS. 12(a) to (c) and FIG. 13. Note here that the left leg 2 is assumed to be landing in the description below. FIGS. 12(a) to (c) illustrate states in which the left leg of the person A is landing (the single support state in these diagrams), viewed on the sagittal plane. FIG. 13 shows a plan view of the foot of the landing leg in the state of FIG. 12(b). In FIG. 12 and FIG. 13, the person A is typically shown in the form of a rigid link model S1.

As shown in FIG. 12(a), if the entire center of gravity G_entire is more forward than the MP joint J4 of the landing left leg, in other words, if U(G_entire/IC)x>U(J_left MP/IC)x, the foot S9 of the left leg is landing with the leg braced mainly in the toe-side portion. In this case, the floor reaction force application point COP exists substantially just under the MP joint J4 of the foot. Therefore, in this case, it is assumed that the X- and Y-axis components of the position vector U(left COP/IC) of the floor reaction force application point COP are equal to the X- and Y-axis components of the position vector U(J_left MP/IC) of the MP joint J4, respectively. In other words, it is assumed that U(left COP/IC)x=U(J_left MP/IC)x and U(left COP/IC)y=U(J_left MP/IC)y.

Moreover, as shown in FIG. 12(c), if the entire center of gravity G_entire is more backward than the ankle joint J3 of the landing left leg, in other words, if U(G_entire/IC)x<U(J_left ankle/IC)x, the foot S9 of the left leg is landing with the leg braced mainly in the heel-side portion. In this case, the floor reaction force application point COP exists substantially just under the ankle joint 13 of the left leg. Therefore, in this case, it is assumed that the X- and Y-axis components of the position vector U(left COP/IC) of the floor reaction force application point COP are equal to the X- and Y-axis components of the position vector U(J_left ankle/IC) of the ankle joint J3, respectively. In other words, U(left COP/IC)x=U(J_left ankle/IC)x and U(left COP/IC)y U(J_left ankle/IC)y.

Moreover, as shown in FIG. 12(b), if the entire center of gravity G_entire exists between the ankle joint J3 of the left leg and the MP joint J4 in the forward/backward direction, in other words, if U(J_left MP/IC)x≦U(G_entire/IC)x≦U(J_left ankle/IC)x, the floor reaction force application point COP exists substantially just under the entire center of gravity G_entire on the shown sagittal plane. Therefore, in this case, it is assumed that the X-axis component of the position vector U(left COP/IC) of the floor reaction force application point COP is equal to the X-axis component of the entire center of gravity G_entire. In other words, it is assumed that U(right and left COP/IC)x=U(G_entire/IC)x. Then, the position of the floor reaction force application point COP is thought to be generally on a line segment generated by projecting the line segment between the center of the ankle joint J3 and the center of the MP joint J4 onto the floor surface. Accordingly, it is assumed that the Y-axis component of the position vector U(right COP/IC) of the floor reaction force application point COP is equal to the Y-axis component of a point P where the value of the entire center of gravity G_entire is equal to the value of the X-axis component (the X-axis component in the absolute coordinate system IC) on the line segment between the center of the ankle joint J3 and the center of the MP joint J4 of the left leg as shown in FIG. 13. The value of the Y-axis component of the position vector U(left COP/IC) is found based on the following formula (19) indicating the proportional relation:

$$U(\text{left } COP/IC)x - U(J\_\text{left ankle}/IC)x : U(J\_\text{left } MP/IC)x -$$

$$U(J\_\text{left ankle}/IC)x = U(\text{left } COP/IC)y -$$

$$U(J\_\text{left ankle}/IC)y : U(J\_\text{left } MP/IC)y -$$

$$U(J\_\text{left ankle}/IC)y \qquad (19)$$

Moreover, it is assumed that the Z-axis component of the position vector U(left COP/IC) of the floor reaction force application point is equal to the Z-axis component of the point, which is a predetermined value H0 (>0) away from the ankle joint J3 of the left leg downward in the vertical direction. In other words, it is assumed that U(left COP/IC)z=U(J_left ankle/IC)z–H0. In this regard, the predetermined value H0 is a distance in the vertical direction from the floor surface to the center of the ankle joint J3 in the reference posture condition (more accurately, in the state where the almost entire bottom face of the foot orthosis portion 12 on the under surface of the foot S3 is put in contact with the horizontal floor surface), and it is previously measured and stored in the memory of the arithmetic processing unit 23. While the predetermined value H0 may be measured for each of the right and left legs individually, a value measured for one of the legs may be used for the both right and left legs in common.

In this embodiment, we can obtain the position vector U(left COP/IC) of the floor reaction force application point of the floor reaction force vector Frf acting on the left leg when the left leg is landing, as described hereinabove. The same applies to the right leg when it is landing. In this instance, in the double support state, the position vector of the floor reaction force application point is found as described above for each of the both legs.

In this embodiment, the predetermined value H0 for use in finding the Z-axis component of the position vector U(COP/IC) of the floor reaction force application point has been defined as a constant value. If, however, the landing sensors 32 and 33 detect that the foot S9 is in contact with the ground only in the toe-side portion, in other words, if only the landing sensor 33 outputs the ON signal indicating the landing of the leg, you may use the difference in the Z-axis component (U(J_ankle/IC)z–U(J_MP/IC)z) between the position vectors U(J_ankle/IC) and U(J_MP/IC) of the ankle joint J3 and the MP joint J4, namely, the distance in the vertical direction between the ankle joint J3 and the MP joint J4, instead of the predetermined value H0, regarding the landing leg. This improves the accuracy of U(COP/IC).

In the arithmetic processing of the floor reaction force application point estimation means 58, finally the value U(COP/BC) in the body coordinate system BC of the position vector of the floor reaction force application point is found by multiplying the position vector U(COP/IC) of the floor reaction force application point obtained for each landing leg as described above by the inverse transformation tensor R(IC→BC), which is a transposition of the previously obtained transformation tensor R(BC→IC).

Subsequently, the person-side joint moment estimation means 41 performs the arithmetic processing of the leg plane projection means 59. In this processing, the acceleration vector ACC(BCO/BC) and the angular velocity vector ω(BCO/BC) of the origin BCO of the body coordinate system BC calculated by the body coordinate system acceleration and angular velocity calculation means 54, the floor reaction force vectors Frf(right leg/BC) and Frf(left leg/BC) calculated by the floor reaction force estimation means 57, and the position vector U(COP/BC) of the floor reaction force application point COP calculated by the floor reaction force application point estimation means 58 are projected to the leg plane PL corresponding to each of the leg sections S2 for each thereof by using the transformation tensor R(BC→LC) (=R(LC→BC)$^T$), which is a transposition of the transformation tensor R(LC→BC) generated by the transformation tensor generation means 51.

More specifically, the acceleration vector ACC(BCO/LC) and the angular velocity vector ω(BCO/LC) viewed from the each leg coordinate system LC are obtained by multiplying the acceleration vector ACC(BCO/BC) and the angular velocity vector ω(BCO/BC) each by the transformation tensor R(BC→LC) as shown by the following formulas (20a) and (20b):

$$ACC(BCO/LC)=R(BC{\rightarrow}LC){\times}ACC(BCO/BC) \quad (20a)$$

$$\omega(BCO/LC)=R(BC{\rightarrow}LC){\times}\omega(BCO/BC) \quad (20b)$$

The acceleration vector ACC(BCO/LC) and the angular velocity vector ω(BCO/LC) are each calculated as one corresponding to the leg coordinate system LC of the left leg section S2 and one corresponding to the leg coordinate system LC of the right leg section S2 individually.

Similarly, the floor reaction force vectors Frf(right leg/right LC) and Frf(left leg/left LC) viewed from the each leg coordinate system LC are obtained by multiplying the floor reaction force vectors Frf(right leg/BC) and Frf(left leg/BC) by the transformation tensors R(BC→right LC) and R(BC→left LC), respectively, as shown by the following formulas (20c) and (20d):

$$Frf(\text{right leg/right } LC)=R(BC{\rightarrow}\text{right } LC){\times}Frf(\text{right leg}/BC) \quad (20c)$$

$$Frf(\text{left leg/left } LC)=R(BC{\rightarrow}\text{left } LC){\times}Frf(\text{left leg}/BC) \quad (20d)$$

Moreover, the position vector U(COP/LC) of the floor reaction force application point COP viewed from the leg coordinate system LC corresponding to the landing leg 2 is obtained by multiplying the position vector U(COP/BC) of the floor reaction force application point COP of the landing leg 2 by the transformation tensor R(BC→LC) corresponding to the leg 2 as shown by the following formula (20e):

$$U(COP/LC)=R(BC{\rightarrow}LC){\times}U(COP/BC) \quad (20e)$$

Incidentally, the position vector U(COP/LC) is calculated only for the landing leg in the single support state of the person A, while it is calculated for each of the right and left legs in the double support state.

In this point, regarding the acceleration vector ACC (BCO/LC), the floor reaction force vectors Frf(right leg/right LC) and Frf(left leg/left LC), and the position vector U(COP/LC) of the floor reaction force application point, a pair of the X coordinate component and the Z coordinate component for each of them are obtained as vectors of two-dimensional quantities obtained by projecting the vectors in the body coordinate system BC (three-dimensional quantities) corresponding to each of them to each leg plane PL (the XZ plane in the leg coordinate system LC). For example, by referring to FIG. 14, assuming that the floor reaction force vector Frf(right leg/LC) of the right leg in the body coordinate system BC is a vector as indicated by the shown solid line, the pair of the X coordinate component and the Z coordinate component of the floor reaction force vector Frf(right leg/right LC) is represented by a vector on the leg plane PL(right) as indicated by the dashed line shown in FIG. 14.

A rotary motion of a leg on the leg plane PL is a rotary motion around an axis in the normal line direction (the Y axis direction of the leg coordinate system LC) of the leg plane PL. Therefore, the angular velocity vector ω(BCO/BC) projected to the leg plane PL is a Y coordinate component of the angular velocity vector ω(BCO/LC) in the leg coordinate system LC found by the aforementioned formula (20b).

In the following description of the joint moment calculation means 60, it is assumed that the acceleration vector ACC(BCO/LC), the floor reaction force vectors Frf(right leg/right LC) and Frf(left leg/left LC), and the position vector U(COP/LC) of the floor reaction force application point denote two-dimensional vectors each made of the pair of the X-axis component and the Z-axis component. For example, the acceleration vector ACC(BCO/LC) denotes (ACC(BCO/LC)x, ACC(BCO/LC) z)$^T$. The value on the leg plane PL of the angular velocity ω is represented by ω(BCO/LC)y.

Subsequently, the person-side joint moment estimation means 41 performs arithmetic processing of the joint moment calculation means 60. Describing the outline of the arithmetic processing of the joint moment calculation means 60, the joint moments of the joint elements J_ankle, J_knee, and J_hip at the endpoints on the waist element S4 side of the foot element S9, the crus element S8, and the thigh element S7 are calculated in order by the operation of the inverse dynamics model based on the equations of motion related to the translational motion and the rotary motion of the foot element S9, the crus element S8, and the thigh element S7 of the each leg section S2. In this instance, the inverse dynamics model is treated on the leg plane PL (the XZ plane of the leg coordinate system LC) corresponding to each of the leg sections S2 for each thereof. The basic idea of the calculation processing is the same as one suggested by the applicant earlier in Japanese Patent Laid-Open No. 2003-89083 and the like, except the plane and coordinate system where the inverse dynamics model is treated.

Figure 15:
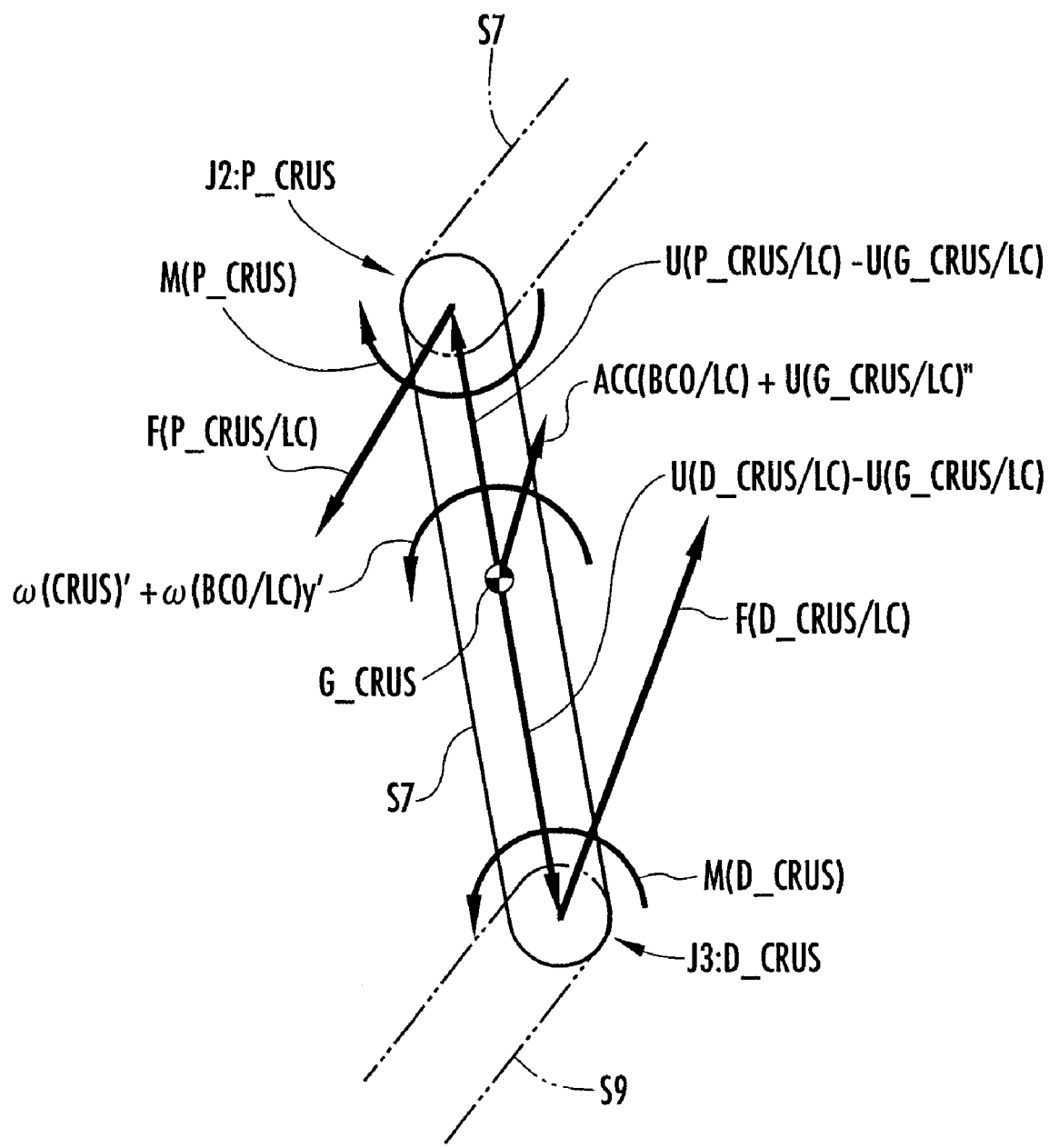
FIG. 15 is a diagram for explaining estimation processing of a joint moment of the person using an inverse dynamics model.

Explaining in concrete terms hereinafter, the equations of motion of the translational motion on the leg plane PL of the foot element S9, the crus element S8, and the thigh element S7 of the each leg section S2 are given by the formulas (21) to (23) below. In the following description, one end closer to the waist element S4 is sometimes denoted by "P_□□" and the other end farther from the waist element S4 is sometimes denoted by "D_□□" (□□ is a name of the rigid element) for both ends of the rigid elements of the foot element S9, the crus element S8, and the thigh element S7. For example, as shown in FIG. 15, the end of the crus element S8 on the knee joint J_knee (J2) side is denoted by "P_crus" and the other end on the ankle joint J_ankle (J3) side is denoted by "D_crus."

$$F(P\_foot/LC) = m\_foot \times (ACC(BCO/LC) + U(G\_foot/LC)'') - Frf(leg/LC) \quad (21)$$

$$F(P\_crus/LC) = m\_crus \times (ACC(BCO/LC) + U(G\_crus/LC)'') - F(D\_crus/LC) \quad (22)$$

$$F(P\_thigh/LC) = m\_thigh \times (ACC(BCO/LC) + U(G\_thigh/LC)'') - F(D\_thigh/LC) \quad (23)$$

In the above, the two denotations, F(P_□□/BC) and F(D_□□/BC), appearing in the above formulas (21) to (23) denote respectively reaction force vectors (two-dimensional translational force vectors on the leg plane PL) applied by an object put in contact with the ends of the rigid element whose name is represented by □□ to the ends thereof. Therefore, according to the law of action and reaction, F(D_crus/BC)=−F(P_foot/BC) and FD(D_thigh/BC)=−F(P_crus/BC). In the formula (21) related to the foot element S9, the end farther from the waist element S4 of the foot element S9 is considered to be a floor reaction force application point COP and the floor reaction force vector Frf(leg/LC) found by the leg plane projection means 59 is used as a reaction force acting from the floor to the end (the floor reaction force application point COP).

Moreover, U(G_foot/LC)″, U(G_crus/LC)″, and U(G_thigh/LC)″ respectively denote second derivatives of the position vectors of the centers of gravity G_foot, G_crus, and G_thigh (more accurately, the pairs of the X coordinate component and the Z-coordinate component of the position vectors) in the leg coordinate system LC previously calculated by the two-dimensional leg posture and element center-of-gravity location calculation means 52, in other words, relative accelerations (two-dimensional vectors) of the centers of gravity G_foot, G_crus, and G_thigh viewed on the leg plane PL to the origin of the leg coordinate system LC. In this instance, the acceleration vector on the leg plane PL of the origin of the leg coordinate system LC (the center of the hip joint J1) is substantially the same as the acceleration vector ACC(BCO/LC) of the origin of the body coordinate system BC. Therefore, the sum of the acceleration vectors ACC(BCO/LC) and U(G_foot/LC)″, U(G_crus/LC)″, or U(G_thigh/LC)″ indicates an actual acceleration vector of the center of gravity G_foot, G_crus, or G_thigh on the leg plane PL.

FIG. 15 typically illustrates a relationship among parameters of the formula (22) related to the crus element S8.

Accordingly, F(P_foot/LC), namely, the translational force (a two-dimensional vector on the leg plane PL) acting on the ankle joint J_ankle is found by the calculation of the right-hand side of the formula (21) from the floor reaction force vectors Frf(leg/LC) and the acceleration vector ACC(BCO/LC) obtained by the leg plane projection means 59, the relative acceleration vector U(G_foot/LC)″ obtained from the time series data of the position vector U(G_foot/LC) of the center of gravity of the foot element S9 found by the two-dimensional leg posture and element center-of-gravity location calculation means 52, and the weight m_foot of the foot element S9. In addition, F(P_crus/LC), namely, the translational force (a two-dimensional vector on the leg plane PL) acting on the knee joint J_knee is found by the calculation of the right-hand side of the formula (22) from the found F(P_foot/LC) (=−F(D_crus/LC)), the acceleration vector ACC(BCO/LC) found by the leg plane projection means 59, the relative acceleration vector U(G_crus/LC)″ obtained from the time series data of the position vector U(G_crus/LC) of the center of gravity of the crus element S8 found by the two-dimensional leg posture and element center-of-gravity location calculation means 52, and the weight m_crus of the crus element S8. Similarly, F(P_thigh/LC), namely, the translational force (a two-dimensional vector on the leg plane PL) acting on the hip joint J_hip is found by the calculation of the right-hand side of the formula (23) by using the found F(P_crus/LC) (=−F(D_thigh/LC)) and the like. In this manner, the reaction force vectors (translational vectors) acting on the joint elements J_ankle, J_knee, and J_hip are calculated in order on the basis of the equations of motion in the above (21) to (23).

Subsequently, the equations of motion of the rotary motions (rotary motions around an axis passing through the corresponding center of gravity and perpendicular to the leg plane PL) of the foot element S9, the crus element S8, and the thigh element S7 are given by the following formulas (24) to (26):

$$M(P\_foot) = I\_foot \times (\omega(foot)' + \omega(BCO/LC)y') - \{(U(COP/LC) - U(G\_foot/LC)) \times Frf(leg/LC)\}y - \{(U(P\_foot/LC) - U(G\_foot/LC)) \times F(P\_foot/LC)\}y \quad (24)$$

$$M(P\_crus) = I\_crus \times (\omega(crus)' + \omega(BCO/LC)y') - \{(U(D\_crus/LC) - U(G\_crus/LC)) \times F(D\_crus/LC)\}y - \{(U(P\_crus/LC) - U(G\_crus/LC)) \times F(P\_crus/LC)\}y - M(D\_crus) \quad (25)$$

$$M(P\_thigh) = I\_thigh \times (\omega(thigh)' + \omega(BCO/LC)y') - \{(U(D\_thigh/LC) - U(G\_thigh/LC)) \times F(D\_thigh/LC)\}y - \{(U(P\_thigh/LC) - U(G\_thigh/LC)) \times F(P\_thigh/LC)\}y - M(D\_thigh) \quad (26)$$

In the above, M(P_□□) and M(D_□□) appearing in the above formulas (24) to (26) denote respectively reaction force moments (each of which is the moment around the axis perpendicular to the leg plane PL (around the axis parallel to the Y axis of the leg coordinate system LC)) applied by an object put in contact with the ends of the rigid element whose name is represented by □□ to the ends thereof (See FIG. 15). Therefore, according to the law of action and reaction, M(D_crus)=−M(P_foot) and M(D_thigh)=−M(P_crus). Moreover, I_foot, I_crus, and I_thigh are respectively moments of inertia (more specifically, moments of inertia not including the moments of inertia of the assistive apparatus 1) around the corresponding center of gravity of the foot element S9, the crus element S8, and the thigh element S7 of the person rigid link model S1. They are previously determined based on the measurement data or the like and stored in the memory of the arithmetic processing unit 23, similarly to the weights of the rigid elements of the person rigid link model S1. Furthermore, ω(foot)', ω(crus)', and ω(thigh)' respectively denote first derivatives of the relative angular velocities ω(foot), ω(crus), and ω(thigh) (relative angular velocities around the axis perpendicular to the leg plane PL), in other words, relative angular accelerations, viewed from the leg coordinate system LC of the foot element S9, the crus element S8, and the thigh element S7. These are given as second derivatives of the tilt angles θ_foot, θ_crus, and θ_thigh of the foot element S9, the crus element S8, and the thigh element S7 found by the two-dimensional leg posture and element center-of-gravity location calculation means 52, respectively, as shown by the following formulas (26a) to (26c):

$$\omega(\text{foot})' = \theta\_\text{foot}'' \quad (26a)$$

$$\omega(\text{crus})' = \theta\_\text{crus}'' \quad (26b)$$

$$\omega(\text{thigh})' = \theta\_\text{thigh}'' \quad (26c)$$

In addition, ω(BCO/LC)y' is a first derivative of the actual angular velocity ω(BCO/LC)y of the origin BCO of the body coordinate system BC found by the leg plane projection means 59. The sum of the first derivative ω(BCO/LC)y' and ω(foot)', ω(crus)', or ω(thigh)' indicates the actual angular acceleration (the angular acceleration around the axis perpendicular to the leg plane PL) of the foot element S9, the crus element S8, or the thigh element S7.

FIG. 15 typically illustrates the relationship among parameters of the formula (25) related to the crus element S8.

The joint moment calculation means 60 sequentially calculates joint moments M(P_foot), M(P_crus), and M(P_thigh) finally by using the above formulas (24) to (26). More specifically, the joint moment M(P_foot), namely, the moment around the axis perpendicular to the leg plane PL acting on the ankle joint J3 is found by the calculation of the right-hand side of the formula (24) from the floor reaction force vectors Frf(leg/LC) and U(COP/LC) found by the leg plane projection means 59, the angular acceleration ω(BCO/LC)y' grasped from time series data of the angular velocity ω(BCO/LC)y found by the leg plane projection means 59, the relative angular acceleration ω(foot)' (=θ_foot'') grasped from the time series data of the tilt angle θ_foot found by the two-dimensional leg posture and element center-of-gravity location calculation means 52, the position vectors U(G_foot/LC) and U(P_foot/LC) (=U(J_ankle/LC) (more accurately, the pairs of the X coordinate component and the Z-coordinate component of these position vectors) found by the two-dimensional leg posture and element center-of-gravity location calculation means 52, the reaction force F(P_foot/LC) previously obtained by the formula (21), and the preset moment of inertia I_foot.

Furthermore, the joint moment M(P_crus), namely, the moment around the axis perpendicular to the leg plane PL acting on the knee joint J2 is found by the calculation of the right-hand side of the formula (25) from the found joint moment M(P_foot) (=−M(D_crus)), the reaction forces F(P_foot/LC) (=−F(D_crus/LC)) and F(P_crus/LC) previously found by the formulas (21) and (22), the angular acceleration ω(BCO/LC)y' grasped from the time series data of the angular velocity ω(BCO/LC)y obtained by the leg plane projection means 59, the relative angular acceleration ω(crus)' (=θ_crus'') grasped from the time series data of the tilt angle θ_crus found by the two-dimensional leg posture and element center-of-gravity location calculation means 52, the position vectors U(G_crus/LC), U(P_crus/LC) (=U(J_knee/LC)), and U(D_crus/LC) (=U(J_ankle/LC)) (more accurately, the pairs of the X coordinate component and the Z-coordinate component of these position vectors) found by the two-dimensional leg posture and element center-of-gravity location calculation means 52, and the preset moment of inertia I_crus. Similarly, M(P_thigh), namely, the moment around the axis perpendicular to the leg plane PL acting on the hip joint J1 is found by the calculation of the right-hand side of the formula (25) by using the found M(P_crus) (=−M(D_thigh)) and the like.

While the moments of inertia I_foot, I_crus, and I_thigh of the rigid elements of the each leg section S2 have been considered in this embodiment, these values are sufficiently close to zero in general. Therefore, the terms including the moment of inertia I_foot, I_crus, or I_thigh may be omitted in the calculations of the formulas (23) to (25). If this is the case, there is no need to grasp the angular velocity or angular acceleration of the foot element S9, the crus element S8, or the thigh element S7.

As described above, in the arithmetic processing of the joint moment calculation means 60, the joint moments M(P_foot), M(P_crus), and M(P_thigh) around the axis perpendicular to the leg plane PL of the ankle joint, the knee joint, and the hip joint of the each leg 2 of the person A are calculated in order from the ankle joint side. These joint moments M(P_foot), M(P_crus), and M(P_thigh) are such moments that should be generated at the ankle joint, the knee joint, and the hip joint of each leg when the person A is performing substantially the same motion as one actually being performed by the person A wearing the assistive apparatus 1, without the assistive apparatus 1 (performed by the person A without help).

Subsequently, the arithmetic processing of the apparatus-side joint moment estimation means 42 is described below. The arithmetic processing of the apparatus-side joint moment estimation means 42 is sequentially performed for each processing period of the arithmetic processing unit 23 in parallel with the arithmetic processing of the person-side joint moment estimation means 41. The basic method of the arithmetic processing is the same as the arithmetic processing of the person-side joint moment estimation means 41. Therefore, the following description will be given focusing on different points from the arithmetic processing of the person-side joint moment estimation means 41. In the following description until the end of the description of the arithmetic processing of the apparatus-side joint moment estimation means 42, the rigid elements are assumed to denote the rigid elements of the apparatus rigid link model S1', unless otherwise specified.

In the arithmetic processing of the apparatus-side joint moment estimation means 42, the two-dimensional leg posture and element center-of-gravity location calculation means 61 performs arithmetic processing, first, after the execution of the arithmetic processing performed by the two-dimensional leg posture and element center-of-gravity location calculation means 52 of the person-side joint moment estimation means 41, thereby finding the position vector in the leg coordinate system LC of the center of gravity of a rigid element of the apparatus rigid link model S1' (a rigid element of the leg section S2).

More specifically, the position vectors U(G_thigh orthosis/LC), U(G_crus orthosis/LC), and U(G_foot orthosis/LC) of the centers of gravity G_thigh orthosis (G7), G_crus orthosis (G8), and G_foot orthosis (G9) of the thigh element S7, the crus element S8, and the foot element S9 are calculated by the following formulas (27a) to (27c), respectively:

$$U(G\_\text{thigh orthosis}/LC) = U(J\_\text{knee}/LC) + R(C\_\text{thigh} \rightarrow LC) \times U(G\_\text{thigh orthosis}/C\_\text{thigh}) \quad (27a)$$

$$U(G\_\text{crus orthosis}/LC) = U(J\_\text{ankle}/LC) + R(C\_\text{crus} \rightarrow LC) \times U(G\_\text{crus orthosis}/C\_\text{crus}) \quad (27b)$$

$$U(G\_\text{foot orthosis}/LC) = U(J\_MP/LC) + R(C\_\text{foot} \rightarrow LC) \times U(G\_\text{foot orthosis}/C\_\text{foot}) \quad (27c)$$

In the formulas (27a) to (27c), the transformation tensors R(C_thigh→LC), R(C_crus→LC), and R(C_foot→LC) and the position vectors U(J_knee/LC, U(J_ankle/LC), and U(J_MP/LC) are found by the two-dimensional leg posture and element center-of-gravity location calculation means 52 of the person-side joint moment estimation means 41. In addition, U(G_thigh orthosis/C_thigh), U(G_crus orthosis/

C_crus), and U(G_foot orthosis/C_foot) are position vectors of the centers of gravity of the rigid elements represented in the element coordinate system of the corresponding rigid elements, and they are previously stored in the memory of the arithmetic processing unit 23.

The pairs of the X coordinate component and the Z coordinate component of the position vectors U(G_thigh orthosis/LC), U(G_crus orthosis/LC), and U(G_foot orthosis/LC) calculated by the aforementioned formulas (27a) to (27c) represent the two-dimensional positions on the leg plane PL.

Moreover, in the arithmetic processing of the two-dimensional element center-of-gravity location calculation means 61, the position vectors in the leg coordinate system LC of the support members S9$a$, S9$b$ (see the above FIG. 5) of the foot element S9 are also calculated. Here, the support member S9$b$ on the front side is referred to as the front support member and the support member S9$a$ on the back side is referred to as the back support member regarding the support members S9$a$, S9$b$ of the each foot element S9. Assuming that their respective position vectors (position vectors in the leg coordinate system LC) are U(front support member/LC) and U(back support member/LC), U(front support member/LC) and U(back support member/LC) are each calculated by a formula in which U(G_foot orthosis/C_foot) in the right-hand side of the above formula (27a) is replaced with U(front support member/C_foot) or U(back support member/C_foot). U(front support member/C_foot) and U(back support member/C_foot) are position vectors of the front support member S9$a$ and the back support member S9$b$ in the element coordinate system C_foot (C9) of the each foot element S9 and are previously stored in the memory of the arithmetic processing unit 23.

Subsequently, the apparatus-side joint moment estimation means 42 performs the arithmetic processing of the three-dimensional element center-of-gravity location calculation means 62 to find the position vectors in the body coordinate system BC of the centers of gravity of the rigid elements of the apparatus rigid link model S1'. This arithmetic processing is performed in the same manner as for finding the three-dimensional position vectors of the centers of gravity of the rigid elements of the person rigid link model S1 in the three-dimensional joint and element center-of-gravity location calculation means 53 of the person-side joint moment estimation means 41. In other words, the position vectors the position vectors U(G_thigh orthosis/BC), U(G_crus orthosis/BC), and U(G_foot orthosis/BC) in the body coordinate system BC of the centers of gravity of the thigh element S7, the crus element S8, and the foot element S9 are found by calculating the formulas in which U(J_left knee/LC) in the right-hand side of the aforementioned formula (4b) is replaced with the position vectors U(G_thigh orthosis/LC), U(G_crus orthosis/LC), and U(G_foot orthosis/LC) of the centers of gravity previously calculated by the two-dimensional element center-of-gravity location calculation means 61, respectively. The position vectors in the body coordinate system BC of G_thigh orthosis, G_crus orthosis, and G_foot orthosis are calculated for each of the leg sections S2 individually.

In addition, the position vector U(G_waist orthosis/BC) of the center of gravity G4 of the waist element S4 is calculated by the formula in which U(G_waist/C_waist) in the right-hand side of the aforementioned formula (6) is replaced with the position vector U(G_waist orthosis/C_waist) of the center of gravity G_waist orthosis in the waist coordinate system C_waist previously stored. In this embodiment, C_waist is equal to the body coordinate system BC, and therefore U(G_waist orthosis/C_waist) is directly obtained as U(G_waist/BC) practically.

Moreover, the position vectors U(G_abdomen orthosis/BC) and U(G_chest orthosis/BC) in the body coordinate system BC of the centers of gravity G5 and G6 of the abdomen element S5 and the chest element S6 are calculated by the formulas in which U(G_abdomen/C_abdomen) and U(G_chest/C_chest) in the right-hand side of the aforementioned formulas (7) and (8) are replaced with U(G_abdomen orthosis/C_abdomen) and U(G_chest orthosis/C_chest) (they are previously stored in the arithmetic processing unit 23), respectively.

In this embodiment, the weights of the abdomen element S5 and the chest element S6 of the apparatus rigid link model S1' are sufficiently low, and therefore these elements hardly have any influence on the entire center of gravity of the apparatus rigid link model S1'. Thus, the calculation of the position vectors U(G_abdomen orthosis/BC) and U(G_chest orthosis/BC) may be omitted.

Moreover, in the arithmetic processing of the three-dimensional element center-of-gravity location calculation means 62, the position vectors U(front support member/BC) and U(back support member/BC) in the body coordinate system BC of the front support member S9$a$ and the back support member S9$b$ are also calculated for each of the leg sections S2 individually. These position vectors U(front support member/BC) and U(back support member/BC) are found by calculating the formulas in which U(J_left knee/LC) in the right-hand side of the aforementioned formula (4b) is replaced with the position vectors U(front support member/LC) and U(back support member/LC) of the front support member S9$a$ and the back support member S9$b$ of the each foot element S9 previously calculated by the two-dimensional element center-of-gravity location calculation means 61.

Subsequently, the apparatus-side joint moment estimation means 42 performs the arithmetic processing of the entire center-of-gravity location calculation means 63. In the arithmetic processing of the entire center-of-gravity location calculation means 63, the position vector U(G_entire orthosis/BC) in the body coordinate system BC of the entire center of gravity (the entire center of gravity of the assistive apparatus 1. Hereinafter, sometimes referred to as G_entire orthosis) of the apparatus rigid link model S1' is calculated from the center of gravity locations (the position vectors in the body coordinate system BC) of the rigid elements calculated by the three-dimensional element center-of-gravity location calculation means 62 and the weights of the rigid elements of the apparatus rigid link model S1' previously stored in the arithmetic processing unit 23, by using the following formula (28):

$U(G$_entire orthosis$/BC) = \{U(G$_chest orthosis$/BC) \times$ $m$_chest orthosis+

$U(G$_abdomen orthosis$/BC) \times m$_abdomen orthosis+

$U(G$_waist orthosis$/BC) \times m$_waist orthosis+

$U(G$_right thigh orthosis$/BC) \times$ $m$_right thigh orthosis+

$U(G$_left thigh orthosis$/BC) \times m$_left thigh orthosis+

$U(G$_right crus orthosis$/BC) \times m$_right crus orthosis+

$U(G$_left crus orthosis$/BC) \times m$_left crus orthosis+

$U(G\_\text{right foot orthosis}/BC) \times m\_\text{right foot orthosis} +$ $U(G\_\text{left foot orthosis}/BC) \times$ $m\_\text{left foot orthosis}\}/\text{weight of entire orthosis}$  (28)

The term "m_□□ orthosis" such as m_chest orthosis is a weight of a rigid element of the apparatus rigid link model S1' corresponding to the name of □□ and thus it is the weight of a single unit of the assistive apparatus 1 (not including the weight of the person A). Moreover, m_chest orthosis and m_abdomen orthosis are each approximately zero in this embodiment, and therefore the terms including them may be omitted.

Subsequently, the apparatus-side joint moment estimation means 42 performs the arithmetic processing of the floor reaction force estimation means 64 and the floor reaction force application point estimation means 65. In the arithmetic processing of the floor reaction force estimation means 64, the floor reaction force vector (the floor reaction force vector viewed in the body coordinate system BC) acting on the assistive apparatus 1 is estimated by the same method as for the floor reaction force estimation means 57 of the person-side joint moment estimation means 41.

Figure 16:
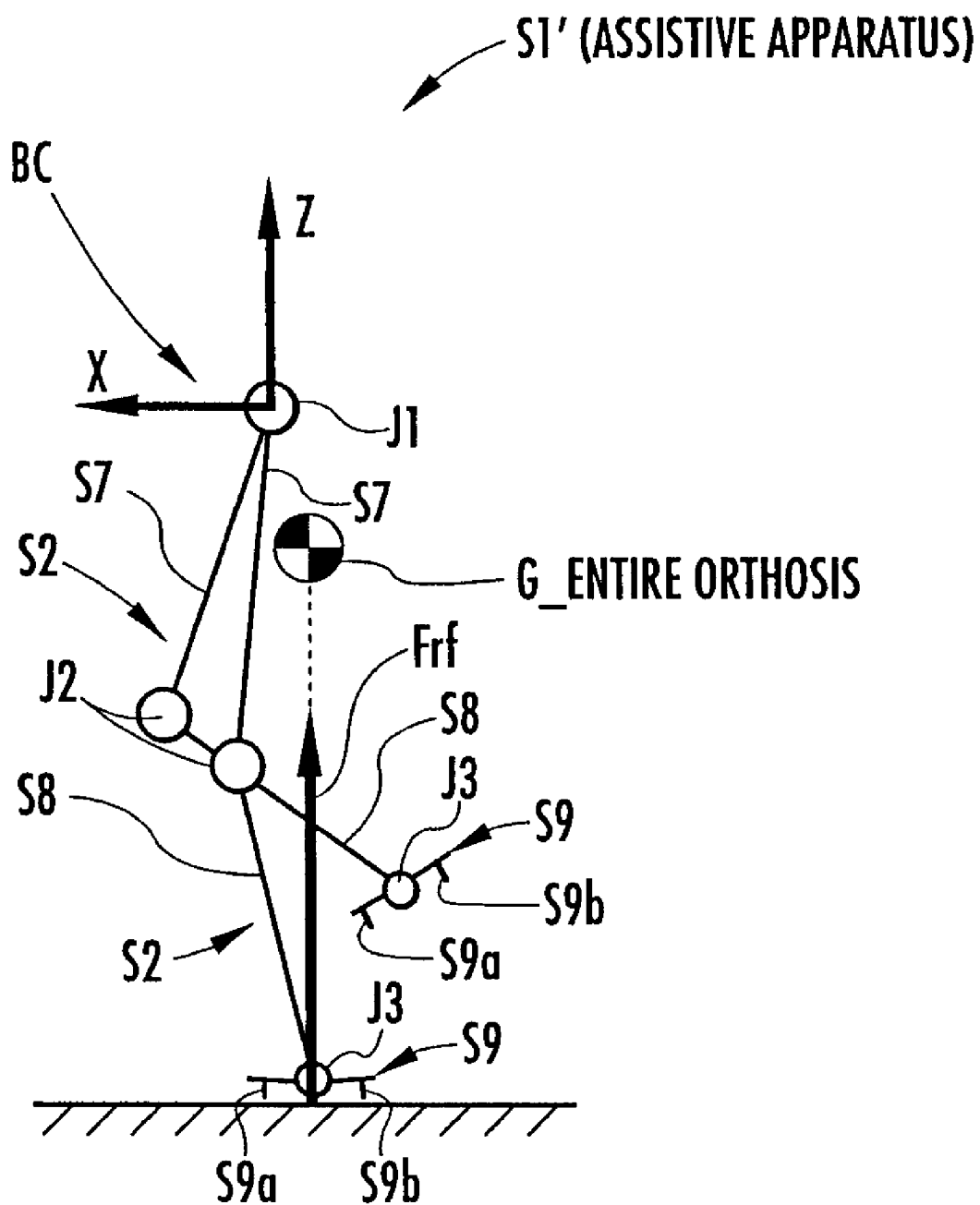
FIG. 16 is a diagram for explaining floor reaction force estimation processing of the leg body exercise assistive apparatus in the single support state.

More specifically, first, it is determined whether the person A is in the single support state or in the double support state based on the detected outputs of the landing sensors 32, 33, similarly to the floor reaction force estimation means 57 of the person-side joint moment estimation means 41. FIG. 16 typically shows an example of the assistive apparatus 1 (the assistive apparatus 1 viewed on the sagittal plane) in the single support state in the form of an apparatus rigid link model S1. Moreover, FIGS. 17(a), (b) typically show examples of the leg sections of the assistive apparatus 1 in the double support state viewed on the sagittal plane and frontal plane, respectively by using the apparatus rigid link model S1'. In the following description, the floor reaction force vectors (vectors represented by the coordinate component values in the body coordinate system BC) acting on the right leg section and the left leg section of the assistive apparatus 1 are represented by Frf(right leg orthosis/BC) and Frf(left leg orthosis/BC), respectively. If there is no need to discriminate between right and left, they are represented by Frf(leg orthosis/BC).

In the single support state as shown in FIG. 16, the floor reaction force vector Frf(right leg orthosis/BC) acting on the landing leg section S2 (it is assumed here to be the right leg section, for example) of the assistive apparatus 1 is calculated by the following equation of motion (29) described below, which is similar to the aforementioned formula (13):

$Frf(\text{right leg orthosis}/BC) = \text{Weight of entire orthosis} \times$
$(ACC(BCO/BC) + U(G\_\text{entire orthosis}/BC)")$  (29)

In the above, U(G_entire orthosis/BC)" is a second derivative of the position vector U(G_entire orthosis/BC) sequentially calculated by the entire center-of-gravity location calculation means 63 and calculated from the time-series data of U(G_entire orthosis/BC). Moreover, ACC (BCO/BC) of the formula (29) is an acceleration vector of the origin BCO of the body coordinate system BC calculated by the body coordinate system acceleration and angular velocity calculation means 54 of the person-side joint moment estimation means 41. Also when the left leg of the person A is landing, the floor reaction force vector Frf(left leg orthosis/BC) is calculated by the calculation in the right-hand side of the formula (29) similarly in the single support state. Incidentally, the floor reaction force vector Frf(leg orthosis/BC), which acts on the leg section of the leg not landing of the assistive apparatus 1, is zero.

Figure 17A:
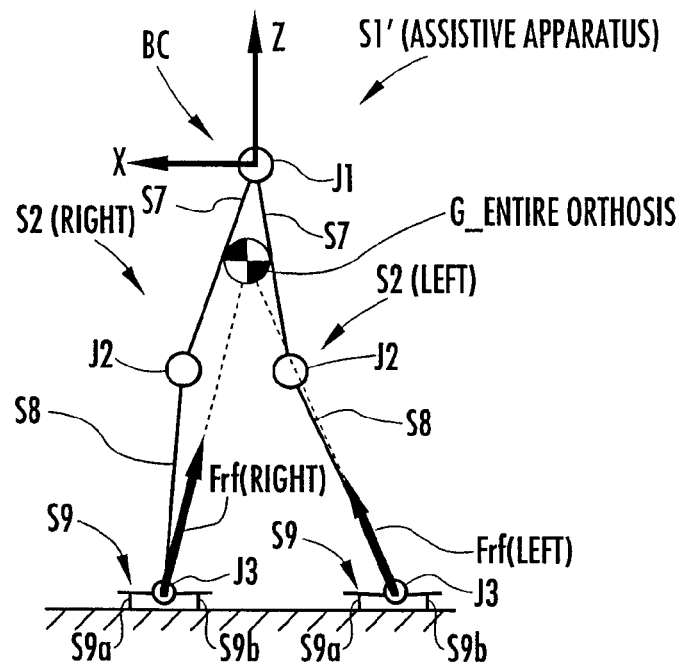
FIGS. 17(a), (b) are diagrams for explaining floor reaction force estimation processing of the leg body exercise assistive apparatus in the double support state.
Figure 17B:
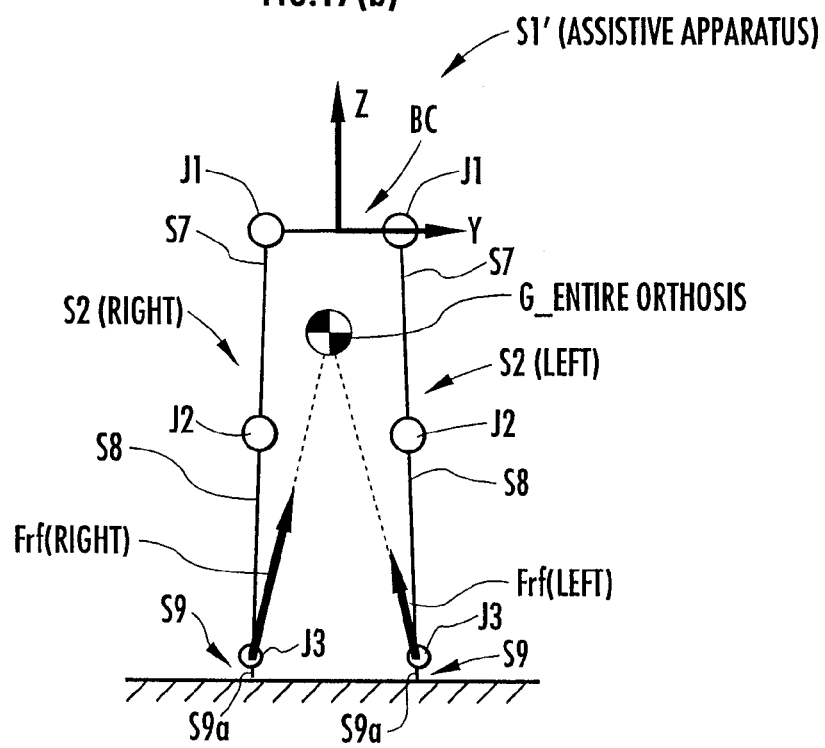

In the double support state as shown in FIGS. 17(a), (b), the floor reaction force vectors Frf(right leg orthosis/BC) and Frf(left leg orthosis/BC) acting on the assistive apparatus 1 are calculated based on the following five relational expressions (30) to (34), which are similar to the aforementioned expressions (14) to (18):

$Frf(\text{right leg orthosis}/BC) + Frf(\text{left leg orthosis}/BC)$
$= \text{Weight of entire orthosis} \times (ACC(BCO/BC) + U$
$(G\_\text{entire orthosis}/BC)")$  (30)

$Frf(\text{right leg orthosis}/BC)x:Frf(\text{right leg orthosis}/BC)$
$z = U(G\_\text{entire orthosis}/BC)x - U(J\_\text{right ankle}/$
$BC)x:U(G\_\text{entire orthosis}/BC)z - U(J\_\text{right}$
$\text{ankle}/BC)z$  (31)

$Frf(\text{left leg orthosis}/BC)x:Frf(\text{left leg orthosis}/BC)$
$z = U(G\_\text{entire orthosis}/BC)x - U(J\_\text{left ankle}/BC)$
$x:U(G\_\text{entire orthosis}/BC)z - U(J\_\text{left ankle}/BC)z$  (32)

$Frf(\text{right leg orthosis}/BC)y:Frf(\text{right leg}/BC)z = U$
$(G\_\text{entire orthosis}/BC)y - U(J\_\text{right ankle}/BC)y:$
$U(G\_\text{entire orthosis}/BC)z - U(J\_\text{right ankle}/BC)z$  (33)

$Frf(\text{left leg orthosis}/BC)y:Frf(\text{left leg orthosis}/BC)$
$z = ACC(G\_\text{entire orthosis}/BC)y - U(J\_\text{left ankle}/$
$BC)y:U(G\_\text{entire orthosis}/BC)z - U(J\_\text{left ankle}/$
$BC)z$  (34)

Among these formulas (30) to (34), the formula (30) represents an equation of motion related to the translational motion in the body coordinate system BC of the entire center of gravity G_entire orthosis of the assistive apparatus 1, in which the right-hand side thereof is the same as the right-hand side of the formula (20). As shown in FIGS. 17(a), (b), the formulas (31) to (34) are geometric relational expressions obtained supposing that the floor reaction force vector Frf(right leg orthosis/BC) and the floor reaction force vector Frf(left leg orthosis/BC) are vectors each starting from the right ankle joint J1 or the left ankle joint J1 toward G_entire orthosis. In this condition, the formulas (31) and (32) are relational expressions viewed on the sagittal plane (the XZ plane in the body coordinate system BC), and the formulas (33) and (34) are relational expressions viewed on the frontal plane (the YZ plane in the body coordinate system BC).

Similarly to the arithmetic processing of the floor reaction force estimation means 57 of the person-side joint moment estimation means 41, to find the floor reaction force vectors Frf(right leg orthosis/BC) and Frf(left leg orthosis/BC) in the double support state, Frf(right leg orthosis/BC) and Frf(left leg orthosis/BC) are calculated by solving a simultaneous equation composed of the aforementioned formulas (30) to (34) with the coordinate component values of these vectors defined unknowns. Incidentally, U(G_entire orthosis/BC), which is necessary for this calculation, is found by the entire center-of-gravity location calculation means 63 and U(J_right ankle/BC) and U(J_left ankle/BC) are found by the three-dimensional joint and element center-of-gravity location calculation means 53 of the person-side joint moment estimation means 41. Moreover, the Z-axis component of Frf(right leg orthosis/BC) or Frf(left leg orthosis/BC) can be found by using either the formulas (31) and (32) related to the sagittal plane or the formula (33) related to the frontal plane.

While there has been used the formulas (31) to (34) supposing that the floor reaction force vector Frf(right leg orthosis/BC) and the floor reaction force vector Frf(left leg orthosis/BC) are vectors each starting from the ankle joint J1 of the right leg or the ankle joint J1 of the left leg toward G_entire orthosis in this embodiment, it is also possible to use the position (the position in the body coordinate system BC) of the neighboring point where each ankle joint J1 exists or the position (the position in the body coordinate system BC) of the floor reaction force application point of each leg section of the assistive apparatus 1 calculated as described later, instead of U(J_right ankle/BC) and U(J_left ankle/BC) of the formulas (31) to (34).

For the floor reaction force vector Frf(right leg orthosis/BC) and Frf(left leg orthosis/BC) calculated by the floor reaction force estimation means 64 as described above, only the weight of the assistive apparatus 1 itself is taken into consideration. Therefore, on the assumption that the assistive apparatus 1 is independently making the same motion by itself as the current motion of the legs of the person A, Frf(right leg orthosis/BC) and Frf(left leg orthosis/BC) denote floor reaction force vectors acting on the assistive apparatus 1 by the empty weight of the assistive apparatus 1. The floor reaction force vectors necessary for the assistive apparatus 1 to make a motion independently needs to satisfy the aforementioned formulas (29) or (30). In the double support states however, it is also possible to cause the floor reaction force vectors to be estimated by using a relational expression other than the formulas (31) to (34).

In the arithmetic processing of the floor reaction force application point estimation means 64, the application points of the floor reaction force vectors Frf(right leg orthosis/BC) and Frf(left leg orthosis/BC) acting on the assistive apparatus 1 are estimated by the same method as in the floor reaction force application point estimation means 58 of the person-side joint moment estimation means 41.

In this instance, the application points of the floor reaction force vectors Frf(right leg orthosis/BC) and Frf(left leg orthosis/BC) are estimated based on the center of gravity of the entire orthosis and the positional relationship within the horizontal plane between the front support member S9a and the back support member S9b of the foot element S9 of the landing leg in the absolute coordinate system IC.

More specifically, first, by using the transformation tensor R(BC→IC) obtained by the floor reaction force application point estimation means 58 of the person-side joint moment estimation means 41, the position vectors U(G_entire orthosis/IC), U(front support member/IC), and U(back support member/IC) viewed in the absolute coordinate system IC of the center of gravity of the entire orthosis and the front support member S9a and the back support member S9b of the each foot element S9 are calculated by multiplying the position vector U(G_entire orthosis/BC) of the center of entire orthosis previously obtained by the entire center-of-gravity location calculation means 63 and the position vectors U(front support member/BC) and U(back support member/BC) of the front support member S9a and the back support member S9b of the each foot element S9 previously obtained by the three-dimensional element center-of-gravity location calculation means 62 each by the transformation tensor R(BC→IC). Then, regarding the leg determined to be not landing based on the detected outputs of the landing sensors 32, 33, there is no need to calculate the position vectors U(front support member/BC) and U(back support member/BC).

Subsequently, for each leg determined to be landing from the detected outputs of the landing sensors 32, 33, the X-axis component and the Y-axis component of the position vector (the position vector in the absolute coordinate system IC) U(orthosis COP/IC) of the floor reaction force application point are determined according to the magnitude relation of the X-axis direction components U(G_entire orthosis/IC)x, U(J_front support member/IC)x, and U(J_back support member/IC)x of the position vectors U(G_entire orthosis/IC), U(J_front support member/IC), and U(J_back support member/IC), in other words, according to the relative horizontal positional relationship in the forward/backward direction of the center of gravity of the entire orthosis and the front support member S9a and the back support member S9b of the foot element S9.

Figure 18A:
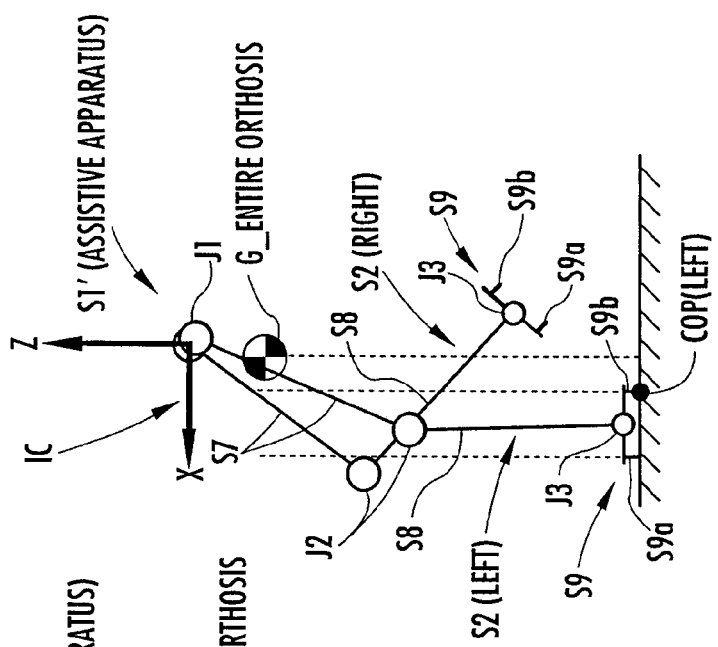
FIGS. 18(a) to (c) are diagrams for explaining estimation processing of the floor reaction force application point on a sagittal plane of the leg body exercise assistive apparatus.
Figure 18B:
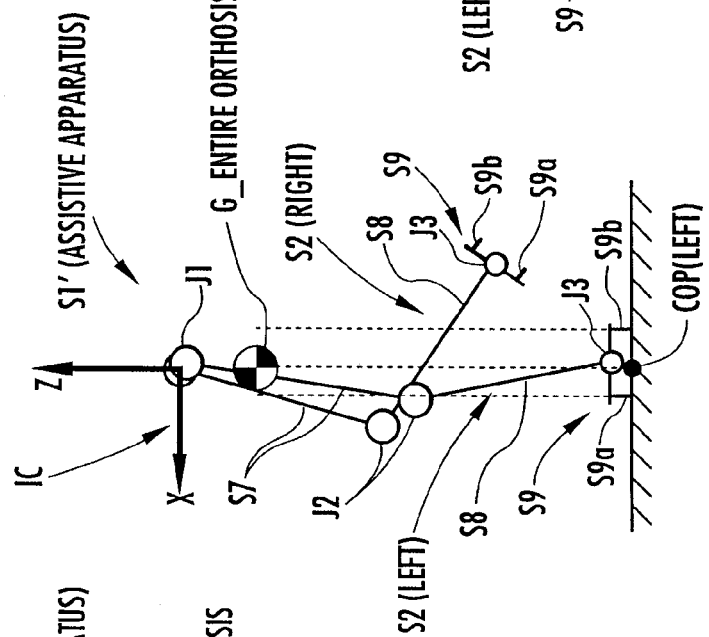
Figure 18C:
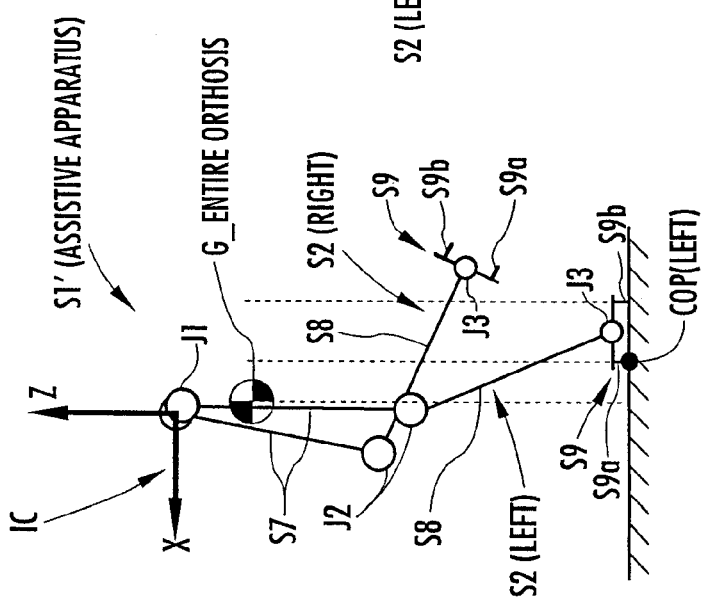
Figure 19:
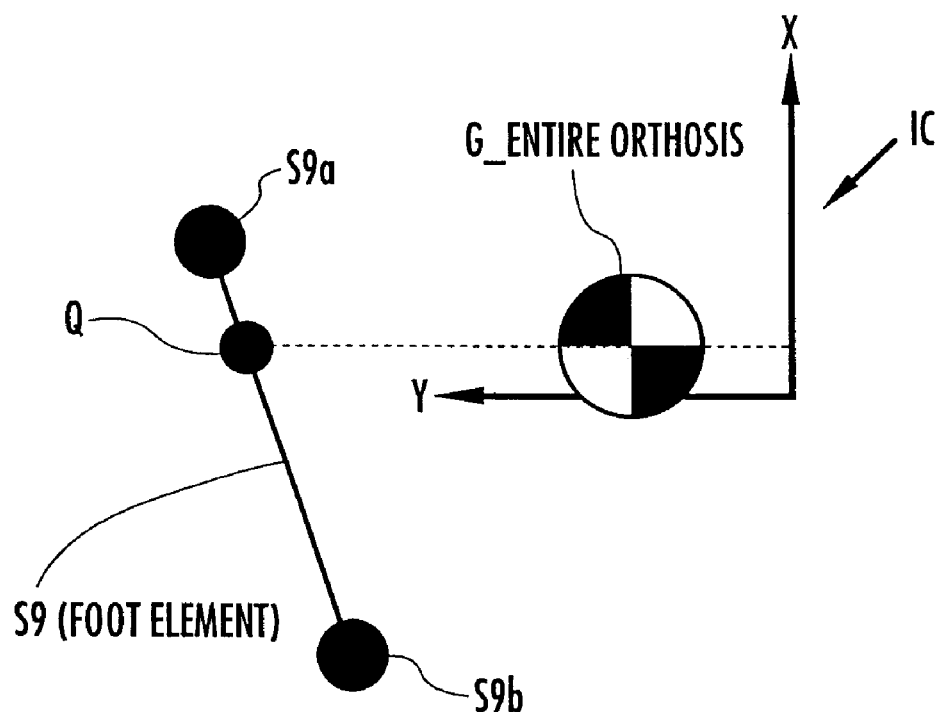
FIG. 19 is a diagram for explaining estimation processing of the floor reaction force application point on a horizontal plane of the leg body exercise assistive apparatus.

More detailed description will be given with reference to FIGS. 18(a) to (c) and FIG. 19. In the description below, the left leg is assumed to be landing. FIGS. 18(a) to (c) illustrate states in which the left leg section of the assistive apparatus 1 is landing (the single support state in these diagrams), viewed on the sagittal plane. FIG. 19 shows a plan view of the foot of the landing leg section of the assistive apparatus 1 in the state of FIG. 18(b). In FIG. 18 and FIG. 19, the leg sections of the assistive apparatus 1 is typically shown in the form of a rigid link model S1'.

As shown in FIG. 18(a), if the center of gravity of the entire orthosis G_entire orthosis is more forward than the front support member S9a of the landing left foot S9, in other words, if U(G_entire orthosis/IC)x>U(J_left front support member/IC)x, the floor reaction force application point COP exists substantially just under the front support member S9a of the left foot S9 (the toe of the foot S9). Therefore, in this case, it is assumed that the X- and Y-axis components of the position vector U(left orthosis COP/IC) of the floor reaction force application point COP corresponding to the landing left foot S9 are equal to the X- and Y-axis components of the position vector U(J_left front support member/IC) of the front support member S9a of the left foot S9, respectively. In other words, it is assumed that U(left orthosis COP/IC)x=U(J_left front support member/IC)x and U(left orthosis COP/IC)y=U(J_left front support member/IC)y.

Moreover, as shown in FIG. 18(c), if the center of gravity of the entire orthosis G_entire orthosis is more backward than the back support member S9b of the landing left foot S9, in other words, if U(G_entire orthosis/IC)x<U(J_left back support member/IC)x, the floor reaction force application point COP exists substantially just under the back support member S9b of the left foot S9 concerned. Therefore, in this case, it is assumed that the X- and Y-axis components of the position vector U(left orthosis COP/IC) of the floor reaction force application point COP corresponding to the landing left foot S9 are equal to the X- and Y-axis components of the position vector U(J_left back support member/IC) of the back support member S9b of the left foot S9, respectively. In other words, U(left orthosis COP/IC)x=U(J_left back support member/IC)x and U(left orthosis COP/IC)y U(J_left back support member/IC)y.

Moreover, as shown in FIG. 18(b), if the center of gravity of the entire orthosis G_entire orthosis exists between the front support member S9a and the back support member S9b of the left foot S9 in the forward/backward direction, in other words, if U(J_left front support member/IC)x≦U(G_entire orthosis/IC)x≦U(J_left back support member/IC)x, the floor reaction force application point COP exists substantially just under the center of gravity of the entire orthosis G_entire orthosis on the shown sagittal plane. Therefore, in this case, it is assumed that the X-axis component of the position vector U(left orthosis COP/IC) of the floor reaction force application point COP corresponding to the landing left foot S9 is equal to the X-axis component of the center of gravity of the entire orthosis G_entire orthosis. In other words, it is assumed that U(left orthosis COP/IC)

x=U(G_entire orthosis/IC)x. Then, the position of the floor reaction force application point COP is thought to be generally on a line segment generated by projecting the line segment between the front support member S9a and the back support member of the left foot S9 onto the floor surface. Accordingly, it is assumed that the Y-axis component of the position vector U(left orthosis COP/IC) of the floor reaction force application point COP is equal to the Y-axis component of a point Q where the value of the center of gravity of the entire orthosis G_entire orthosis is equal to the value of the X-axis component (the X-axis component in the absolute coordinate system IC) on the line segment between the front support member S9a and the back support member S9b of the left foot S9 as shown in FIG. 19. The value of the Y-axis component of the position vector U(left orthosis COP/IC) is found based on the following formula (35) indicating the proportional relation:

U(left orthosis $COP/IC$)x−U(left back support member/$IC$)x:U(left front support member/$IC$)x −U(left back support member/$IC$)x =U(left orthosis $COP/IC$)y−U(left back support member/$IC$)y :U(left front support member/$IC$)y −U(left back support member/$IC$)y          (35)

Moreover, it is assumed that the Z-axis component of the position vector U(left orthosis COP/IC) of the floor reaction force application point is equal to the Z-axis component of the point, which is a predetermined value H0 (>0) away from the ankle joint J3 of the left leg section downward in the vertical direction, similarly to the floor reaction force application point estimation means 58 of the person-side joint moment estimation means 41. In other words, it is assumed that U(left COP/IC)z=U(J_left ankle/IC)z−H0. In this embodiment, the positions of the joint elements are the same between the person rigid link model S1 and the apparatus rigid link model S1', and therefore the predetermined value H0 is the same as one used in the floor reaction force application point estimation means 58 of the person-side point moment estimation means 41.

In this embodiment, we can obtain the position vector U(left orthosis COP/IC) of the floor reaction force application point of the floor reaction force vector Frf acting on the left leg section when the left leg is landing, as described hereinabove. The same applies to the right leg section when it is landing. In this instance, in the double support state, the position vector of the floor reaction force application point is found as described above for each of the both legs.

In this embodiment, the predetermined value H0 for use in finding the Z-axis component of the position vector U(orthosis COP/IC) of the floor reaction force application point has been defined as a constant value. If, however, the landing sensors 32 and 33 detect that the foot S9 is in contact with the ground only in the toe-side portion, you may use the difference in the Z-axis component (U(J_ankle/IC)z−U (front support member/IC)z) between the position vectors U(J_ankle/IC) and U(front support member/IC) of the ankle joint J3 and the front support member S9a, namely, the distance in the vertical direction between the ankle joint J3 and the front support member S9a, instead of the predetermined value H0, regarding the landing foot S9. This improves the accuracy of U(orthosis COP/IC).

In the arithmetic processing of the floor reaction force application point estimation means 65, finally the value U(orthosis COP/BC) in the body coordinate system BC of the position vector of the floor reaction force application point related to the assistive apparatus 1 is found by multiplying the position vector U(orthosis COP/IC) of the floor reaction force application point obtained for each landing leg section as described above by the transformation tensor R(IC→BC).

Subsequently, the apparatus-side joint moment estimation means 42 performs the arithmetic processing of the leg plane projection means 66. In this processing, the floor reaction force vectors Frf(right leg orthosis/BC) and Frf(left leg orthosis/BC) calculated by the floor reaction force estimation means 64 and the position vector U(orthosis COP/BC) of the floor reaction force application point COP calculated by the floor reaction force application point estimation means 65 are projected to the leg plane PL corresponding to each of the leg sections S2 for each thereof by using the transformation tensor R(BC→LC) (=R(LC→BC)$^T$), which is a transposition of the transformation tensor R(LC→BC) generated by the transformation tensor generation means 51.

More specifically, the floor reaction force vectors Frf (right leg orthosis/right LC) and Frf(left leg orthosis/left LC) viewed from the each leg coordinate system LC are obtained by multiplying the floor reaction force vectors Frf(right leg/BC) and Frf(left leg/BC) by the transformation tensor R(BC→right LC) and R(BC→left LC), respectively, as shown by the following formulas (36a) and (36b):

Frf(right leg orthosis/right $LC$)=R($BC$→right $LC$)×
  Frf(right leg orthosis/$BC$)          (36a)

Frf(left leg orthosis/left $LC$)=R($BC$→left $LC$)×Frf
  (left leg orthosis/$BC$)          (36b)

Moreover, the position vector U(orthosis COP/LC) of the floor reaction force application point COP viewed from the leg coordinate system LC corresponding to the landing leg section S2 is obtained by multiplying the position vector U(COP/BC) of the floor reaction force application point COP of the landing leg section S2 by the transformation tensor R(BC→LC) corresponding to the landing leg section S2 as shown by the following formula (36c):

U(orthosis $COP/LC$)=R($BC$→$LC$)×U(orthosis $COP/$
  $BC$)          (36c)

Incidentally, the position vector U(orthosis COP/LC) is calculated only for the landing leg section S2 in the single support state of the person A, while it is calculated for each of the right and left leg sections S2 in the double support state.

Additionally describing, the acceleration vector ACC (BCO/LC) and the angular velocity vector ω(BCO/LC) viewed in the right or left leg coordinate system LC are calculated as described in the above by using the leg plane projection means 59 of the person-side joint moment estimation means 41 (see the aforementioned formulas (20a) and (20b)), and therefore there is no need to calculate them in the leg plane projection means 59 of the apparatus-side joint moment estimation means 42.

In the following description of the joint moment calculation means 67, it is assumed that the acceleration vector ACC(BCO/LC), the floor reaction force vectors Frf(right leg orthosis/right LC) and Frf(left leg orthosis/left LC), and the position vector U(orthosis COP/LC) of the floor reaction force application point denote two-dimensional vectors each made of the pair of the X-axis component and the Z-axis component. The value on the leg plane PL of the angular velocity ω is represented by ω(BCO/LC)y.

Subsequently, the apparatus-side joint moment estimation means 42 performs arithmetic processing of the joint moment calculation means 67. In the arithmetic processing of the joint moment calculation means 67, the joint moments of the joint elements J_ankle, J_knee, and J_hip are calculated in order by the operation (a two-dimensional operation on each leg plane PL) of the inverse dynamics model based on the equations of motion related to the translational motion and the rotary motion of the foot element S9, the crus element S8, and the thigh element S7 of the each leg section S2 described below, similarly to the arithmetic processing of the joint moment calculation means 67 of the person-side joint moment estimation manes 41.

In this instance, the equations of motion related to the translational motion are given by the formulas (37) to (39) shown below and the equations of motion related to the rotary motion are given by the formulas (40) to (42) shown below. In the equations of motion shown below, similarly to the arithmetic processing of the joint moment calculation means 60, one end closer to the waist element S4 is sometimes denoted by "P_□□ orthosis" and the other end farther from the waist element S4 is sometimes denoted by "D_□□" (□□ is a name of the rigid element) for both ends of the rigid elements of the foot element S9, the crus element S8, and the thigh element S7 of the apparatus rigid link model S1'. For example, the end of the crus element S8 on the knee joint J_knee (J2) side is denoted by "P_crus orthosis" and the other end on the ankle joint J_ankle (J3) side is denoted by "D_crus orthosis." Moreover, F(P_□□ orthosis/BC) and F(D_□□ orthosis/BC) denote reaction forces (two-dimensional translational force vectors on the leg plane PL) applied to the end of the rigid elements (the rigid elements of the apparatus rigid link model S1') each having the name denoted by □□ concerned from an object in contact with the end of the rigid element. Similarly, M(P_□□ orthosis) and M(D_□□ orthosis) denote reaction moments (moments around the axis perpendicular to the leg plane PL (around the axis parallel to the Y axis of the leg coordinate system LC)) applied to the end of the rigid elements (the rigid elements of the apparatus rigid link model S1') each having the name denoted by □□ concerned from an object in contact with the end of the rigid element.

$$F(P\_foot\ orthosis/LC) = m\_foot\ orthosis \times (ACC(BCO/LC) + U(G\_foot\ orthosis/LC)'') - Frf(leg\ orthosis/LC) \quad (37)$$

$$F(P\_crus\ orthosis/LC) = m\_crus\ orthosis \times (ACC(BCO/LC) + U(G\_crus\ orthosis/LC)'') - F(D\_crus\ orthosis/LC) \quad (38)$$

$$F(P\_thigh\ orthosis/LC) = m\_thigh\ orthosis \times (ACC(BCO/LC) + U(G\_thigh\ orthosis/LC)'') - F(D\_thigh\ orthosis/LC) \quad (39)$$

$$M(P\_foot\ orthosis) = I\_foot\ orthosis \times (\omega(foot)' + \omega(BCO/LC)y') - \{(U(orthosis\ COP/LC) - U(G\_foot\ orthosis/LC)) \times Frf(leg\ orthosis/LC)\}y - \{(U(P\_foot/LC) - U(G\_foot\ orthosis/LC)) \times F(P\_foot\ orthosis/LC)\}y \quad (40)$$

$$M(P\_crus\ orthosis) = I\_crus\ orthosis \times (\omega(crus)' + \omega(BCO/LC)y') - \{(U(D\_crus/LC) - U(G\_crus\ orthosis/LC)) \times F(D\_crus\ orthosis/LC)\}y - \{(U(P\_crus/LC) - U(G\_crus\ orthosis/LC)) \times F(P\_crus\ orthosis/LC)\}y - M(D\_crus\ orthosis) \quad (41)$$

$$M(P\_thigh\ orthosis) = I\_thigh\ orthosis \times (\omega(thigh)' + \omega(BCO/LC)y') - \{(U(D\_thigh/LC) - U(G\_thigh\ orthosis/LC)) \times F(D\_thigh\ orthosis/LC)\}y - \{(U(P\_thigh/LC) - U(G\_thigh\ orthosis/LC)) \times F(P\_thigh\ orthosis/LC)\}y - M(D\_thigh\ orthosis) \quad (42)$$

In the above, F(D_crus orthosis/BC)=−F(P_foot orthosis/BC), F(D_thigh orthosis/BC)=−F(P_crus orthosis/BC), M(D_crus orthosis)=−M(P_foot orthosis), and M(D_thigh orthosis)=−M(P_crus orthosis). Moreover, I_foot orthosis, I_crus orthosis, and I_thigh orthosis are moments of inertia (moments of inertia of the assistive apparatus 1 only) around the center of gravity of each of the foot element S9, the crus element S8, and the thigh element S7 of the apparatus rigid link model S1', respectively, and they are previously determined based on the measurement data or the like and stored in the memory of the arithmetic processing unit 23.

These formulas (37) to (42) correspond to the aforementioned formulas (21) to (26). In the joint moment calculation means 67, similarly to the person-side joint moment estimation means 41, ultimately the joint moments M(P_foot orthosis), M(P_crus orthosis), and M(P_thigh orthosis) are calculated in order for each of the leg sections S2 by using the aforementioned formulas (37) to (42).

In this case, ACC(BCO/LC), ω(foot)', ω(crus)', ω(thigh)', ω(BCO/LC)y', U(P_foot/LC), U(D_crus/LC), U(P_crus/LC), U(D_thigh/LC), and U(P_thigh/LC) necessary for the calculation are the same as those used in the aforementioned formulas (21) to (26). Moreover, U(G_foot orthosis/LC)'', U(G_crus orthosis/LC)'', and U(G_thigh orthosis/LC)'' are calculated from the time series data of the position vectors as second derivatives of the position vectors (more accurately, the pairs of the X coordinate component and the Z-coordinate component of the position vectors) of the centers of gravity G_foot orthosis, G_crus orthosis, G_thigh orthosis in the leg coordinate system LC previously calculated by the two-dimensional element center-of-gravity location calculation means 61. Furthermore, Frf(leg orthosis/LC) is a two-dimensional vector generated by projecting the floor reaction force vector previously calculated by the floor reaction force estimation means 64 onto the leg plane by means of the leg plane projection means 66, and U(orthosis COP/LC) is a two-dimensional vector generated by projecting the floor reaction force application point previously calculated by the floor reaction force application point estimation means 65 onto the leg plane PL by means of the leg plane projection means 66.

While the moments of inertia I_foot orthosis, I_crus orthosis, I_thigh orthosis of the rigid elements of the each leg sections S2 have been taken into consideration in this embodiment, these values are sufficiently close to zero in general. Therefore, the terms including the moment of inertia I_foot orthosis, I_crus orthosis, or I_thigh orthosis may be omitted in the calculations of the formulas (40) to (42).

In the arithmetic processing of the joint moment calculation means 67, the joint moments M(P_foot orthosis), M(P_crus orthosis), and M(P_thigh orthosis) around the axis perpendicular to the leg plane PL of the joint regions 4, 6, and 10 of the assistive apparatus 1 are calculated in order from the side of the ankle joint region 4 (J3) as described above. These joint moments M(P_foot orthosis), M(P_crus orthosis), and M(P_thigh orthosis) are such moments that should be generated in the ankle joint region 4, the knee joint region 6, and the hip joint region 10 of each leg section of the assistive apparatus 1 when supposing that the assistive apparatus 1 is performing substantially the same motion as one actually being performed by the person A wearing the assistive apparatus 1 independently (by itself).

The above is the details of the arithmetic processing of the person-side joint moment estimation means 41 and the apparatus-side joint moment estimation means 42 of the arithmetic processing unit 23.

The arithmetic processing unit 23 then performs the arithmetic processing of the apparatus generated torque determination means 43. In this arithmetic processing, torques to be generated in the electric motors 18 to 20 of the each leg section of the assistive apparatus 1 are determined based on the joint moments M(P_foot), M(P_crus), and M(P_thigh) related to the person A and the joint moments M(P_foot orthosis), M(P_crus orthosis), and M(P_thigh orthosis) related to the assistive apparatus 1.

More specifically, for example, describing the electric motor 20 for the ankle, the joint moment M(P_foot orthosis) related to the assistive apparatus 1 is defined as a reference torque that should be generated in the electric motor 20, and the torque formed by adding (making an addition of) a moment, which is obtained by multiplying the joint moment M(P_foot) related to the person A by a predetermined ratio (10% or the like), to the foregoing reference torque is determined as a target generated torque for the electric motor 20. The same applies to other electric motors 18 and 19. Although the predetermined ratio may be previously determined, it also can be variably set according to the motion pattern being performed by the person A, timing thereof, or the like.

The arithmetic processing unit 23 then controls the electric motors 18 to 20 to generate the target generated torques determined in this manner via the motor drive circuit 27 by using the motor control means 44.

As described hereinabove, by estimating the joint moments of the leg for each of the person A and the assistive apparatus 1 and controlling the electric motors 18 to 20 based on the joint moments, the electric motors 18 to 20 generate the torques formed by adding the supplementary torque to the joint moments M(P_foot orthosis), M(P_crus orthosis), and M(P_thigh orthosis), by which at least the assistive apparatus 1 can make substantially the same motion as the motion of the person A. Therefore, the person A can make a leg motion intended by him or her substantially without being aware of the empty weight of the assistive apparatus 1.

Moreover, in this embodiment, the joint moments of the person A and the joint moments of the assistive apparatus 1 are estimated by the inverse dynamic calculation on the leg plane PL, and therefore unevenness of the estimated values can be suppressed, by which the stability can be improved. In other words, in the 3-axis rotation angle detected by the joint displacement sensor 29 of the hip joint region 4, the rotation angles other than the rotation angle around the axis perpendicular to the leg plane PL easily involve an error in general, while the arithmetic processing using the rotation angles around two axes is reduced as much as possible in calculating the joint moments. Therefore, it is possible to prevent the accumulation of errors in the detected values of the rotation angles, thereby suppressing the unevenness of the values of the estimated joint moments.

Incidentally, although the joint moments can be estimated by the three-dimensional inverse dynamics calculation, it is more advantageous to estimate the joint moments by the inverse dynamics calculation on the leg plane PL as described in this embodiment to suppress the unevenness of the estimated values of the joint moments if the rotation angles other than the rotation angle around the axis perpendicular to the leg plane PL easily involve errors in the rotation angle in the 3-axis rotation angle detected by the joint displacement sensor 29 of the hip joint region 4.

Subsequently, modifications of the embodiment described hereinabove will be described below. The modifications described below correspond to the embodiment according to the first aspect of the present invention.

While the electric motor 20 is provided in the ankle joint region 10 of the assistive apparatus 1 in the above embodiment, it is possible to omit the electric motor 20 for the ankle joint region 10. In this instance, if the ankle joint region 10 between the foot link member 11 and the second crus link member 9 is formed by a free joint or other rotatable object, the joint moment M(P_crus orthosis) of the knee joint region 6 and the joint moment M(P_thigh orthosis) of the hip joint region 4 may be calculated with the right-hand side of the formula (40) set to "zero" in calculating the joint moments of the assistive apparatus 1. Other things may be the same as in the aforementioned embodiment. The modification described here is referred to as a second embodiment.

Figure 20:
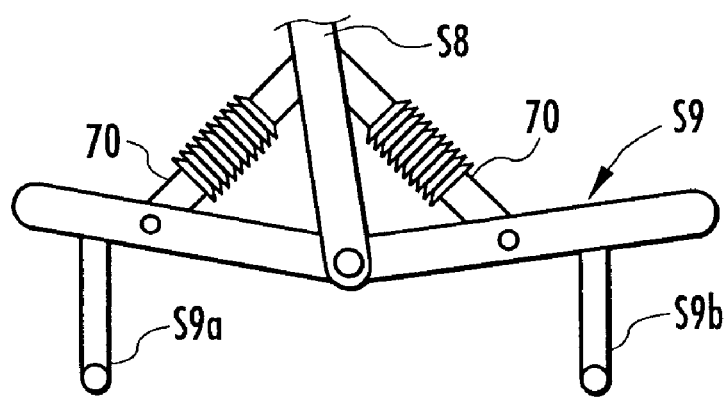
FIG. 20 is a diagram for explaining a structure of a foot of a leg body exercise assistive apparatus according to a third embodiment.

Moreover, for example, if an elastic member such as a spring is disposed between the foot orthosis portion 12 and the second crus link member 9 of the assistive apparatus 1, in other words, if an elastic member 70 such as a spring is disposed between the foot element S9 and the crus element S8 as shown in FIG. 20 when the assistive apparatus 1 is represented in the form of a rigid link model, M(P_foot orthosis) of the formula (40) may be calculated by using a data table or a predetermined arithmetic expression from the detected value of the rotation angle of the ankle joint region 10 and then the knee joint moment M(P_crus orthosis) of the knee joint region 6 and the joint moment M(P_thigh orthosis) of the hip joint region 4 may be calculated by using M(P_foot orthosis). Other things may be the same as those of the aforementioned embodiment. The modification described here is referred to as a third embodiment.

Verification of effectiveness of the present invention will be described below with reference to FIG. 21 to FIG. 24. The example described here is related to the second embodiment.

Figure 21:
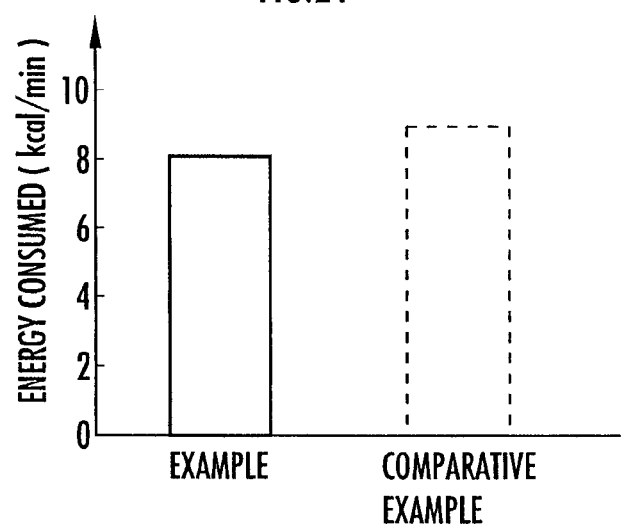
FIG. 21 is a graph for explaining an effect of the present invention.
Figure 22:
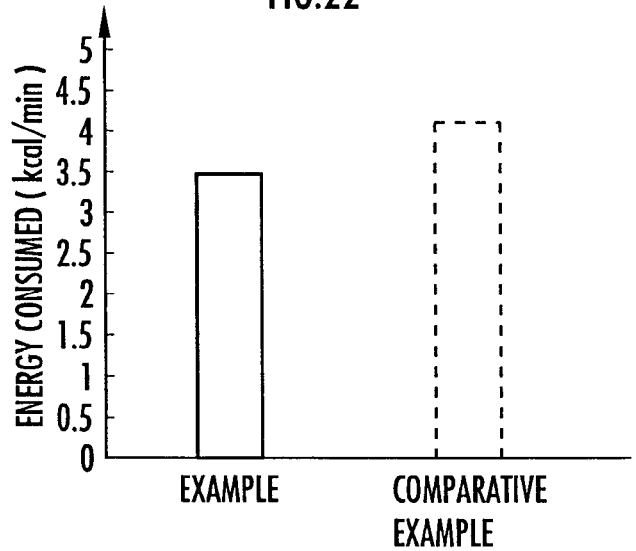
FIG. 22 is a graph for explaining an effect of the present invention.
Figure 23:
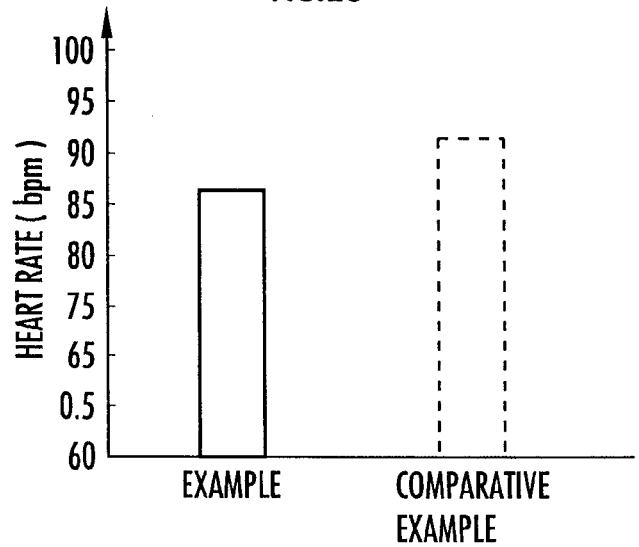
FIG. 23 is a graph for explaining an effect of the present invention.

Referring to FIG. 21, there is shown a graph of energy consumed of the person A wearing the assistive apparatus when ascending stairs. Referring to FIG. 22 and FIG. 23, there are shown graphs of energy consumed and a heart rate of the person A wearing the assistive apparatus after making a stepping motion, respectively. In all of FIG. 21 to FIG. 23, the bar indicated by a solid line shows an example where the person A is wearing the assistive apparatus of the second embodiment and further the joint moments of the second embodiment are calculated and the electric motors 18, 19 are controlled. The bar indicated by a dashed line shows a comparative example where the person A is wearing the assistive apparatus of the second embodiment and the electric motors 18, 19 do not generate the torques. The pace of ascending the stairs is 45 steps per minute regarding FIG. 21, and the pace of making the stepping motion is 222.5 steps per minute regarding FIG. 22 and FIG. 23.

As shown in FIG. 21 and FIG. 22, the energy consumed (energy consumed per unit time) of the person A in this example is lower than the comparative example. Moreover, when the person A makes a stepping motion, the heart rate of the person A in this example is lower than the comparative example as shown in FIG. 23. From here onwards, it will be understood that the load of the empty weight of the assistive apparatus on the person A is effectively reduced by the generated torques of the electric motors 18, 19 of the assistive apparatus.

Figure 24:
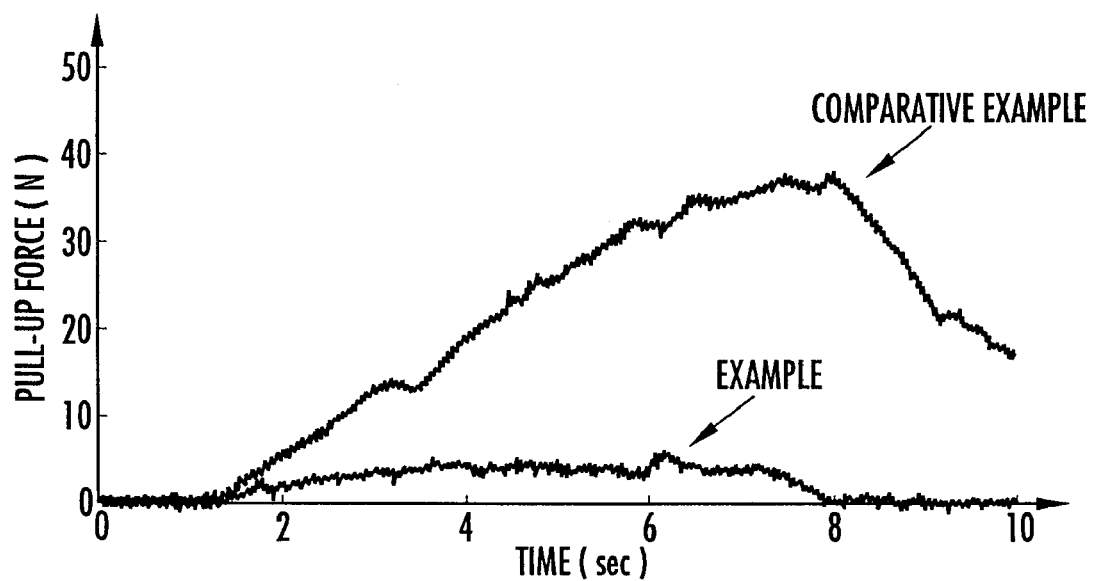
FIG. 24 is a graph for explaining an effect of the present invention.

Furthermore, referring to FIG. 24, there is shown a graph showing hourly variation of a pull-up force when the leg section of the assistive apparatus is pulled up from substantially the vertical position to the horizontal position and then returned to the vertical position again with an elevator arm, which is not shown, being latched on the assistive apparatus in the independent state (in the state where it is not attached to the person). The solid line in the graph indicates an example in which the joint moments are calculated and the electric motors 18, 19 are controlled for the assistive apparatus according to the second embodiment, and the dashed line in the graph indicates a comparative example in which the torque generation in the electric motors 18, 19 is not performed for the assistive apparatus according to the second embodiment.

As shown in FIG. 24, the pull-up force in this example is remarkably lower than the comparative example. From this fact, it is understood that the generated torques in the electric motors 18, 19 effectively reduce the load of the empty weight of the assistive apparatus on the person.

The invention claimed is:

1. A method of controlling generated torques of respective torque generation means in a leg body exercise assistive apparatus, which includes a pair of leg sections, each to be attached to a different one of a person's legs so as to be movable integrally with the person's legs, with each of the leg sections having:
   a foot orthosis portion for supporting a bottom side of a foot of the person to whom the leg sections are to be attached,
   joint regions corresponding to an ankle joint, a knee joint, and a hip joint of each leg of the person to whom the leg sections are to be attached,
   link members for attaching the foot orthosis portion and the joint regions to the person's legs, and
   torque generation means capable of generating a support torque applied to at least the joint regions corresponding to the knee joint and the hip joint of the person's legs to which the leg sections are to be attached,
the method comprising:
   a moment estimation step comprising:
      sequentially estimating person-side joint moments when the person wearing the leg body exercise assistive apparatus is moving the person's legs, which includes as components thereof moments to be generated at least in the knee joint and the hip joint of each leg, on the assumption that the person is making almost the same motion as the motion of the legs with the leg body exercise assistive apparatus removed from the person, and
      sequentially estimating apparatus-side joint moments, which includes as components thereof moments to be generated in the joint regions of the leg body exercise assistive apparatus corresponding to at least the knee joint and the hip joint of each leg, respectively, on the assumption that the leg body exercise assistive apparatus is independently making almost the same motion as the motion of the person's legs without being attached to the person; and
   a torque control step comprising controlling the torque generation means so as to generate support torque, which is obtained by adding a torque determined according to the estimated value of the person-side joint moment corresponding to the joint region concerned to a respective reference torque, on the assumption that the estimated value of the apparatus-side joint moment of each joint region corresponding to each of the knee joint and the hip joint of the leg is the reference torque to be generated by the torque generation means corresponding to the joint region concerned.

2. A method of controlling generated torques of respective torque generation means in a leg body exercise assistive apparatus, which includes a pair of leg sections, each to be attached to a different one of a person's legs so as to be movable integrally with the person's legs, with each of the leg sections having:
   a foot orthosis portion for supporting a bottom side of a foot of the person to whom the leg sections are to be attached
   joint regions corresponding to an ankle joint, a knee joint, and a hip joint of each leg of the person to whom the leg sections are to be attached,
   link members for attaching the foot orthosis portion and the joint regions to the person's legs, and
   the torque generation means capable of generating a support torque applied to the joint regions corresponding to the ankle joint, the knee joint, and the hip joint of the person's legs to which the leg sections are to be attached,
the method comprising:
   a moment estimation step comprising:
      sequentially estimating person-side joint moments when the person wearing the leg body exercise assistive apparatus is moving the person's legs, which includes as components thereof moments to be generated at least in the knee joint, the hip joint, and the ankle joint of each leg, on the assumption that the person is making almost the same motion as the motion of the legs with the leg body exercise assistive apparatus removed from the person, and
      sequentially estimating apparatus-side joint moments, which includes as components thereof moments to be generated in the joint regions of the leg body exercise assistive apparatus corresponding to the knee joint, the hip joint, and the ankle joint of each leg, respectively, on the assumption that the leg body exercise assistive apparatus is independently making almost the same motion as the motion of the person's legs without being attached to the person; and
   a torque control step comprising controlling the torque generation means so as to generate a support torque, which is obtained by adding a torque determined according to the estimated value of the person-side joint moment corresponding to the joint region concerned to a respective reference torque, on the assumption that the estimated value of the apparatus-side joint moment of each joint region corresponding to each of the ankle joint, the knee joint, and the hip joint is the reference torque to be generated by the torque generation means corresponding to the joint region concerned.

3. The generated torque control method for a leg body exercise assistive apparatus according to claim 1, wherein the person-side joint moment and the apparatus-side joint moment estimated in the moment estimation step are moments around an axis substantially perpendicular to a leg plane defined as a plane passing through the hip joint, the knee joint, and the ankle joint of each leg of the person.

4. The generated torque control method for a leg body exercise assistive apparatus according to claim 1, wherein the moment estimation step includes: a first step of sequentially grasping an acceleration of a predetermined region of the person or the leg body exercise assistive apparatus; a second step of sequentially grasping displacements of the hip joint, the knee joint, and the ankle joint of each leg of the person; a third step of sequentially estimating floor reaction forces acting on the person and the application point thereof, on the assumption that almost the same motion as the motion of both legs of the person is being made with the leg body exercise assistive apparatus removed from the person; a fourth step of sequentially estimating floor reaction forces acting on the leg body exercise assistive apparatus and the application point thereof, on the assumption that the leg body exercise assistive apparatus is independently making almost the same motion as the motion of both legs of the person without being attached to the person; a fifth step of estimating the person-side joint moment by inverse dynamics calculation, processing by using the acceleration grasped in the first step, the displacements grasped in the second step, the floor reaction forces and the application point thereof estimated in the third step, and a person-side rigid link model which represents the person as a link body formed of a plurality of rigid elements and joint elements; and a sixth step of estimating the apparatus-side joint moment by inverse dynamics calculation processing by using the acceleration grasped in the first step, the displacements grasped in the second step, the floor reaction forces and the application point thereof estimated in the fourth step, and an apparatus-side rigid link model which represents the leg body exercise assistive apparatus as a link body formed of a plurality of rigid elements and joint elements.

5. The generated torque control method for a leg body exercise assistive apparatus according to claim 4, wherein:
the person-side joint moment estimated in the fifth step and the apparatus-side joint moment estimated in the sixth step are moments around an axis substantially perpendicular to a leg plane defined as a plane passing through the hip joint, the knee joint, and the ankle joint of each leg of the person; and
the acceleration grasped in the first step, the floor reaction forces and the application point thereof estimated in the third step, and the floor reaction forces and the application point thereof estimated in the fourth step are all three-dimensional quantities,
the displacements of the hip joint, the knee joint, and the ankle joint of each leg grasped in the second step each include an amount of rotation around an axis substantially perpendicular to the leg plane of the leg and the displacement of the hip joint is a three-dimensional quantity,
the generated torque control method further comprising:
a seventh step of sequentially grasping an acceleration of a predetermined reference point fixed to a person's predetermined region as a three-dimensional quantity by using at least the acceleration grasped in the first step;
an eighth step of sequentially grasping the positions and postures on the leg plane of the elements of each leg section of the person-side rigid link model by using at least the displacements grasped in the second step and the person-side rigid link model;
a ninth step of grasping the positions and postures on the leg plane of the elements of each leg section of the apparatus-side rigid link model by using at least the displacements grasped in the second step and the apparatus-side rigid link model, wherein:
the fifth step includes estimating the person-side joint moment by using a two-dimensional quantity, which is obtained by projecting the acceleration of the predetermined reference point grasped in the seventh step and the floor reaction forces and the application point thereof estimated in the third step onto the leg plane corresponding to each leg according to the displacement of the hip joint, and the positions and postures grasped in the eighth step; and
the sixth step includes estimating the apparatus-side joint moment by using a two-dimensional quantity, which is obtained by projecting the acceleration of the predetermined reference point grasped in the seventh step and the floor reaction forces and the application point thereof estimated in the fourth step onto the leg plane corresponding to each leg according to the displacement of the hip joint, and the positions and postures grasped in the ninth step.

6. The generated torque control method for a leg body exercise assistive apparatus according to claim 4, wherein the third step includes estimating the floor reaction forces acting on the person and the application point thereof by using at least the acceleration grasped in the first step, the displacements grasped in the second step, and the person-side rigid link model and the fourth step includes estimating the floor reaction forces acting on the leg body exercise assistive apparatus and the application point thereof by using at least the acceleration grasped in the first step, the displacements grasped in the second step, and the apparatus-side rigid link model.

7. The generated torque control method for a leg body exercise assistive apparatus according to claim 5, wherein the third step includes estimating the floor reaction forces acting on the person and the application point thereof by using at least the acceleration grasped in the first step, the displacements grasped in the second step, and the person-side rigid link model and the fourth step includes estimating the floor reaction forces acting on the leg body exercise assistive apparatus and the application point thereof by using at least the acceleration grasped in the first step, the displacements grasped in the second step, and the apparatus-side rigid link model.

8. The generated torque control method for a leg body exercise assistive apparatus according to claim 2, wherein the person-side joint moment and the apparatus-side joint moment estimated in the moment estimation step are moments around an axis substantially perpendicular to a leg plane defined as a plane passing through the hip joint, the knee joint, and the ankle joint of each leg of the person.

9. The generated torque control method for a leg body exercise assistive apparatus according to claim 2, wherein the moment estimation step includes: a first step of sequentially grasping an acceleration of a predetermined region of the person or the leg body exercise assistive apparatus; a second step of sequentially grasping displacements of the hip joint, the knee joint, and the ankle joint of each leg of the person; a third step of sequentially estimating floor reaction forces acting on the person and the application point thereof, on the assumption that almost the same motion as the motion of both legs of the person is being made with the leg body exercise assistive apparatus removed from the person; a fourth step of sequentially estimating floor reaction forces acting on the leg body exercise assistive apparatus and the application point thereof, on the assumption that the leg body exercise assistive apparatus is independently making almost the same motion as the motion of both legs of the person; a fifth step of estimating the person-side joint moment by inverse dynamics calculation processing by using the acceleration grasped in the first step, the displacements grasped in the second step, the floor reaction forces and the application point thereof estimated in the third step, and a person-side rigid link model which represents the person as a link body formed of a plurality of rigid elements and joint elements; and a sixth step of estimating the apparatus-side joint moment by inverse dynamics calculation processing by using the acceleration grasped in the first step, the displacements grasped in the second step, the floor reaction forces and the application point thereof estimated in the fourth step, and an apparatus-side rigid link model which represents the leg body exercise assistive apparatus as a link body formed of a plurality of rigid elements and joint elements.

10. The generated torque control method for a leg body exercise assistive apparatus according to claim 9, wherein:
- the person-side joint moment estimated in the fifth step and the apparatus-side joint moment estimated in the sixth step are moments around an axis substantially perpendicular to a leg plane defined as a plane passing through the hip joint, the knee joint, and the ankle joint of each leg of the person; and
- the acceleration grasped in the first step, the floor reaction forces and the application point thereof estimated in the third step, and the floor reaction forces and the application point thereof estimated in the fourth step are all three-dimensional quantities,
- the displacements of the hip joint, the knee joint, and the ankle joint of each leg grasped in the second step each include an amount of rotation around an axis substantially perpendicular to the leg plane of the leg and the displacement of the hip joint is a three-dimensional quantity, the generated torque control method further comprising:
- a seventh step of sequentially grasping an acceleration of a predetermined reference point fixed to a person's predetermined region as a three-dimensional quantity by using at least the acceleration grasped in the first step;
- an eighth step of sequentially grasping the positions and postures on the leg plane of the elements of each leg section of the person-side rigid link model by using at least the displacements grasped in the second step and the person-side rigid link model;
- a ninth step of grasping the positions and postures on the leg plane of the elements of each leg section of the apparatus-side rigid link model by using at least the displacements grasped in the second step and the apparatus-side rigid link model, wherein:
- the fifth step includes estimating the person-side joint moment by using a two-dimensional quantity, which is obtained by projecting the acceleration of the predetermined reference point grasped in the seventh step and the floor reaction forces and the application point thereof estimated in the third step onto the leg plane corresponding to each leg according to the displacement of the hip joint, and the positions and postures grasped in the eighth step; and
- the sixth step includes estimating the apparatus-side joint moment by using a two-dimensional quantity, which is obtained by projecting the acceleration of the predetermined reference point grasped in the seventh step and the floor reaction forces and the application point thereof estimated in the fourth step onto the leg plane corresponding to each leg according to the displacement of the hip joint, and the positions and postures grasped in the ninth step.

11. The generated torque control method for a leg body exercise assistive apparatus according to claim 9, wherein the third step includes estimating the floor reaction forces acting on the person and the application point thereof by using at least the acceleration grasped in the first step, the displacements grasped in the second step, and the person-side rigid link model and the fourth step includes estimating the floor reaction forces acting on the leg body exercise assistive apparatus and the application point thereof by using at least the acceleration grasped in the first step, the displacements grasped in the second step, and the apparatus-side rigid link model.

12. The generated torque control method for a leg body exercise assistive apparatus according to claim 10, wherein the third step includes estimating the floor reaction forces acting on the person and the application point thereof by using at least the acceleration grasped in the first step, the displacements grasped in the second step, and the person-side rigid link model and the fourth step includes estimating the floor reaction forces acting on the leg body exercise assistive apparatus and the application point thereof by using at least the acceleration grasped in the first step, the displacements grasped in the second step, and the apparatus-side rigid link model.

* * * * *